US012809915B2

(12) United States Patent
Jenni et al.

(10) Patent No.: US 12,809,915 B2
(45) Date of Patent: Nov. 24, 2026

(54) LEARNING TO PERSONALIZE VISION-LANGUAGE MODELS THROUGH META-PERSONALIZATION

(71) Applicant: Adobe Inc., San Jose, CA (US)

(72) Inventors: Simon Jenni, Hägendorf (CH); Fabian David Caba Heilbron, San Jose, CA (US); Chun-Hsiao Yeh, Emeryville, CA (US); Bryan Russell, San Francisco, CA (US); Josef Sivic, Prague (CZ)

(73) Assignee: Adobe Inc., San Jose, CA (US)

( * ) Notice: Subject to any disclaimer, the term of this patent is extended or adjusted under 35 U.S.C. 154(b) by 344 days.

(21) Appl. No.: 18/210,535

(22) Filed: Jun. 15, 2023

(65) Prior Publication Data

US 2024/0419726 A1 Dec. 19, 2024

(51) Int. Cl.

*G06F 16/58* (2019.01)
*G06F 16/535* (2019.01)
*G06F 16/538* (2019.01)

(52) U.S. Cl.

CPC ........ *G06F 16/5866* (2019.01); *G06F 16/535* (2019.01); *G06F 16/538* (2019.01)

(58) Field of Classification Search

CPC ... G06F 16/5866; G06F 16/535; G06F 16/538
See application file for complete search history.

(56) References Cited

U.S. PATENT DOCUMENTS

2009/0319883 A1* 12/2009 Mei .......................... G06F 16/70
707/E17.014
2016/0259857 A1* 9/2016 Wang .................... H04L 67/535
2020/0012943 A1* 1/2020 Neves .................. G06V 10/454
2021/0073272 A1* 3/2021 Garrett .................. G06N 20/00

(Continued)

OTHER PUBLICATIONS

Cohen, N., Gal, R., Meirom, E.A., Chechik, G., Atzmon, Y. (2022). âThis Is My Unicorn, Fluffyâ: Personalizing Frozen Vision-Language Representations. In: Avidan, S., Brostow, G., CissÃ ©, M., Farinella, G.M., Hassner, T. (eds) Computer Vision â ECCV 2022. ECCV 2022. (Year: 2022).*

(Continued)

*Primary Examiner* — Oneal R Mistry
*Assistant Examiner* — Rachel L Roberts
(74) *Attorney, Agent, or Firm* — FIG. 1 Patents

(57) ABSTRACT

Techniques for learning to personalize vision-language models through meta-personalization are described. In one embodiment, one or more processing devices lock a pre-trained vision-language model (VLM) during a training phase. The processing devices train the pre-trained VLM to augment a text encoder of the pre-trained VLM with a set of general named video instances to form a meta-personalized VLM, the meta-personalized VLM to include global category features. The processing devices test the meta-personalized VLM to adapt the text encoder with a set of personal named video instances to form a personal VLM, the personal VLM comprising the global category features personalized with a set of personal instance weights to form a personal instance token associated with the user. Other embodiments are described and claimed.

20 Claims, 28 Drawing Sheets

(56) References Cited

U.S. PATENT DOCUMENTS

| | | | | |
|---|---|---|---|---|
| 2021/0160230 | A1* | 5/2021 | Du | G06F 21/32 |
| 2022/0382565 | A1* | 12/2022 | Sunkara | G06F 9/451 |

OTHER PUBLICATIONS

Guo, Tao, Song Guo, and Junxiao Wang. “Pfedprompt: Learning personalized prompt for vision-language models in federated learning.” Proceedings of the ACM Web Conference Apr. 2023. (Year: 2023).*

Cohen, Niv, et al. “âthis is my unicorn, fluffyâ: Personalizing frozen vision-language representations.” European conference on computer vision. Cham: Springer Nature Switzerland, 2022. (Year: 2022).*

Cohen et al., ““This is my unicorn, Fluffy”: Personalizing frozen vision-language representations” arXiv:2204.01694v3 [cs.CV] Aug. 2, 2022.

* cited by examiner

FIG. 15
1500
Meta-Personalization Dataset 𝒟
Named Instance: fender guitar
Named Instance: first time coming dog
Test-time Personalization Dataset 𝒫
Named Instance: Alex's piano
Named Instance: Zak's dog Coffee
Query-time Dataset 𝒬
(a)
Input Query: "a woman is raising her hand in front of Alex's piano"
Input Query: "a woman is standing in front of a birthday cake and Alex's piano"
(b)
Input Query: "Zak's dog Coffee is lying down around a man and women"
Input Query: "a man is feeding Zak's dog Coffee with a leash"

LEARNING TO PERSONALIZE VISION-LANGUAGE MODELS THROUGH META-PERSONALIZATION

BACKGROUND

A Vision Language Model (VLM) is a type of artificial intelligence (AI) model that combines computer vision and natural language processing (NLP) techniques to analyze and understand visual information. These models are trained on large amounts of visual data, such as images or videos, and corresponding textual descriptions to learn the relationship between visual and linguistic information. VLMs can be used for various applications, such as image captioning, visual question answering, and image retrieval. They enable machines to understand and describe visual content in natural language, which is useful in various domains, including e-commerce, social media, and healthcare.

SUMMARY

Exemplary embodiments are generally directed to artificial intelligence (AI) and machine learning (ML) (AI/ML) techniques suitable for extending a vision-language model (VLM) with new concepts that are specific to a user. A VLM is a type of artificial intelligence model that combines the processing of visual and textual information. It is designed to understand and generate meaningful representations from both images and natural language. These models leverage the power of deep learning techniques and are trained on large datasets containing both visual and textual data. A VLM is capable of performing a wide range of tasks, such as image captioning, visual question and answering, visual storytelling, matching text to images or vice-versa, visual reasoning, and other vision and language tasks.

Some embodiments are particularly directed to AI/ML techniques to generate a personal VLM customized with new concepts associated with a specific user. The AI/ML techniques generate the personal VLM by expanding an input space of a pre-trained VLM. An example of a pre-trained VLM is contrastive language-image pre-training (CLIP) made by OpenAI©, among others. In one embodiment, for example, a model development tool extends a token vocabulary of the pre-trained VLM by having it learn a set of personal instance tokens. The personal instance tokens are novel word embeddings specific to a user.

In various embodiments, the model development tool generates the personal VLM by modifying a pre-trained VLM in two stages. In a training stage, the model development tool uses meta-learning to meta-personalize the pre-trained VLM with general category features. In a testing stage, the model development tool personalizes the meta-personalized VLM by adapting the general category features with personal instances for a user to form the personal instance tokens. The trained and tested personal VLM is suitable for inferencing operations to support various vision and language tasks with a diverse language that understands both novel and known concepts.

To collect datasets suitable for the training and testing phases, embodiments attempt to automatically identify important personal instances in videos for personalizing a vision-language model without explicit human annotations. People often record and refer to personal items or relationships in videos found online. One embodiment automatically identifies mentions of personal instances in a video and leverages these moments to build a set of personal instances for training and testing the personal VLM.

In one embodiment, for example, a multimodal search system uses the personal VLM to search a personal library for personal images, such as pictures in a photo library or video frames in a personal video. A user enters a search query into the system. The search query includes both general search terms and personal search terms. The general search terms are terms within a base vocabulary of the pre-trained VLM. The personal search terms are terms within an extended vocabulary of the modified pre-trained VLM represented by a personal instance token. The multimodal search system returns search results with images relevant to the personal search terms for presentation on a graphical user interface (GUI) of an electronic display for viewing by the user.

Other embodiments are described and claimed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
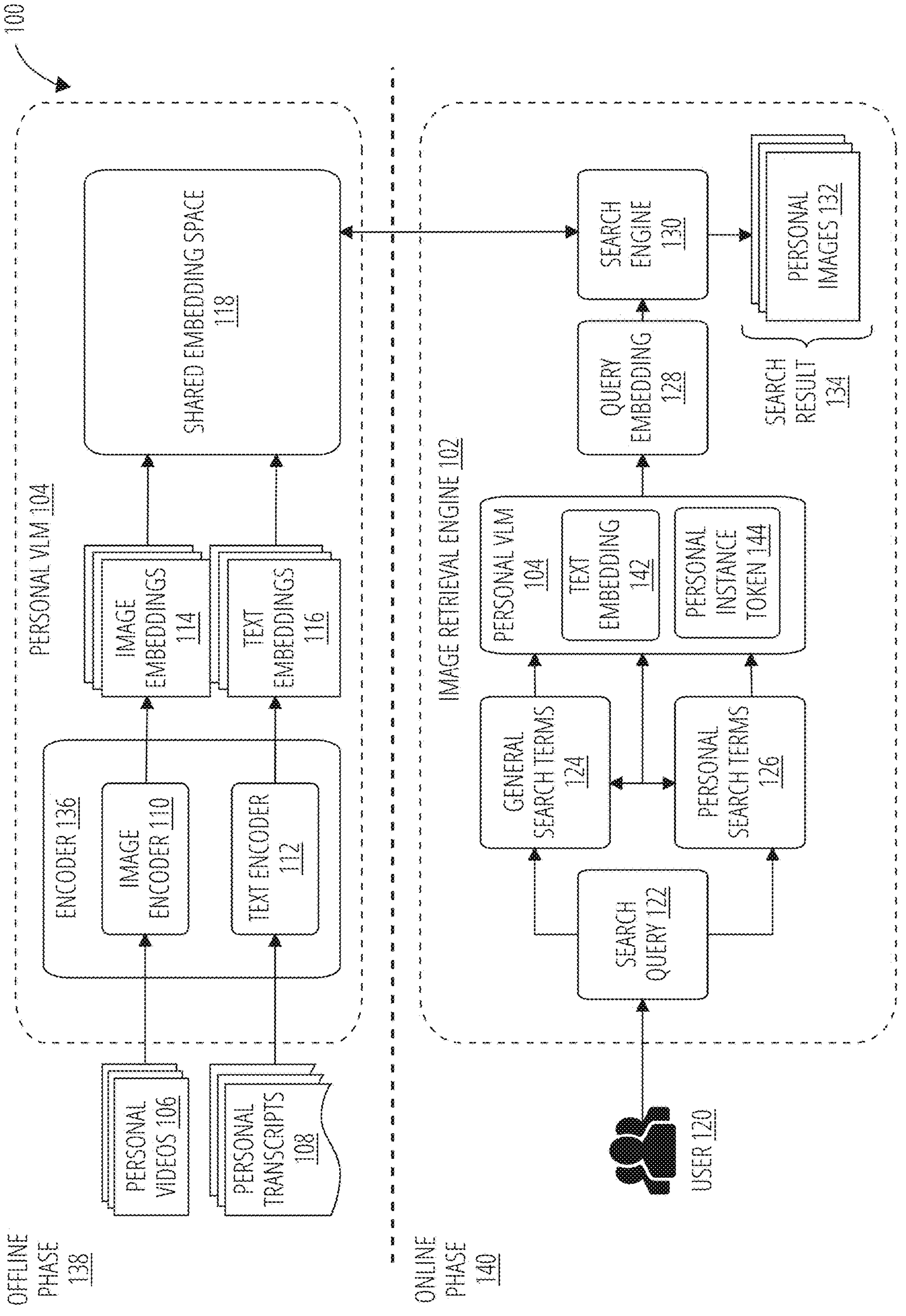
FIG. 1 illustrates multimodal search system in accordance with one embodiment.

The recent introduction of large-scale VLMs pre-trained on web-scale data enables many new vision tasks. Examples of pre-trained VLMs include contrastive language-image pre-training (CLIP), vision transformer (ViT), data-efficient image transformer (DeiT), universal image-text representation learning (UNITER), object-semantics aligned pre-training (OSCAR), aligning images and natural language (ALIGN), among others. These pre-trained VLMs provide a multimodal vision-language representation suitable for a number of downstream tasks, such as zero-shot classification and retrieval, image/video generation, language-guided question answering, image captioning, robotic manipulation, and other vision tasks.

One popular vision task is multimodal search systems. A multimodal search system is a system that allows users to search for information across multiple modalities, such as text, images, and videos. Unlike traditional search engines that are typically limited to a few text-based search terms, multimodal search systems are designed to handle a wide range of inputs and to provide relevant results across different modalities. For example, a user searches for an image or a video by describing its content in a natural language representation, such as words or sentences in a human natural language like English, Spanish, French, Korean, and so forth.

One type of multi-modal search system is an image retrieval (IR) or video retrieval (VR) search system that searches for images or videos based on text-based descriptions. For example, an IR system uses a pre-trained VLM to accept as input a search query expressed in a natural language, such as a sentence in free-form text, to search for images with specific object categories. Assume a user enters a search query as a sentence that includes words describing a specific object category, such as "a small white dog" to search for images with instances of small white dogs. Sometimes a user enters a search query as a longer sentence that includes words describing a specific object category and a scene attribute, such as "a small white dog playing at a dog park" in order to search for images with instances of small white dogs playing at dog parks.

Instead of object categories, sometimes a user is searching for a specific object that is more personal to the user. For example, assume a user has a dog named "Biscuit" and a personal library that includes images or videos of Biscuit. The user enters a search query with the phrase "My dog Biscuit" into an IR system to search their personal library for images showing Biscuit. In some cases, the user is searching for a specific object and a scene attribute. For example, the user enters a search query as a sentence with the phrase "My dog Biscuit grabbing a pink frisbee" to search a personal library for images showing Biscuit grabbing a pink frisbee.

Searching for specific object instances, however, becomes a challenge when using a pre-trained VLM. A pre-trained VLM offers a relatively large vocabulary of visual categories that enables searching using a rich set of free-form text. Despite these powerful representations, an IR system cannot directly use a pre-trained VLM to reason about new personal concepts, such as processing search queries with search terms that are personal to the user. This is because the pre-trained VLM uses a fixed vocabulary that it can understand and use in its predictions. The fixed vocabulary is determined during the training process and is usually based on a large corpus of text and image data. When a user formulates a search query that contains a new term that is not in the fixed vocabulary of the pre-trained VLM, the pre-trained VLM does not understand the new term and therefore it cannot use the new term when making its predictions.

One way to address this challenge is by fully retraining the pre-trained VLM with an expanded vocabulary set. However, retraining a pre-trained VLM such as the CLIP model would require approximately 600 million images. This solution is prohibitively expensive and it would require extensive time and compute resources.

Another way to address this challenge is by extending a vocabulary for the pre-trained VLM to include a new learned token that represents a specific personal instance. There are several ways to fine-tune a pre-trained VLM to recognize new words that are not in its vocabulary, including subword tokenization, domain-specific training data, multitask learning, word embeddings, data augmentation, and active learning. These approaches are used in combination or separately, depending on the specific task and the available data.

However, these approaches suffer from challenges in ensuring that the fine-tuned VLM is able to generalize to new words and contexts, rather than simply memorizing the examples it has seen in training data. This phenomenon is typically referred to as "overfitting." Overfitting is a common problem in machine learning where a model is trained too well on the training data, to the point that it starts to memorize the data instead of learning from it. As a result, the model performs poorly on new, unseen data, despite achieving high accuracy on the training data. Overfitting occurs when a model is too complex or has too many parameters relative to the size of the training data. This can cause the model to capture random noise or idiosyncrasies in the training data that are not relevant to the underlying patterns, resulting in poor generalization to new data.

Previous efforts for personalized concept learning focused on learning a transformation module or adapter layer over an output space for the pre-trained VLM. In other words, these efforts attempt to modify an output space of a pre-trained VLM. However, these approaches risk forgetting prior knowledge, or face difficulties in accessing it concurrently with newly learned concepts. In addition, these previous approaches take a multi-class approach, discriminating between several new concepts. They are not designed for learning a single new personalized concept.

Instead of modifying an output space of a pre-trained VLM, some personalized concept learning approaches attempt to expand an input vocabulary for the pre-trained VLM. One promising approach is personalizing language vision representations (PALAVRA). PALAVRA proposes a learning scheme that appends a learnable token for a new personalized concept to token embeddings of an input text prompt. The learned representation helps preserve the personalized concept. PALAVRA adds a new token embedding to CLIP without changing its existing vocabulary by using a technique called "zero-shot learning" or "few-shot learning". In zero-shot learning, the model is trained to recognize tokens that it has never seen before. A zero-shot learning tool trains the model by leveraging semantic relationships between tokens that are already in the vocabulary. For example, if the new token is related to an existing token in the vocabulary, the zero-shot learning tool trains the model so that it learns to recognize the new token based on a similarity between the new token and the existing token.

While this approach enables language-guided search for personal instances by placing the learned tokens in the query prompt, PALAVRA assumes a collection of manually annotated images showing the individual instance in various contexts for successful token learning. For this approach to work in practice, a user must manually annotate all their important personal instances in various contexts, such that the instance representation does not capture nuisance features, such as the background. Therefore, PALAVRA suffers from at least two key challenges: (1) collecting personal instance examples without explicit human labeling; and (2) learning a generalizable object-centric representation of personal instances from very few examples.

Embodiments attempt to solve these and other challenges by implementing improved AI/ML techniques for personalizing a VLM for a given user. The AI/ML techniques implement a meta-personalization approach that combines personalized concept learning techniques, meta-learning techniques, and test-time adaption techniques to meta-personalize a VLM to find named instances in images or video.

The meta-personalization approach generates a personal VLM by adapting a pre-trained VLM, such as a CLIP model, among other pre-trained VLMs. This adaptation occurs in two stages. In a training stage, a model development tool implements meta-learning techniques to meta-personalize the pre-trained VLM by learning global category features from a large video corpus, image corpus, or a set of visual data in general. For example, the pre-trained VLM meta-learns on an object class, such as "dogs." In a testing stage, the model development tool implements personalized concept learning techniques and test-time adaption techniques to adapt the global category features with personal instances from only a few examples of user-specific instances. For example, the pre-trained VLM meta-learns on an object class for "dogs," and then learns a personal instance of the object class, such as "my dog Biscuit." In this manner, the personal VLM learns new representations of personal items in an image or a video that enable query-time retrieval through natural language search queries. This allows the pre-trained VLM to generalize beyond the domain of concepts in the training images.

To collect datasets suitable for the testing phase, embodiments attempt to automatically identify important personal instances in videos for personalizing a vision-language model without explicit human annotations. People often record and refer to personal items or relationships in videos found online. One embodiment automatically identifies mentions of personal instances in a video and leverages these moments to build a set of personal instances for training. For example, a mining system implements a speech-to-text (STT) model to extract transcripts of videos. The mining system includes a miner that implements a mining algorithm to find candidate moments by looking for occurrences of possessive adjective patterns, such as "this is my *" or similar possessive adjective patterns. The symbol "*" in this example represents a single word or sequence of words describing the instance (e.g., *="dog Biscuit"). The mining system also implements a visual filter that uses vision-language similarity to filter out non-visual examples and to find additional occurrences in the video for training. The mining system outputs a resulting collection of named instances that is referred to as a "This-Is-My" dataset.

Embodiments implement a novel model and training procedure to learn text tokens representing named instances in video from very few and noisy training examples. A model development tool implements a set of AI/ML training and testing strategies to generate a personal VLM from a pre-trained VLM. The personal VLM learns to represent each instance with learned tokens. The personal VLM models each token as a linear combination of a set of pre-learned category-specific features shared across different instances. This set of shared category-specific features (e.g., similar to object attributes) improves the generalization of the personal VLM to new words and contexts by preventing the instance representations from capturing nuisance features, such as scene background, for example. Furthermore, the encoder implements meta-personalization techniques to pre-train and adapt the shared category features using a large set of automatically collected "This-Is-My" dataset. This technique results in improved few-shot personalization performance at test-time. In contrast to conventional solutions, meta-personalization of a VLM does not require the training of additional neural network models and requires only the optimization of a contrastive learning objective.

The embodiments directly address at least three existing challenges presented by conventional solutions. First, embodiments implement AI/ML techniques for collecting personal instance examples without explicit human labeling. Second, embodiments implement a learning scheme to allow a pre-trained VLM to learn a generalizable object-centric representation of personal instances from very few examples without overfitting. Third, embodiments focus on optimizing a contrastive learning objective while avoiding the need for training additional neural network models. Embodiments solve these and other challenges as well.

The embodiments provide several advantages and benefits relative to conventional AI/ML techniques. For example, personalized concept learning techniques (e.g., such as PALAVRA) suffer from at least two key challenges: (1) collecting personal instance examples without explicit human labeling; and (2) learning a generalizable object-centric representation of personal instances from very few examples. With respect to the first challenge, embodiments implement a mining system to identify important personal instances in personal images or personal videos suitable for personalizing a vision-language model without explicit human annotations. In one test, for example, the mining system found more than six thousand named instances in 50K videos randomly sampled from the Merlot Reserve dataset. With respect to the second challenge, embodiments use meta-learning in the form of shared category-specific features to train a personal VLM to new words and contexts from very few training examples while avoiding overfitting and without capturing nuisance features (e.g., a background scene).

As a result, the personal VLM demonstrates superior performance relative to other models. For instance, a test bench was used for experiments of the personal VLM consisting of a challenging "This-Is-My" video instance retrieval dataset depicting specific object instances across different videos and contexts, and an existing fashion item retrieval benchmark, DeepFashion2. Test results demonstrate that the personal VLM outperforms several baselines and prior approaches on these challenging language-guided instance retrieval tasks.

Consequently, embodiments support improved IR and VR search systems that implement a personal VLM to encode and decode natural language search queries with personal search terms to retrieve images and videos with personal objects embedded within the images and videos. Accordingly, this improves a speed and accuracy of an underlying compute system executing the IR or VR search system, while consuming less compute cycles, memory resources, communication bandwidth, battery power, and other valuable resources associated with electronic systems.

FIG. 1 illustrates a multimodal search system 100 according to aspects of the present disclosure. The multimodal search system 100 is suitable for implementing a novel vision-language model referred to as a personal VLM 104 that is designed to support multimodal searching, such as IR and VR search tasks using natural language search queries. The personal VLM 104 is trained and tested to learn novel personal instance tokens specific to a user. The personal instance tokens are a combination of global category features with instance-specific weights. The training and testing phases for the personal VLM 104 are discussed in more detail with reference to FIG. 7.

In one embodiment, the personal VLM 104 is an improved version of a pre-trained VLM. An example of a pre-trained VLM includes the CLIP model. The CLIP model, developed by OpenAI, is a large-scale, pre-trained deep learning model that learns from image-text pairs. It leverages a contrastive learning approach to simultaneously learn to generate image and text embeddings in a shared latent space. The model is trained on a diverse set of internet images and their associated textual descriptions. This pretraining process enables the CLIP model to learn a wide range of visual and textual concepts, which is fine-tuned for various downstream tasks. Other embodiments of the personal VLM 104 use a different pre-trained VLM. Embodiments are not limited in this context.

Prior to deployment of the personal VLM 104 for inferencing operations in the multimodal search system 100, a model development tool generates the personal VLM 104 by expanding a vocabulary for the pre-trained VLM without changing its base vocabulary. The model development tool uses zero-shot or few-shot learning techniques to add new classes to the pre-trained VLM, including new token embeddings that did not exist when the pre-trained VLM was first trained on its original training dataset. The new token embeddings may represent, for example, new concepts that are personalized to a given user.

The multimodal search system 100 operates in two general phases, an offline phase 138 and an online phase 140. During the offline phase 138, the multimodal search system 100 implements the personal VLM 104 to perform encoding operations for personal videos, images and text in preparation for search operations. During the online phase 140, the multimodal search system 100 uses an image retrieval engine 102 that implements the personal VLM 104 to support personalized search operations to find specific instances from the encoded videos, images and text.

In a static use case, operations for the offline phase 138 and the online phase 140 occur during different time periods. For instance, the multimodal search system 100 encodes a personal video corpus having multiple personal videos for a given user prior to commencing search operations. The static use case supports searching for images across the entire personal video corpus.

In a dynamic use case, operations for the offline phase 138 and the online phase 140 occur during a same time period. For instance, the multimodal search system 100 receives one or more personal videos for encoding contemporaneously with receiving a search query for images within the one or more personal videos. The dynamic use case supports searching for images within the one or more personal videos. For instance, a user may select a personal video with “my dog Biscuit” for encoding and search for images with “my dog Biscuit” within the encoded personal video immediately thereafter.

During the offline phase 138, an encoder 136 of the multimodal search system 100 encodes image information and text information taken from personal videos 106 and corresponding time-aligned personal transcripts 108, respectively. The encoder 136 maps the encoded image information and the encoded text information to a shared embedding space 118. The shared embedding space 118 is a common latent space in which representations of different modalities (e.g., image and text) are mapped into a shared vector space. The shared embedding space 118 enables comparison and joint modeling of different modalities by representing them in a common feature space that captures their underlying similarities and differences. This allows comparison of the two modalities in a joint feature space, thereby allowing for tasks such as image classification and text-based image retrieval.

As depicted in FIG. 1, an image encoder 110 of the encoder 136 receives as input a personal video from the set of personal videos 106. The personal videos 106 are stored in a personal video library associated with a given user. The personal video library comprises a collection of images (e.g., pictures or photos) or videos that include visual objects corresponding to a new personalized concept associated with the user, such as “my dog Biscuit.” The image encoder 110 selects an image from the personal video (e.g., a video frame or a video shot) for encoding.

In one embodiment, the set of personal videos 106 are separate from a set of personal videos used to train or test the personal VLM 104. For instance, the personal videos 106 are new videos of “my dog Biscuit” and the personal VLM 104 is trained and tested on old videos of “my dog Biscuit.” In one embodiment, the personal videos 106 are a subset of the personal videos used to train or test the personal VLM 104. For instance, the personal videos 106 are personal videos of “my dog Biscuit” used for both training operations and inferencing operations of the personal VLM 104. Embodiments are not limited in this context.

The image encoder 110 processes input images and creates image embeddings 114. The image embeddings 114 are fixed-size vector representations that capture the visual features of the input images. The image encoder 110 uses an artificial neural network (ANN), such as a convolutional neural network (CNN), to extract visual features or characteristics from an input image. The image encoder 110 passes the input image through the CNN and extracts activations from one or more intermediate layers of the CNN. The activations form a compressed and abstract representation of the input image that preserves its salient visual features. Examples of image features include edges, textures, shapes, colors, objects, and other visual features from the input image. In one embodiment, for example, the image features are a set of personal image features associated with a personal instance token previously added to the input vocabulary of the personal VLM 104. The image encoder 110 outputs image embeddings 114 representative of the extracted visual features or characteristics.

Each of the image embeddings 114 is a vector or numerical representation. In one embodiment, the vector is a fixed-length numerical representation of an image that captures its visual features and characteristics in a high-dimensional vector space. The fixed-length is typically determined by the architecture of the CNN used to generate the image embeddings 114. For example, in a CLIP model, the image embedding is a 512-dimensional vector that represents the content and visual features of the input image. This means that the image encoder 110 maps an input image to a vector with a fixed length of 512 elements, regardless of the size or complexity of the input image. The image encoder 110 normalizes each image embedding to have a unit length. This allows measurement of a distance between images, using measurement techniques such as cosine similarity between vectors, a Euclidean distance between two vectors, dot product, or any other suitable algorithm to measure a semantic similarity between images. Operations for the image encoder 110 are discussed in more detail with reference to FIG. 3.

In parallel, the text encoder 112 of the encoder 136 receives as input a personal transcript from the set of personal transcripts 108. The personal transcript is a time-aligned transcript associated with a given personal video of the set of personal videos 106. The personal transcript may include text information in a natural language form, such as a human language spoken by various individuals captured from audio signals within the personal video, which is then translated to text form using a speech-to-text (STT) model.

The text encoder 112 extracts text features from the raw text data in the personal transcripts 108 through a process called feature extraction. Feature extraction typically involves several pre-processing operations on the raw text data, such as tokenization, stemming, and stop word removal, which varies depending on the specific task and dataset. The text feature is a specific characteristic or attribute of the personal transcript suitable for the personal VLM 104. Examples of text features include word frequencies, sentence structure, semantic content, and other textual features from the personal transcript. In one embodiment, for example, the text features are a set of personal text features associated with a personal instance token previously added to the input vocabulary of the personal VLM 104 during training and testing phases of the personal VLM 104 prior to deployment.

The text encoder 112 creates text embeddings 116. Similar to the image embeddings 114, the text embeddings 116 are fixed-size vector representations of the extracted text features or characteristics for a given textual description. The text encoder 112 creates the text embeddings 116 by passing text input (e.g., words, sentences, paragraphs, etc.) through a transformer-based neural network, such as Generative Pre-trained Transformer (GPT) or Bidirectional Encoder Representations from Transformers (BERT). The transformer-based neural network is trained to encode natural language text into the text embeddings 116. The text encoder 112 uses the transformer-based network to encode the input text into a sequence of numerical vectors, which are then aggregated into a fixed-length text embedding through pooling operations, such as average pooling or max pooling. The fixed-length of the text embeddings 116 matches the fixed-length of the image embeddings 114. For example, in CLIP, the text embedding is a 512-dimensional vector that represents the semantic content and textual features of the input personal transcript.

The text encoder 112 is trained to produce text embeddings 116 that are semantically meaningful and transferable across different tasks and datasets. The text encoder 112 achieves this through a contrastive learning objective, where the text encoder 112 is trained to produce text embeddings 116 that are similar to the image embeddings 114 of its associated image, and dissimilar to the image embeddings 114 of other images. This forces the text embeddings 116 to capture the semantic content of the text and align it with the visual features of the image, enabling tasks such as text-based image retrieval. Operations for the text encoder 112 are discussed in more detail with reference to FIG. 4.

The personal VLM 104 creates a shared embedding space 118 for both the image embeddings 114 and the text embeddings 116 by learning to align the two types of embeddings through a process called contrastive learning. The personal VLM 104 generates image embeddings 114 and text embeddings 116 for matched image-text pairs that are closer together in the shared embedding space 118, while image embeddings 114 and text embeddings 116 for a mismatched image-text pairs are farther apart in the shared embedding space 118. During training, the personal VLM 104 optimizes the image encoder 110 and the text encoder 112 to generate embeddings such that a distance metric (e.g., cosine similarity or dot product) between the embeddings of matched image-text pairs is high, and the similarity between the embeddings of mismatched pairs is low. A contrastive loss function encourages the personal VLM 104 to bring matched pairs closer together and push mismatched pairs farther apart in the shared embedding space 118. As a result of the training process, the personal VLM 104 learns to generate the image embeddings 114 and the text embeddings 116 in the shared embedding space 118, where semantically related images and texts are closer together. In this way, the personal VLM 104 is able to reason about the relationships between images and text descriptions to perform various search tasks by comparing embeddings within the shared embedding space 118.

During the offline phase 138, the encoder 136 of the personal VLM 104 captures a semantic relationship between personal image features from the personal videos 106 and associated text from the personal transcripts 108, which it then uses to compute a similarity between them. In this manner, a personal concept such as "my dog Biscuit" is associated with a new symbol [MY DOG BISCUIT] that has its own dense word embedding. The personal VLM 104 is able to later represent sentences that use it, like "Biscuit grabbing a pink frisbee" by detecting the word "Biscuit" and mapping its symbol [MY DOG BISCUIT] to its new embedding vector.

During the online phase 140, an image retrieval engine 102 implements the personal VLM 104 to support personalized searches for visual content within the personal videos 106. A user 120 formulates and enters a search query 122. In one embodiment, the search query 122 comprises free-form text such as words or sentences in a natural language. The search query 122 includes both general search terms 124 and personal search terms 126. The general search terms 124 are words or phrases within an original or base vocabulary of the pre-trained VLM of the personal VLM 104. Examples of general search terms 124 include words or phrases such as "a pink frisbee" or a "dog in the park." The personal search terms 126 are words or phrases outside of the original vocabulary of the pre-trained VLM, yet within the expanded vocabulary of the personal VLM 104 as new personal instance tokens. The new personal instance tokens are word embeddings that represent words or phrases to describe concepts that are personal to a user. Examples of personal search terms 126 include personal words or phrases, such as "my dog Biscuit" or "Zak's dog Kona", as represented by new personal instance tokens such as [MY DOG BISCUIT] or [ZAKS DOG KONA].

The image retrieval engine 102 extracts the general search terms 124 and the personal search terms 126 from the search query 122, and passes them to the personal VLM 104. In one embodiment, the image retrieval engine 102 performs extraction operations based on information received from the personal VLM 104. Alternatively, the personal VLM 104 is capable of accepting the entire search query 122 without extraction, and processes the entire search query 122 through an embedding layer fine-tuned to detect and process the personal search terms 126.

The personal VLM 104 receives the general search terms 124 and the personal search terms 126 as input. The personal VLM 104 identifies and retrieves a personal instance token 144. The personal instance token 144 is a new embedded token that corresponds to the personal search terms 126. The personal VLM 104 combines the personal instance token 144 with the tokens of the pre-trained VLM that represent the general terms 124 in a single text input sequence. The personal VLM 104 then processes the combined sequence of personal and general tokens to output a query embedding 128. The personal VLM 104 outputs the query embedding 128 to the search engine 130, where the query embedding 128 is a vector with a numerical representation for the search terms in the search query 122.

By way of example, assume the user 120 enters a search query 122 as "Biscuit grabbing a pink frisbee." The image retrieval engine 102 extracts "grabbing a pink frisbee" as the general search terms 124. The image retrieval engine 102 extracts "Biscuit" as the personal search terms 126. The personal VLM 104 encodes the general search terms 124 of "grabbing a pink frisbee" into a text embedding 142. The personal VLM 104 retrieves a personal instance token 144 that corresponds to the personal text "Biscuit," which in this example is [MY DOG BISCUIT]. The personal VLM 104 maps the personal instance token 144 of [MY DOG BISCUIT] to the text embedding 142, and outputs the text embedding 142 as the query embedding 128 to a search engine 130.

The search engine 130 receives the query embedding 128, and searches the shared embedding space 118 for image embeddings 114 that are semantically similar to the query embedding 128. As previously described, the personal VLM 104 generates a query embedding 128 for the search query 122 using the same text encoder 112 and tokenization process used to create the text embeddings 116 in the shared embedding space 118. Since the personal VLM 104 generates the image embeddings 114, the text embeddings 116 and the query embedding 128 in the shared embedding space 118, the search engine 130 is able to use a same similarity measure to compare the query embedding 128 to the image embeddings 114 in the shared embedding space 118. This allows for more flexible and nuanced search capabilities, where the user 120 can search for images that are semantically similar to the search query 122, rather than relying on exact keyword matches. Overall, the use of a shared embedding space 118 allows for more accurate and flexible search capabilities, as well as the ability to perform cross-modal searches that span multiple types of media.

The search engine 130 searches the shared embedding space 118 for candidate image embeddings 114 using a similarity measure, such as the cosine similarity or dot product, to compare a distance between the query embedding 128 and one or more of the image embeddings 114 in the shared embedding space 118. The search engine 130 ranks the candidate image embeddings 114 in the shared embedding space 118 based on their similarity to the query embedding 128. The search engine 130 selects a top set of k candidate image embeddings 114 with the highest similarity scores, where k represents any positive integer. The search engine 130 retrieves a set of personal images 132 associated with the top set of image embeddings 114, and returns the set of personal images 132 as a search result 134 to the search query 122. The search engine 130 presents the set of personal images 132 on a graphical user interface (GUI) of an electronic display for the user 120, along with any associated metadata, such as titles, descriptions, or source information. The GUI is designed to facilitate easy browsing and exploration of the search result 134.

In some embodiments, the image retrieval engine 102 is further enhanced by incorporating features like query expansion, search result filtering, or personalized recommendations based on a search history or preferences associated with the user 120. These additional features improve a user experience and make the search results more relevant and engaging. Embodiments are not limited to these enhanced features.

Figure 2:
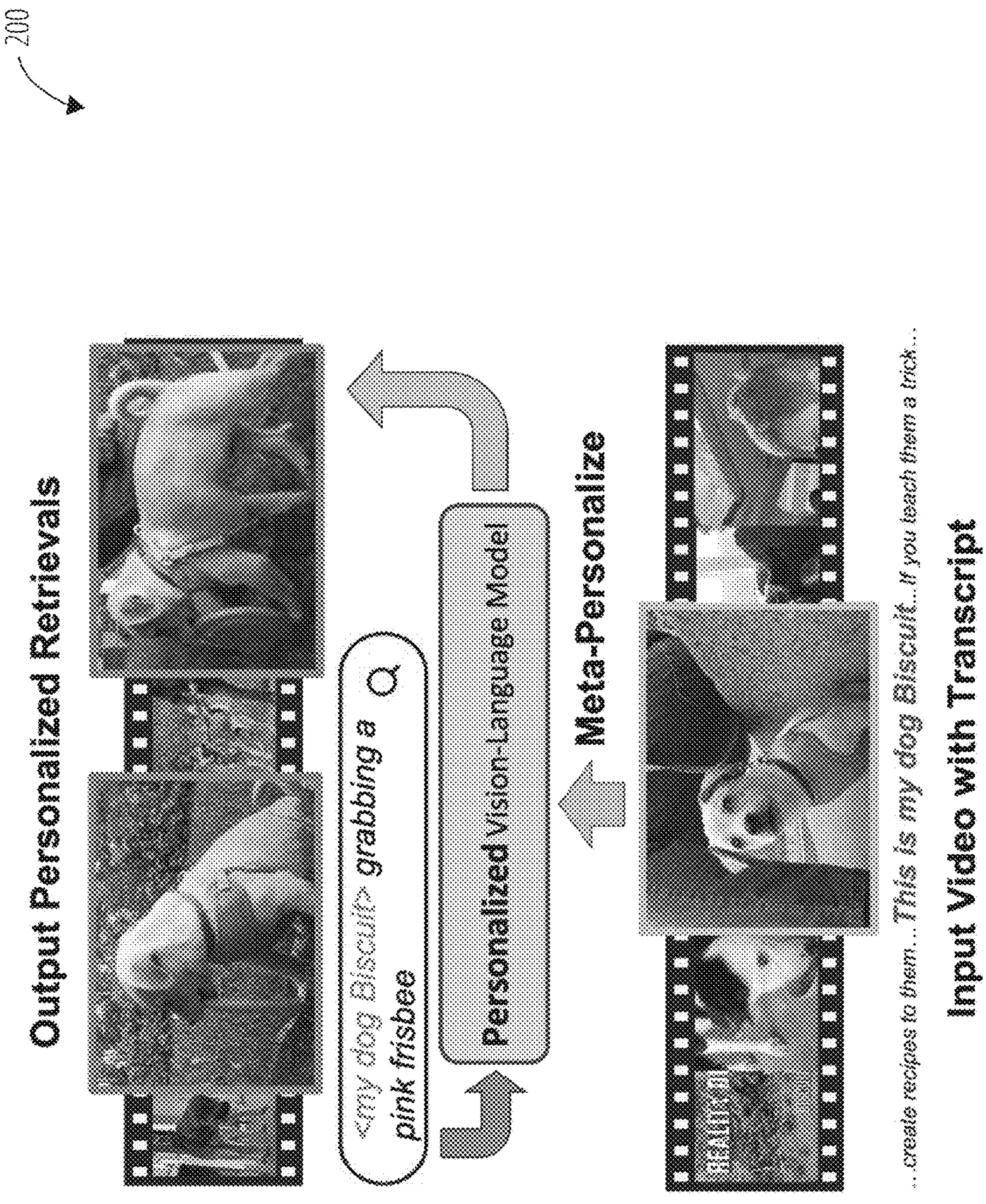
FIG. 2 illustrates an example of a multimodal search system in accordance with one embodiment.

FIG. 2 illustrates an operating environment 200 for the multimodal search system 100. The operating environment 200 depicts a personalized VLM, such as the personal VLM 104.

The personal VLM 104 receives as input a personal video with images of "my dog Biscuit." The personal VLM 104 receives a search query 122 as a natural language query "my dog Biscuit grabbing a pink frisbee." The personal VLM 104 generates a query embedding 128 with a personal instance token 144 represented as <my dog Biscuit>. The personal VLM 104 searches for image embeddings 114 that are semantically similar to the query embedding 128. The personal VLM 104 outputs a set of personal images 132 showing Biscuit with a pink frisbee.

This result is enabled by meta-personalizing the personal VLM 104 on a large-scale dataset of narrated videos by pre-learning shared global category tokens, which in this example is for the category of "dogs." The category of dogs is then personalized to user-specific instances from only a few user-given training examples. In this example, the personal VLM 104 automatically learned a personal instance token 144 for <my dog Biscuit> by modifying a text input space for the pre-trained VLM. The personal VLM 104 then uses the previously learned<my dog Biscuit> in other contexts through natural language queries.

Figure 3:
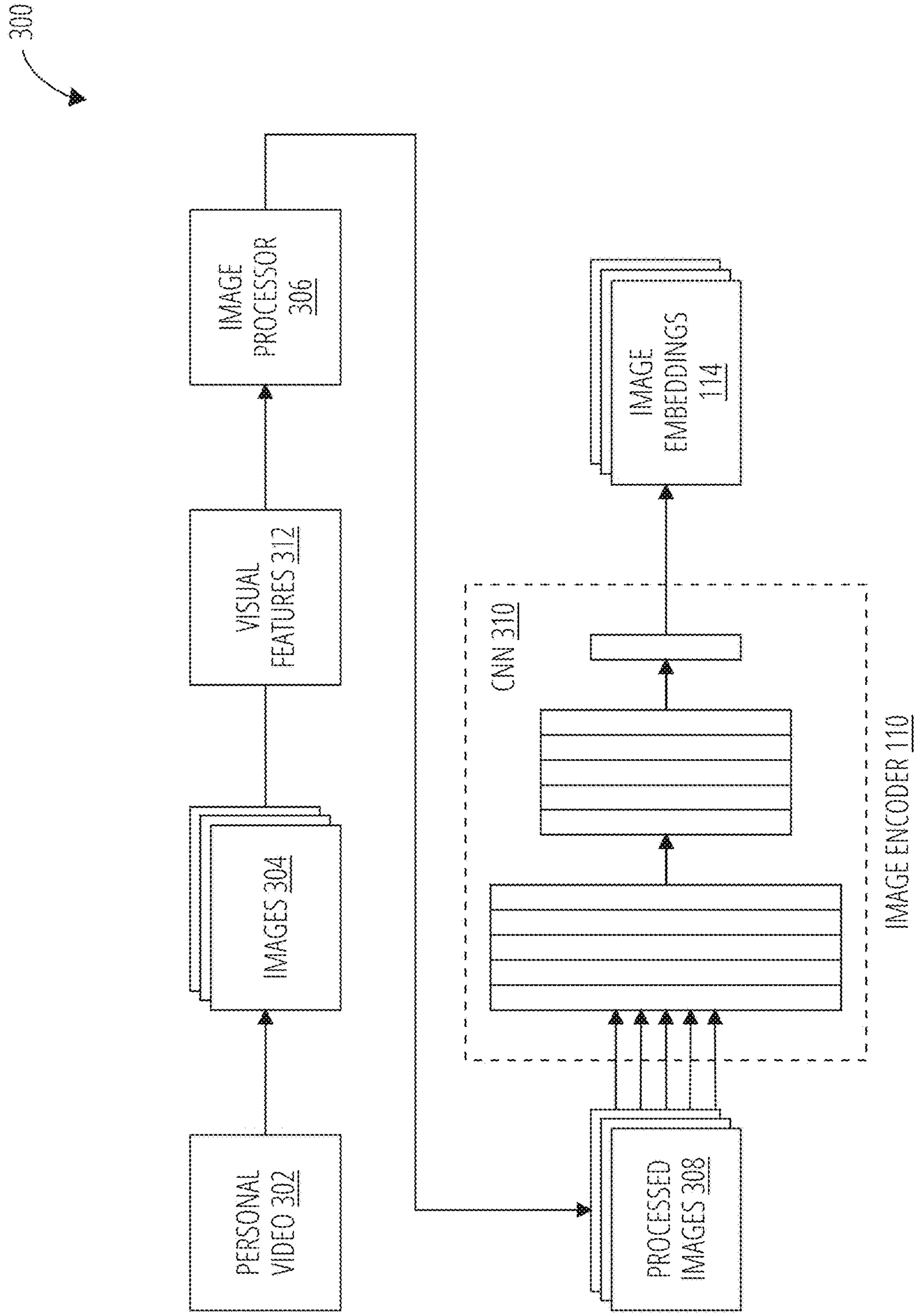
FIG. 3 illustrates an image pre-processor in accordance with one embodiment.

FIG. 3 illustrates an image pre-processor 300 suitable for implementation as part of the multimodal search system 100. The image pre-processor 300 shows an example of video pre-processing according to aspects of the present disclosure. In one embodiment, for example, the image pre-processor 300 pre-processes the personal videos 106 and outputs images from the personal videos 106 to the image encoder 110 of the personal VLM 104.

The image pre-processor 300 receives as input a personal video 302 of the set of personal videos 106. The image pre-processor 300 selects one or more images 304 from the personal video 302. Examples of the images 304 include a still frame, a video frame or a video shot from the personal video 302. In some cases, the images 304 are evenly spaced still images from the personal video 302. An image processor 306 optionally processes the images 304 to scale the images 304 to a standard size or format to match the input dimensions of the personal VLM 104.

In one embodiment, the image pre-processor 300 selects one or more visual features 312 from one or more of the images 304. Examples of the visual features 312 include the image features described with reference to FIG. 1. Other examples of visual features 312 include colors present in an image (e.g., a red apple versus a green apple), a texture of an object or surface in an image (e.g., a rough texture of a tree bark or a smooth texture of a metal surface), a shape of an object (e.g., a round ball or a rectangular box), edges of objects (e.g., sharp edges of a building or rounded edges of a cloud), patterns in an image (e.g., stripes on a zebra or mane of a lion), size of an object in an image (e.g., a small mouse or a larger rat), orientation of objects in an image (e.g., a vertical flagpole or a horizontal beam), and so forth. These are just a few examples of the many visual features that can be present in an image. The personal VLM 104 uses combinations of these and other visual features to recognize and classify objects in images, such as personal objects such as "my dog Biscuit."

In another embodiment, the image encoder 110 learns the visual features 312 during training of the neural network. In this embodiment, there is not a clear separation of feature extraction and image encoding/embedding in the personal VLM 104. Instead, the image encoder 110 does both feature extraction and image encoding/embedding. In this embodiment, the image encoder 110 is a neural network that gets as input just images and outputs an embedding. Feature extraction is implicit (e.g., learned) and internal to the network.

The image encoder 110 receives as input the processed images 308 and the visual features 312. The image encoder 110 passes the visual features 312 and the processed images 308 through a set of fully-connected convolutional layers of a CNN 310 or a transformer-based model. The image encoder 110 generates image embeddings 114 based on the processed images 308. The image encoder 110 maps the image embeddings 114 to the shared embedding space 118 of the personal VLM 104. In some cases, the image embeddings 114 include temporal information linking visual features to the temporal order of the images 304. For example, the image encoder 110 implements a long short-term model (LSTM) architecture to capture a temporal relationship among frames. A LSTM is a type of recurrent neural network (RNN) architecture used for processing sequential data, such as speech, text, or time series data.

Figure 4:
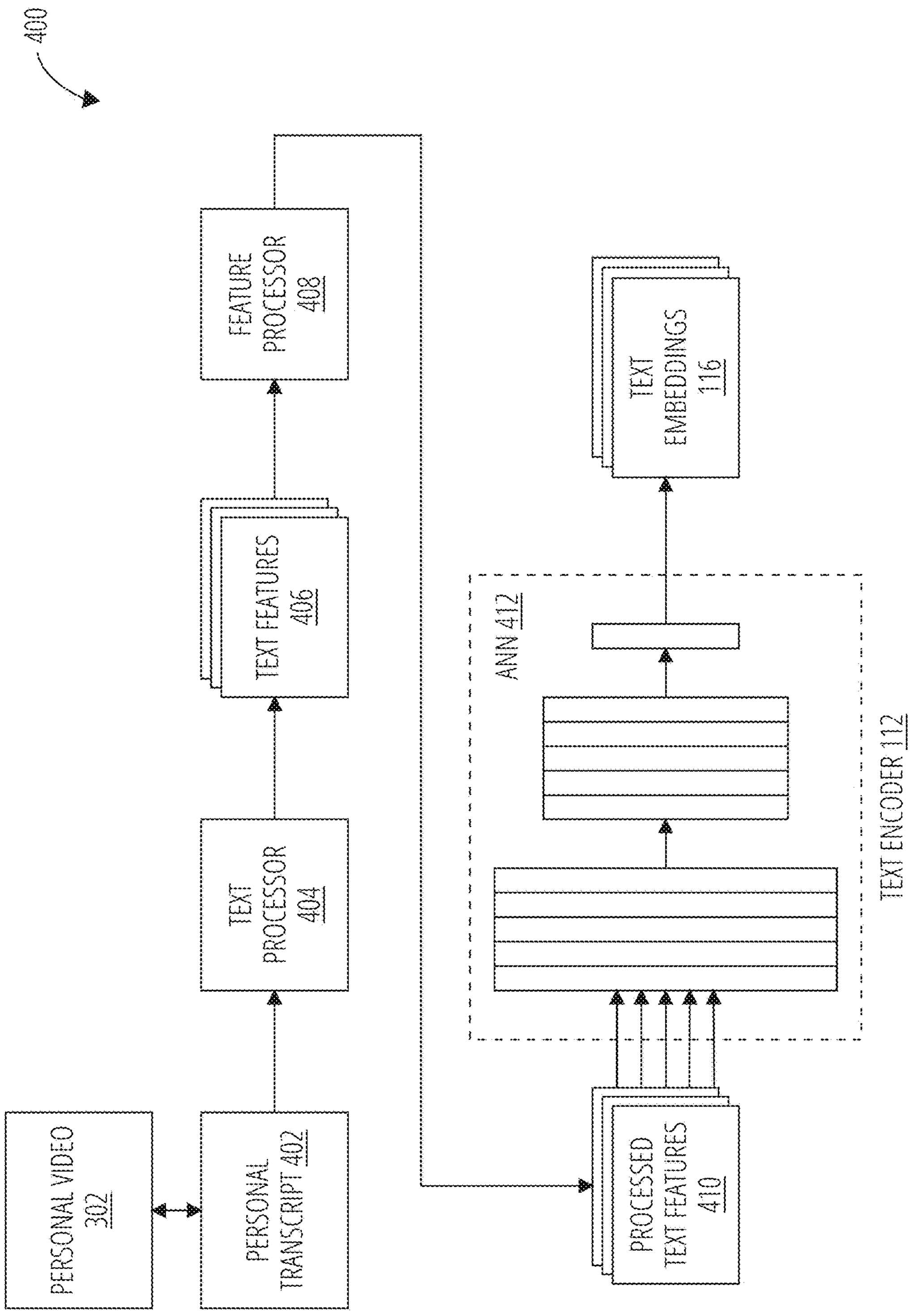
FIG. 4 illustrates a text pre-processor in accordance with one embodiment.

FIG. 4 illustrates a text pre-processor 400 suitable for implementation as part of the multimodal search system 100. The text pre-processor 400 shows an example of text pre-processing according to aspects of the present disclosure. In one embodiment, for example, the text pre-processor 400 pre-processes the personal transcripts 108 time-aligned with the personal videos 106, and outputs text features from the personal transcripts 108 to the text encoder 112 of the personal VLM 104.

The text pre-processor 400 receives as input a personal transcript 402 of the personal transcripts 108 associated with a personal video 302 of the set of personal videos 106. The text pre-processor 400 implements a text processor 404 to pre-process raw natural language text from the personal transcript 402 in preparation for text feature extraction. Examples of some common pre-processing operations include tokenization which breaks the natural language text down into individual words or tokens, removing top words that are very common in language and do not carry much meaning (e.g., "a", "an", "the", "and", "of", "in", etc.), stemming or lemmatization to reduce words to their base form or root, removing special characters and digits from the text, vectorization to convert the text into a numerical format that can be used as input to the text encoder 112, and so forth. Vectorization is usually done using techniques such as bag-of-words or term frequency (TF) and inverse document frequency (IDF) (TD-IDF), which represent the text as a vector of word frequencies or weights.

The text pre-processor 400 selects one or more text features 406 from the pre-processed text information from the personal transcript 402. Examples of text features 406 that are present in the personal transcript 402 include without limitation individual words, a sentence, a phrase, a paragraph, semantic information, context information, time information (e.g., timestamps associated with the personal video 302), a part of speech (e.g. noun, verb, adjective) of each word, a frequency of words, a length of sentences, use of punctuation marks (e.g., such as periods, commas, and exclamation points), use of capital letters in a word (e.g., a proper noun), spelling and grammar, and other text features from the personal transcript 402. These are just a few examples of the many text features that can be present in the personal transcript 402. The personal VLM 104 uses combinations of these and other text features to support search and other tasks related to natural language processing. A feature processor 408 optionally processes the text features 406 to scale the text features 406 to a standard size or format to match the input dimensions of the personal VLM 104.

The text encoder 112 receives as input the processed text features 410. The text encoder 112 passes the processed text features 410 through an ANN 412. In one embodiment, the ANN 412 is a transformer-based neural network, such as Generative Pre-trained Transformer (GPT) or Bidirectional Encoder Representations from Transformers (BERT). The transformer-based neural network is trained to encode natural language text into the text embeddings 116 that are mapped to the shared embedding space 118.

In various embodiments, the image encoder 110 and the text encoder 112 of the personal VLM 104 are modified, augmented or adapted versions of a pre-trained VLM, such as the Contrastive Language-Image Pre-Training (CLIP) model. The CLIP model is a neural network architecture that can process both visual and textual features. In CLIP, the input to the CLIP text encoder is a sequence of token embeddings, where each token is mapped to a continuous vector representation using a pre-trained word embedding model such as global vectors (GloVe) or fastText. Alternatively, the mapping is learned rather than pre-trained. For example, the mapping is implemented as a lookup table in CLIP, where the personal VLM 104 learns new entries in this lookup table. The CLIP model uses an attention mechanism that allows it to focus on different parts of the input text sequence during processing. Specifically, the CLIP text encoder uses a variant of the transformer architecture with multi-head self-attention, which allows it to attend to different parts of the input sequence in parallel. The CLIP text encoder is jointly trained with the CLIP image encoder that processes image features. This means that the CLIP model is trained to associate the text and image features with each other, allowing it to perform cross-modal tasks such as image captioning or image retrieval based on natural language queries. The CLIP model is trained using a contrastive learning approach, where it learns to distinguish between matching and non-matching pairs of text and image features. This encourages the model to learn semantically meaningful representations that capture the relationships between different modalities. The CLIP text encoder processes text features by first converting the text into a sequence of token embeddings, then applying a multi-head self-attention mechanism to capture dependencies between different parts of the input sequence. The CLIP text encoder is trained jointly with the CLIP image encoder using a contrastive learning approach, which encourages it to learn semantically meaningful representations of both text and image features.

Some embodiments implement fine-tuning techniques to modify, augment or adapt a pre-trained VLM such as the CLIP model to recognize new word embeddings. One embodiment, for example, modifies the CLIP model by changing an input space of the CLIP model. This provides better performance relative to techniques that change an output space of the CLIP model. The difference between techniques to change an input space versus an output space of the CLIP model is described with reference to FIG. 5.

Figure 5:
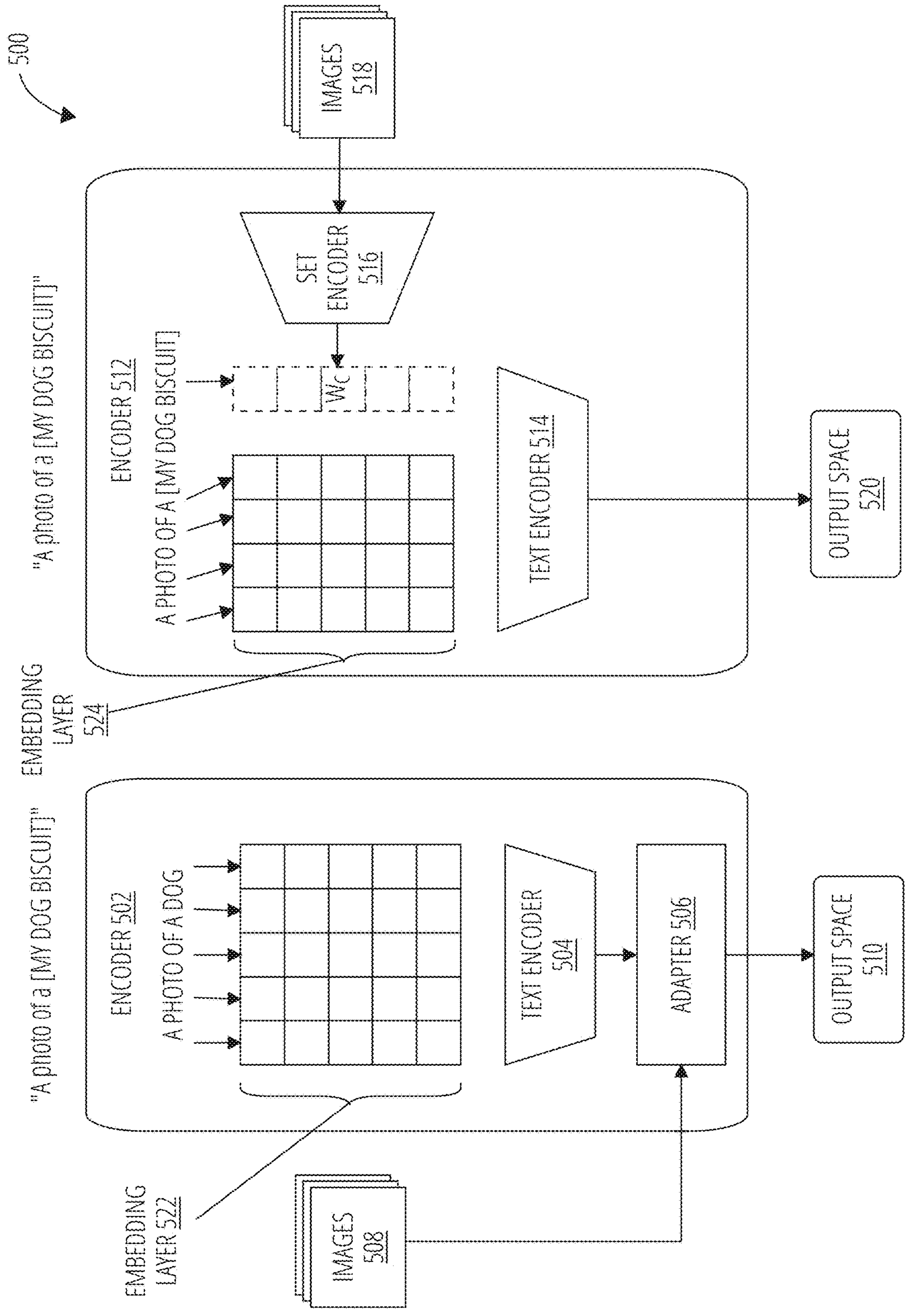
FIG. 5 illustrates an apparatus in accordance with one embodiment.

FIG. 5 illustrates an apparatus 500. The apparatus 500 illustrates examples of two different encoders, an encoder 502 and an encoder 512. The encoder 502 uses an adapter layer to change an output space of a pre-trained VLM. The encoder 512 uses a set encoder to change an input space of a pre-trained VLM. In both cases, the pre-trained VLM is a CLIP model.

The encoder 502 is an example of an encoder based on learning a residual adapter layer over output from a CLIP text encoder 504. As depicted in FIG. 5, the encoder 502 receives a search query with a new concept such as "A photo of a [MY DOG BISCUIT]." The encoder 502 encodes the search query using a CLIP encoder network that includes the embedding layer 522 and the text encoder 504. The CLIP encoder network is kept frozen during this process. An adapter 506 is applied to the output of the text encoder 504. The adapter 506 appends additional embedding layers following the text encoder 504 to process the images 508 to learn [MY DOG BISCUIT], thereby changing the output space 510. The adapter 506 is trained for a classification task with labeled data and a templated text query for "A photo of a [concept-type]."

The encoder 502 has significant limitations. For instance, the encoder 502 focuses on classifying images using a narrow vocabulary. The encoder 502 overrides the output representation of the CLIP text encoder 504, leading to a change in their mappings from an input space to an output space 510. This type of architecture tends to be brittle and fails when its input sentences deviate from the template used for training. This is because the adapter 506 overrides the output representation of the encoder 502, and therefore training it with very few examples reduces its generalization power.

Taking a different approach, the encoder 512 does not override output from a CLIP text encoder 514. Rather, the encoder 512 is an example of an encoder that learns a soft prefix to improve accuracy in a classification task. As depicted in FIG. 5, the encoder 512 receives a same search query with a new concept such as "A photo of a [MY DOG BISCUIT]." The text encoder 504 encodes the search query using a CLIP encoder network that includes the embedding layer 524 and the text encoder 514. As with the encoder 502, the CLIP encoder network is kept frozen during this process. However, rather than applying an adapter 506 to the output of the text encoder 514, the encoder 512 uses backpropagation and contrastive-learning objectives to augment the text encoder 514 with a set of novel personal instance tokens using the images 518. Alternatively, the encoder 512 uses a set encoder 516 to augment the text encoder 514 with a set of novel personal instance tokens using the images 518. The set encoder 516 processes input images 518 and it defines new embedded instances for [MY DOG BISCUIT] in the existing input space for CLIP, thereby leaving the output space 520 unchanged.

The encoder 512 operates based on the assumption that the CLIP text encoder 514 has a vocabulary that is sufficiently diverse enough for reasoning about new personalized concepts. The encoder 512 attempts to find the right word embedding representation for any new personalized concept. To this end, the encoder 504 learns a representation which is then used in any downstream tasks. The encoder 512 expands a CLIP vocabulary rather than narrowing it. The encoder 512 does not change the pre-trained mapping of an input space to an output space 520, but rather enriches its input vocabulary with new concepts. This solves some of the limitations associated with the encoder 502.

In some embodiments, the encoder 136 of the personal VLM 104 uses an approach similar to the one used for the encoder 512, and it builds upon the approach to significantly improve performance of the encoder 512. In one embodiment, a model development tool starts with a CLIP model and implements a set encoder to change an input space of the CLIP model to learn new word embeddings. In another embodiment, a model development tool does not use a set encoder. Instead, the model development tool learns the personal tokens solely through back propagation and a contrastive learning objective. Examples for a model development tool that uses a set encoder are described with reference to FIGS. 6A, 6B.

Figure 6A:
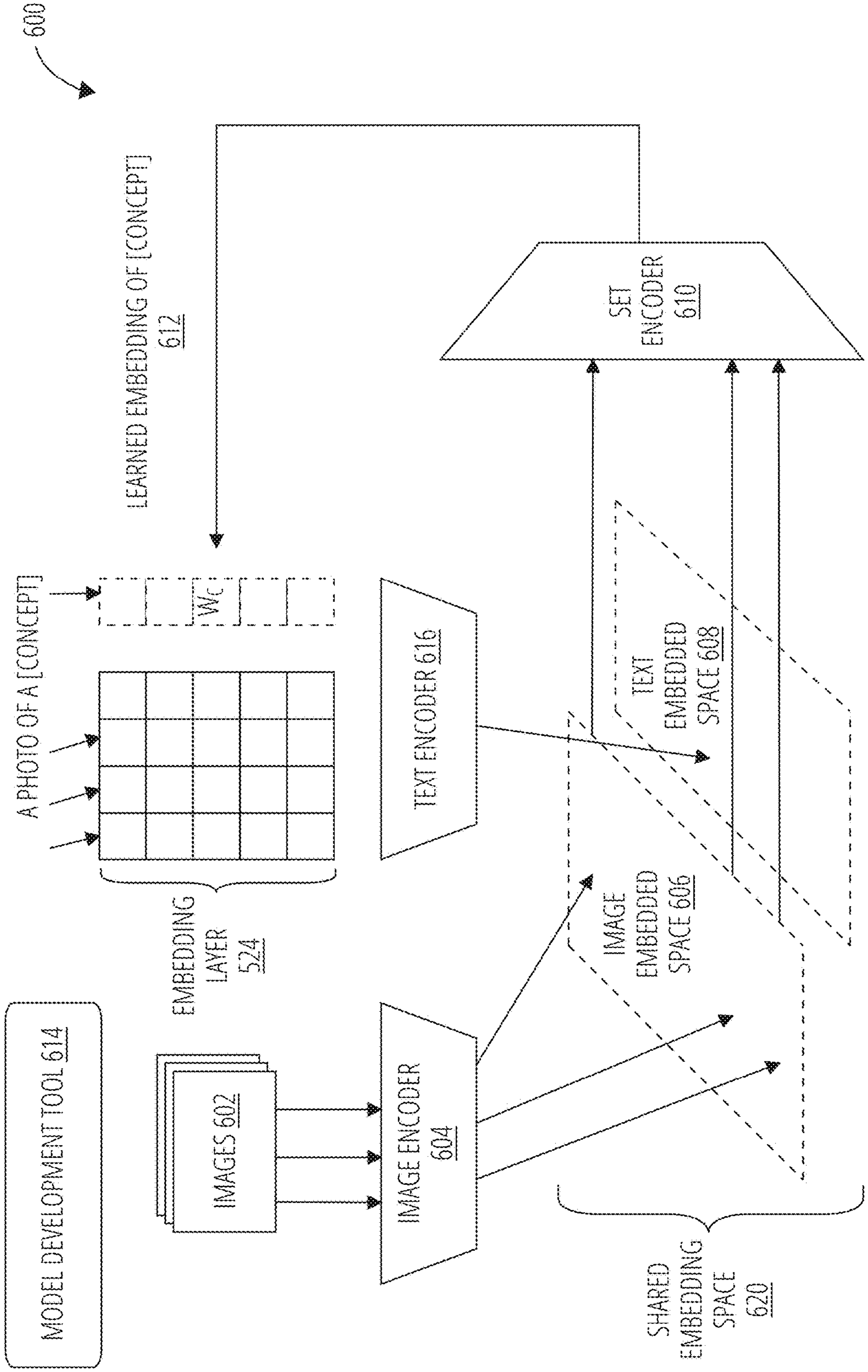
FIG. 6A illustrates an architecture in accordance with one embodiment.
Figure 6B:
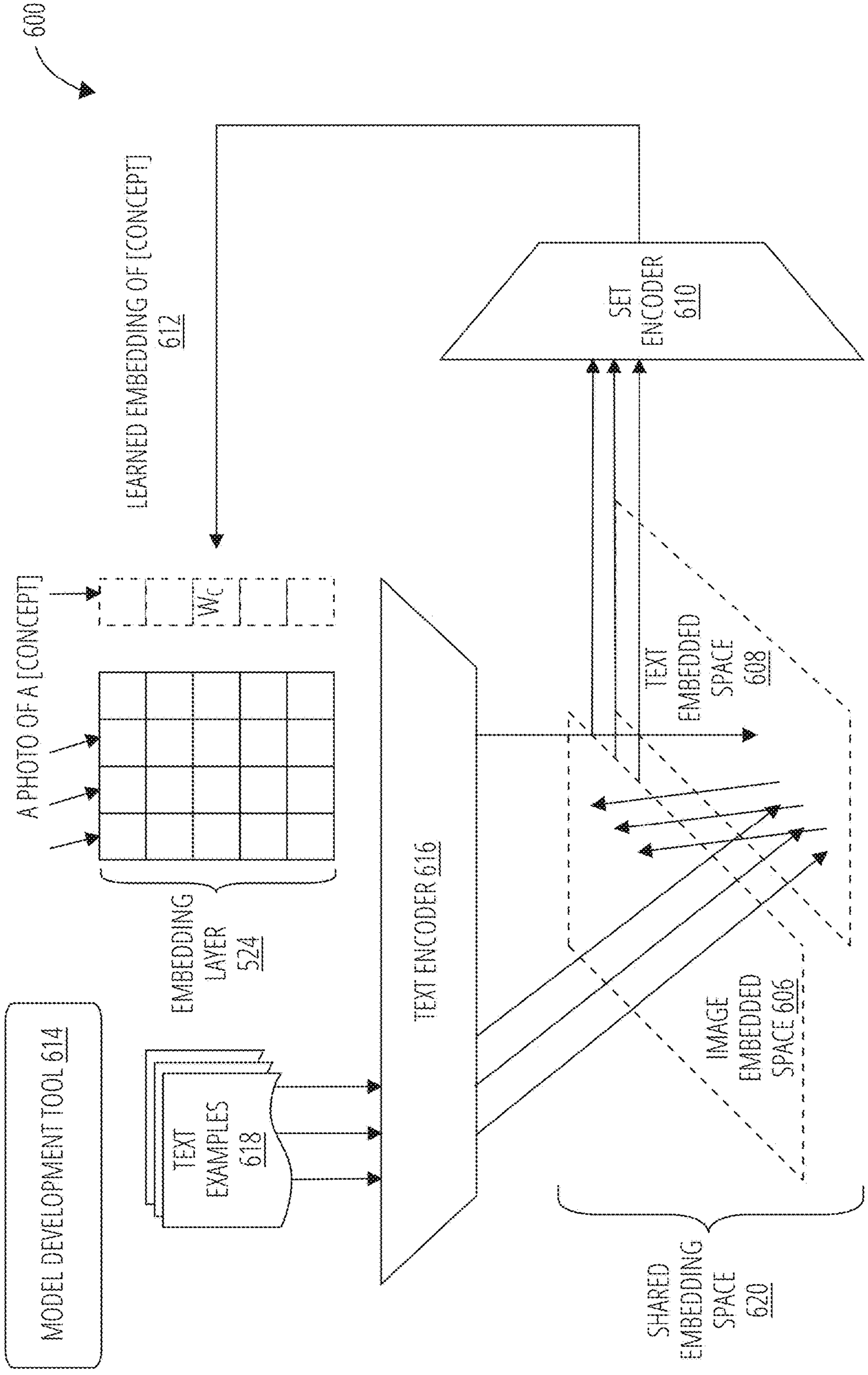
FIG. 6B illustrates an architecture in accordance with one embodiment.

FIG. 6A and FIG. 6B illustrate an architecture 600. The architecture 600 illustrates training operations for training a set encoder 610 with image examples and associated text examples from the personal videos 106 and the personal transcripts 108, respectively. In one embodiment, the trained set encoder 610 is suitable for use with the image encoder 110 and the text encoder 112 of the encoder 136 of the personal VLM 104.

As depicted in FIG. 6A, a model development tool 614 trains a set encoder 610 to map output embeddings from a CLIP image encoder 604 and a CLIP text encoder 616 to a code in an input space of the embedding layer 524. More particularly, the CLIP image encoder 604 and the CLIP text encoder 616 both output embeddings to a shared embedding space 620. The shared embedding space 620 comprises an image embedded space 606 and a text embedded space 608.

The CLIP image encoder 604 receives as input a set of images 602, which are images extracted from one or more of the personal videos 106. The CLIP image encoder 604 encodes the images 602 and maps the output embeddings to the image embedded space 606 of the shared embedding space 620. Meanwhile, a text string such as "A photo of a [CONCEPT]" is input into a CLIP text encoder 616, which is similar to the CLIP text encoder 514. The CLIP text encoder 616 encodes the text string and maps the output embeddings to the text embedded space 608 of the shared embedding space 620. The set encoder 610 takes as input the output embeddings of the CLIP image encoder 604 and the CLIP text encoder 616, and maps them to a code, denoted as learned embedding of [CONCEPT] 612, in the input space of the CLIP text encoder 616.

In addition to the model development tool 614 training the set encoder 516 on images 602, the model development tool 614 also trains the set encoder 610 with text examples 618 extracted from the personal transcripts 108 that are associated with the images extracted from the personal videos 106, as shown in FIG. 6B.

FIG. 6B illustrates a different aspect of the architecture 600. The architecture 600 illustrates training operations for training the set encoder 610 with text examples, such as sentences, from the personal transcripts 108. In one embodiment, the trained set encoder 610 is suitable for use with the text encoder 112 of the encoder 136 of the personal VLM 104.

As depicted in FIG. 6B, the model development tool 614 trains the set encoder 610 to map output embeddings from the CLIP text encoder 616 to a code in an input space of the embedding layer 524. The CLIP text encoder 616 receives as input a set of text strings with the [CONCEPT], which are text strings extracted from one or more of the personal transcripts 108 associated with the personal videos 106. The CLIP text encoder 616 encodes the text examples and maps the output to the text embedded space 608, which are associated with similar image embeddings in the image embedded space 606. Meanwhile, the CLIP text encoder 616 encodes the text string and maps the output to the text embedded space 608. The set encoder 610 takes as input the output embeddings of the CLIP text encoder 616, and maps them to the learned embedding of [CONCEPT] 612 in the input space of the CLIP text encoder 616.

The model development tool 614 alternately trains the set encoder 610 with a batch of either image examples using the architecture 600 or the sentence examples using the architecture 600 with augmented concept types. The model development tool 614 uses a cycle loss technique by mapping the code back to the output embedding of the CLIP text encoder 616 using a template sentence.

To give a specific example, assume a user wants to add a new token for "my dog Biscuit" representing her specific dog named "Biscuit" to the vocabulary of the encoder of the personal VLM 104. To add the new token, the model development tool 614 extends the vocabulary of the encoder 136 by updating a tokenizer to recognize "my dog Biscuit" as a distinct token and it assigns a unique index to it. The model development tool 614 extends the embedding layer 524 of the text encoder 112. The embedding layer 524 is a matrix where each row represents the embedding vector of a token from the vocabulary. To account for the new token, the model development tool 614 adds a new row to the embedding layer corresponding to the "my dog Biscuit" token. This new row will contain the initial embedding vector for "my dog Biscuit." The model development tool 614 fine-tunes the CLIP model on a dataset containing images of the dog named "Biscuit" and corresponding text descriptions that include the "Biscuit" token. During the fine-tuning process, the CLIP model learns to adjust the embedding vector of the "Biscuit" token so that it is closely aligned with the image embeddings of the dog named "Biscuit" in the shared embedding space 118. In this manner, the new token "Biscuit" is incorporated into the input space of the CLIP encoder, allowing the CLIP model to recognize and generate embeddings for the token in the shared embedding space. This enables the CLIP model to understand and process text containing the "Biscuit" token and perform various tasks related to the specific dog instance.

This word embedding technique used by the architecture 600 offers several advantages in expanding a vocabulary of the CLIP model to learn new concepts. However, it suffers from overfitting due to sparse amounts of labeled training data for a new concept, such as a personal instance of "my dog Biscuit." Overfitting is a common problem in machine learning where a model is trained too well on the training data, to the point that it starts to memorize the data instead of learning from it. As a result, the model performs poorly on new, unseen data, despite achieving high accuracy on the training data. Overfitting can cause the model to capture random noise or idiosyncrasies in the training data that are not relevant to the underlying patterns, such as visual features from a background scene, thereby resulting in poor generalization to new data.

Embodiments attempt to solve the overfitting problem using various meta-learning techniques to meta-personalize the CLIP model prior to adding new personal concepts to the input space of the CLIP model. These meta-personalization techniques are described with reference to FIG. 7.

Figure 7:
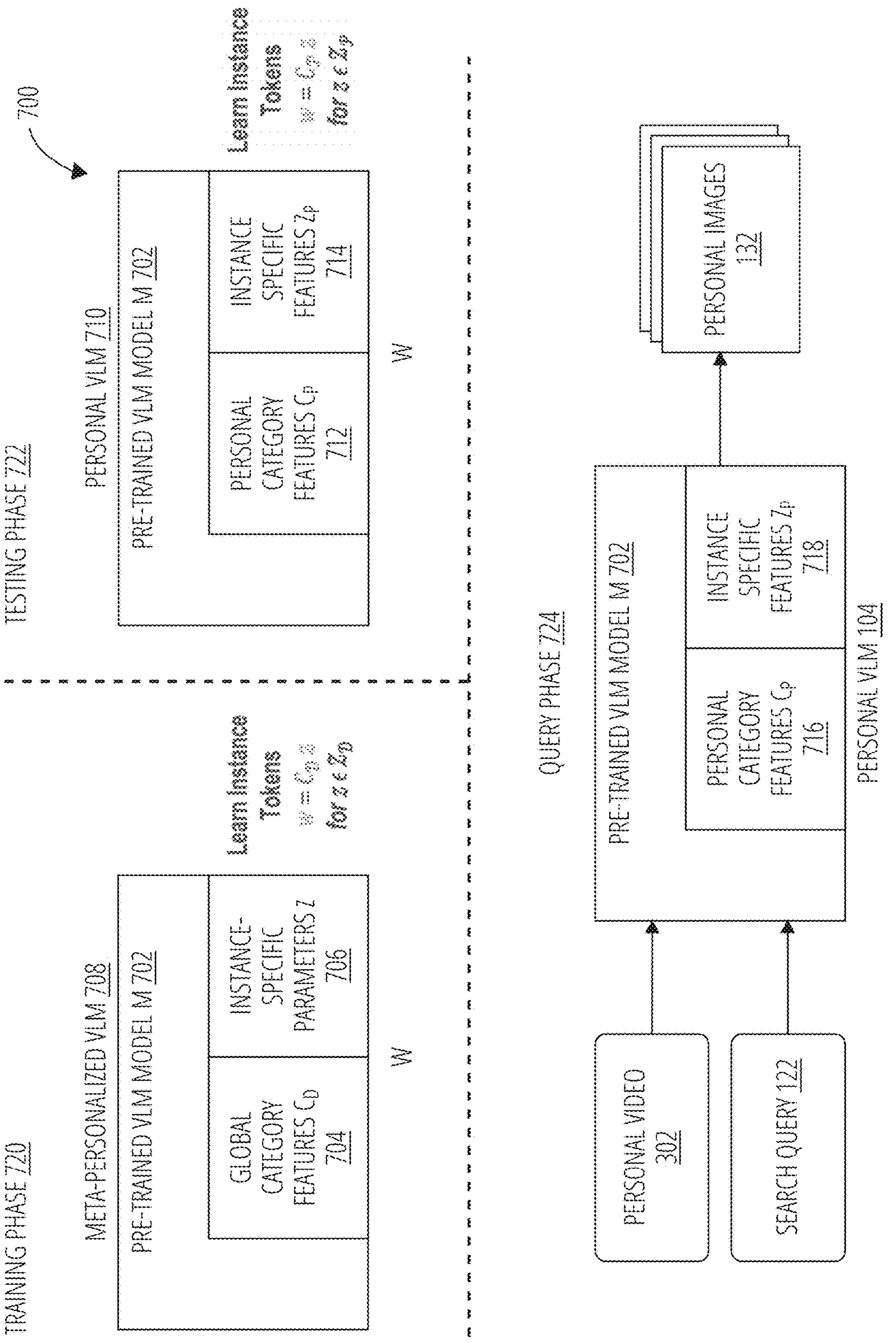
FIG. 7 illustrates a model architecture in accordance with one embodiment.

FIG. 7 illustrates a model architecture 700 suitable for training and testing a pre-trained VLM model M 702 to generate the personal VLM 104. During a training phase 720, the model development tool 614 meta-personalizes the pre-trained VLM model M 702 to obtain a meta-personalized VLM 708. During a testing phase 722, the model development tool 614 performs test-time personalization of the meta-personalized VLM 708 to obtain a personal VLM 710. During a query phase 724, the personal VLM 710 is deployed as the personal VLM 104 for the multimodal search system 100. In one embodiment, for example, the pre-trained VLM model M 702 is a CLIP model that is frozen during the training phase 720 and the testing phase 722. Each phase is discussed in more detail below.

As previously discussed, the pre-trained VLM model M 702 allows category-level queries. However, the pre-trained VLM model M 702 currently struggles with personalized searches for moments in a video where a specific object instance such as "My dog Biscuit" appears. To address this problem, the model development tool 614 meta-personalizes the pre-trained VLM model M 702 so that the pre-trained VLM model M 702 learns how to learn to personalize the pre-trained VLM model M 702 at test time to search in the personal videos 106. The model development tool 614 extends a token vocabulary for the pre-trained VLM model M 702 by learning novel word embeddings specific to each instance. To capture only instance-specific features, each instance embedding is represented as a combination of shared and learned global category features.

The model development tool 614 causes the pre-trained VLM model M 702 to learn such personalization without explicit human supervision. The model development tool 614 implements a mining algorithm to automatically identify moments of named visual instances in the personal videos 106 using personal transcripts 108 and vision-language similarity in the shared embedding space 118 of the pre-trained VLM model M 702.

The resulting personal VLM 104 offers improved performance using a "This-Is-My" dataset as a personal video instance retrieval benchmark. For instance, the personal VLM 104 obtains a 15% relative improvement over conventional VLMs based on evaluations of the personal VLM 104 using the This-Is-My dataset.

As depicted in FIG. 7, the model development tool 614 augments the frozen pre-trained VLM model M 702 with novel personal instance tokens w=Cz that are a combination of global category features C with instance-specific weights $z \in Z$, where $w=C_D z$ for $z \in Z_D$. During the training phase 720, the model development tool 614 trains the pre-trained VLM model M 702 to pre-learn global category features $C_D$ on a large set of automatically mined named personal instances in videos. This process is referred to as Meta-Personalization. During the testing phase 722, the model development tool 614 adapts the meta-personalized category features $C_D$ at test-time and learns novel instance weights $z \in Z_P$ to represent a user's personal instances via $w=C_{pz}$. During the query phase 724, the model development tool 614 leverages the frozen personalized instance tokens w in natural language search queries 122 at query time.

The personal VLM 104 learns representations of personal items in the personal videos 106 that enable retrieval through natural language search queries, such as search query 122. The personal VLM 104 adapts the pre-trained VLM model M 702 with one or few examples of a named instance. The personal VLM 104 learns to personalize given a large corpus of named instances mined from videos with transcriptions. The model development tool 614 uses a mining algorithm to automatically mine a collection D of named instances from personal videos 106 with personal transcripts 108 for meta-personalization.

During the training phase 720, the model development tool 614 uses collection D to train the pre-trained VLM model M 702 denoted as $M_{C,z}$ that includes global category features $C_D$ 704 and instance-specific parameters z 706. The global category features C are lightweight and shared across all instances. Given a natural language query u and a video v, the model $M_{C,z}$ returns a score $M_{C,z}(u, v)$. During meta-personalization, given a training loss L, the model development tool 614 jointly optimizes the loss over the global category features C and instance parameters Z for each named instance in the collection D. This is formally shown in EQUATION (1).

$$(C_D, Z_D) \in \arg\min \sum_{z \in Z} L(C, z). \qquad \text{EQUATION (1)}$$

Note that here the instance-specific parameters $Z_D$ learnt via EQUATION (1) are discarded while the global category features $C_D$ are kept as the meta-personalized part of the model. The global category features $C_D$ capture information shared across instances relevant to the personalization task.

During the testing phase 722, the model development tool 614 performs test time personalization of the model using a set of named video instances P, which are automatically mined from the personal videos 106 (e.g., a user's personal video library), to personalize the model to a person's instances. Here each instance is represented by only one or few examples. To avoid overfitting, the model development tool 614 optimizes the training loss L over the global category features C and the set of instance parameters Z for all instances in the personal set P starting from the pre-trained global category features $C_D$ and a random Z. The model development tool 614 obtains the personalized model parameters $(C_P, Z_P)$ as EQUATION (2).

$$(C_P, Z_P) \in \arg\min \sum_{z \in Z} L(C, z). \qquad \text{EQUATION (2)}$$

The model development tool 614 keeps both $C_P$ and $Z_P$.

In the query phase 724, the multimodal search system 100 receives a search query 122 and performs retrieval over a potentially large dataset using the test-time personalized model $M_{Cp,z}$(where $z \in Z_P$). The personal VLM 104 outputs a search result 134 with a set of personal images 132.

The model development tool 614 uses a mining algorithm to mine the collection D and the collection P. The mining algorithm will be described with reference to FIG. 8.

Figure 8:
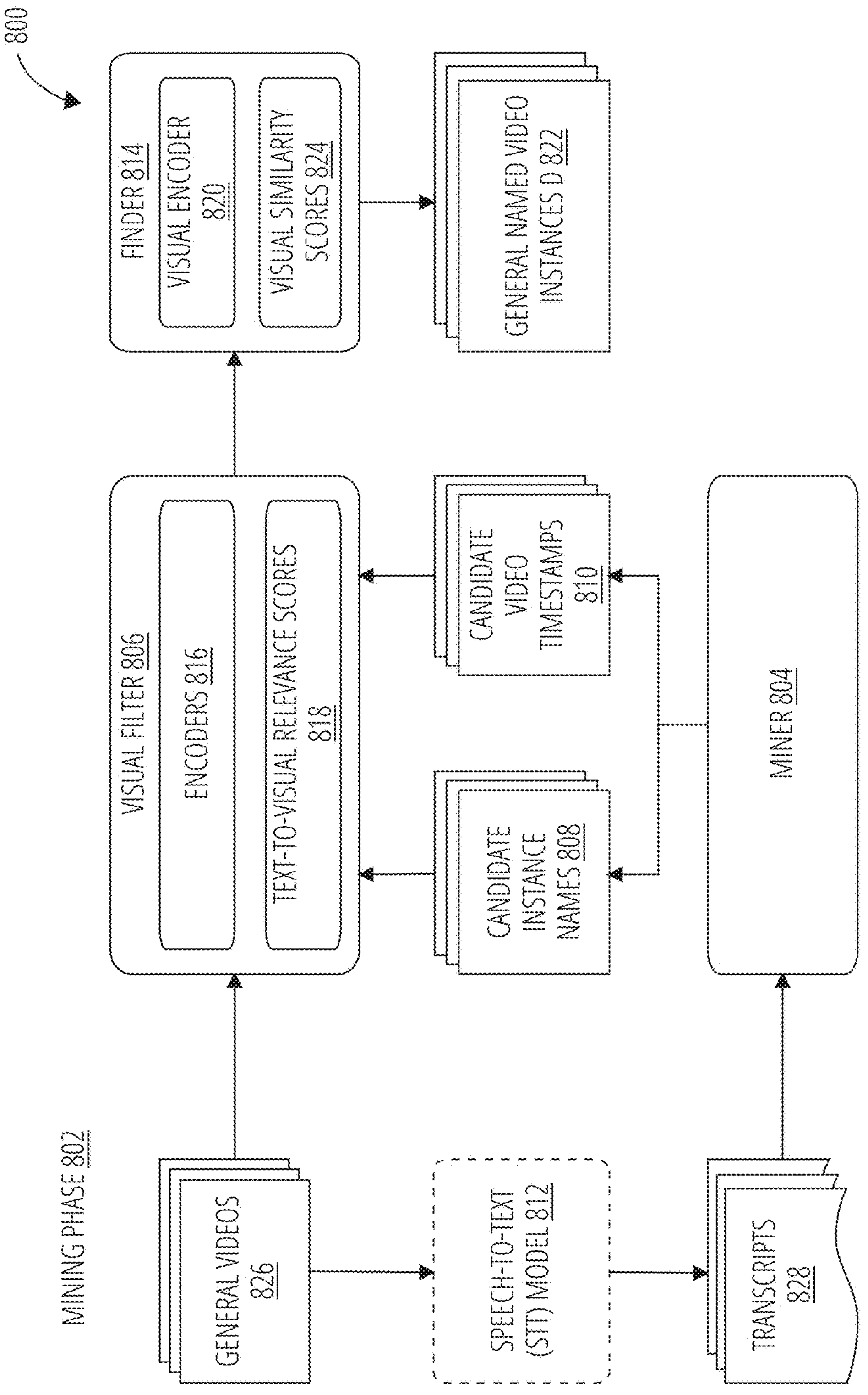
FIG. 8 illustrates a first mining system in accordance with one embodiment.

FIG. 8 illustrates a mining system 800. During a mining phase 802, the model development tool 614 uses the mining system 800 to perform automatic mining of named instances in general videos 826 to identify personal instances without explicit supervision. The mining system 800 leverages a collection of general videos 826 from the web along with their corresponding time-aligned transcripts 828. The time-aligned transcripts 828 can be automatically generated through a speech-to-text (STT) model 812. A miner 804 mines this data for a set of moments (i.e., a collection of video shots) depicting a referred personal instance in the transcripts 828 without the need for manual annotation. The model development tool 614 uses these moments for training the meta-personalized VLM 708.

In order to spot named instances, the miner 804 finds moments where candidate personal instances are mentioned in videos. The miner 804 does this by searching for possessive text patterns, such as "This is my *" in a corpus of time-aligned video transcripts 828. Other examples of possessive text patterns include <this is my>, <this is our>, <this is his>, <this is her>, <this is their>, <these are my>, <these are our>, <these are his>, <these are her>, <these are their>, and other patterns. The string matching process outputs a list of candidate instance names * associated with video timestamps t*. In one embodiment, the miner 804 keeps up to four words after a possessive text pattern is matched based on text-visual similarity. That way, the miner 804 retrieves simple named instances such as "This is my dog" (*=dog) but also complex ones like "This is my favorite CHANEL classic handbag" (*=CHANEL classic handbag). Note also that a single video might include multiple string matches. The miner 804 outputs a set of candidate instance names 808 and a set of candidate video timestamps 810 to a visual filter 806.

The miner 804 only searches for potential instances using the transcripts 828, yielding many string matches that are non-visual, i.e., the strings do not describe the visible content in the video. For instance, assume an example video includes two matches: (1) "This is our time to talk about" at time 1:30 and "This is my fender guitar" at time 3:25. The first match is a non-visual instance.

The mining system 800 uses the visual filter 806 to filter out non-visual instances. The visual filter 806 computes text-to-visual relevance scores 818 between an instance name (e.g., fender guitar) and the neighboring shots around the time when the instance is mentioned. The visual filter 806 adds neighboring shots to cover cases where the named instances are shown just before or after they are mentioned. Formally, given a sequence of m video shots $S=[s1, \ldots, s_m]$ automatically extracted by the miner 804, the visual filter 806 finds the shot $s_t$* that overlaps with t*, which is the time when the instance was mentioned.

The visual filter 806 forms a set of candidate visual references $S_t{*}=[s_{t*-1}, s_{t*}, s_{t*+1}]$ comprising a window of shots that are previous and subsequent to $s_{t*}$. The visual filter 806 then computes text-to-visual relevance scores 818 using a CLIP encoders 816. The encoding process yields L2-normalized embeddings $f_t(*)$ for the named instance and $f_v(s_i)$ for each shot $s_i \in s_{t*}$. The visual filter 806 computes $f_v(s_i)$ by averaging the visual embeddings of all frames in the corresponding shot. The visual filter 806 computes the cosine similarity between every $(f_t(*), f_v(s_i))$ pair and retain a visual reference shot s* if the highest cosine similarity is greater than 0.3. The visual filter 806 outputs a cleaned set of named instances with a corresponding visual reference to a finder 814.

For instance, assume an example video includes two matches: (1) "This is our time to talk about" at time 1:30 and "This is my fender guitar" at time 3:25. The visual filter 806 prunes out non-visual matches such as "time to talk about." In contrast, the visual filter 806 keeps visual instances such as "fender guitar" and matches it with a visual reference.

The finder 814 finds additional instance shots for the set of named instances. Since frames from a single video shot provide only limited variability in the instance appearance and could thus limit the learning, the finder 814 attempts to recover other shots from the video where that instance appears. The finder 814 leverages a CLIP visual encoder 820 to compute a visual similarity between the instance's reference shot s* and every shot $s_i \in S$. The finder 814 extracts an embedding $f_v(s^*)$ for the reference shot s* and an embedding $f_v(s_i)$ for each shot $s_i$. Similar to the visual filter 806, the finder 814 averages the CLIP embeddings of each frame belonging to a shot. Then, the finder 814 computes a cosine similarity between the embeddings for the reference shot and every candidate shot in the video. The finder 814 keeps the shots whose cosine similarity with the reference is greater than 0.9.

For example, given a named instance with a visual reference for "fender guitar," the finder 814 of the mining system 800 finds additional shots for the instance fender guitar. The instance examples not only include a clean close-up of the guitar, but also shots where the guitar is being played or held by its owner.

As a result, the mining system 800 receives a set of general videos 826 and time-aligned transcripts 828 as input, and outputs a set of general named video instances D 822 suitable for training the personal VLM 104.

Figure 9:
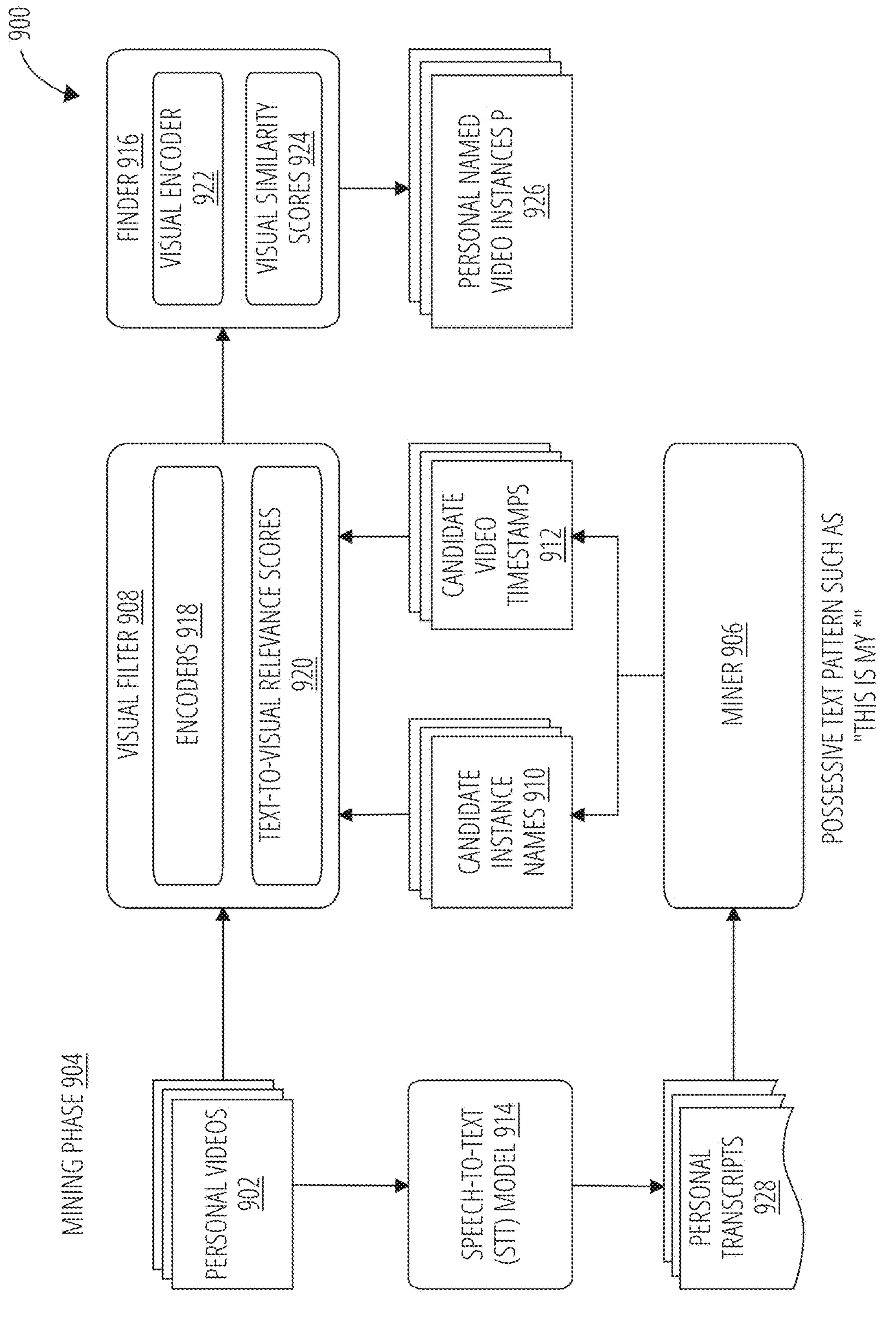
FIG. 9 illustrates a second mining system in accordance with one embodiment.

FIG. 9 illustrates a mining system 900. The mining system 900 is similar to the mining system 800. However, instead of mining for a collection D, the mining system 900 mines for a collection P.

During a mining phase 904, the model development tool 614 uses the mining system 900 to perform automatic mining of named instances in personal videos 902 to identify personal instances without explicit supervision. The mining system 900 leverages a collection of personal videos 902 from a personal video library associated with a given user, along with their corresponding time-aligned personal transcripts 928. The time-aligned personal transcripts 928 can be automatically generated through a speech-to-text (STT) model 914. A miner 906 mines this data for a set of moments (i.e., a collection of video shots) depicting a referred personal instance in the personal transcripts 928 without the need for manual annotation. The model development tool 614 uses these moments for testing the meta-personalized VLM 708 to form the personal VLM 104.

As discussed with the mining system 800, the mining system 900 includes a miner 906 to find moments where candidate personal instances are mentioned in videos. The miner 906 does this by searching for possessive text patterns, such as "This is my *" in a corpus of time-aligned personal transcripts 928. The miner 906 outputs a set of candidate instance names 910 and a set of candidate video timestamps 912 to a visual filter 908. The visual filter 908 filters out non-visual instances using encoders 918 to compute text-to-visual relevance scores 920, and outputs a set of named instances to a finder 916. The finder 916 searches for additional instance shots for the set of named instances, and it outputs a set of personal named video instances P 926.

As a result, the mining system 900 receives a set of personal videos 902 and a set of time-aligned personal transcripts 928, and output a set of personal named video instances P 926 suitable for testing the personal VLM 104.

Figure 10:
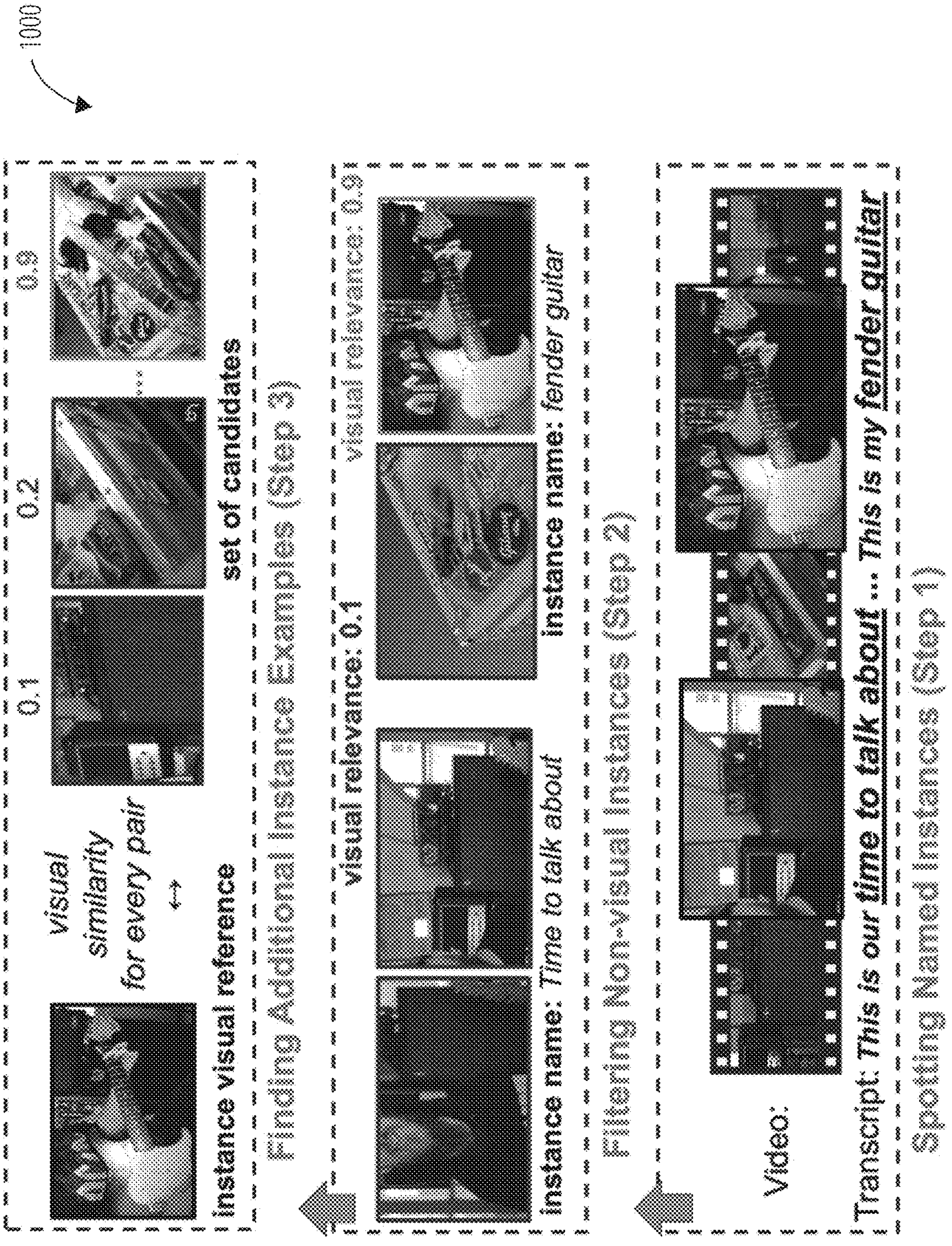
FIG. 10 illustrates an example of a mining system in accordance with one embodiment.

FIG. 10 illustrates an operating environment 1000 suitable for the mining system 800 or the mining system 900. For example, the mining system 800 performs automatic mining of named instances in video for meta-personalization. The mining system 800 implements an automatic mining pipeline that includes three steps (from bottom to top). Step 1 finds named instances via string-matching of possessive patterns in video transcripts. Step 2 filters non-visual instances using text-to-visual relevance between the instance name and the video shots neighboring the named instance. Finally, Step 3 retrieves additional shots with high visual similarity to the instance reference shot.

Figure 11:
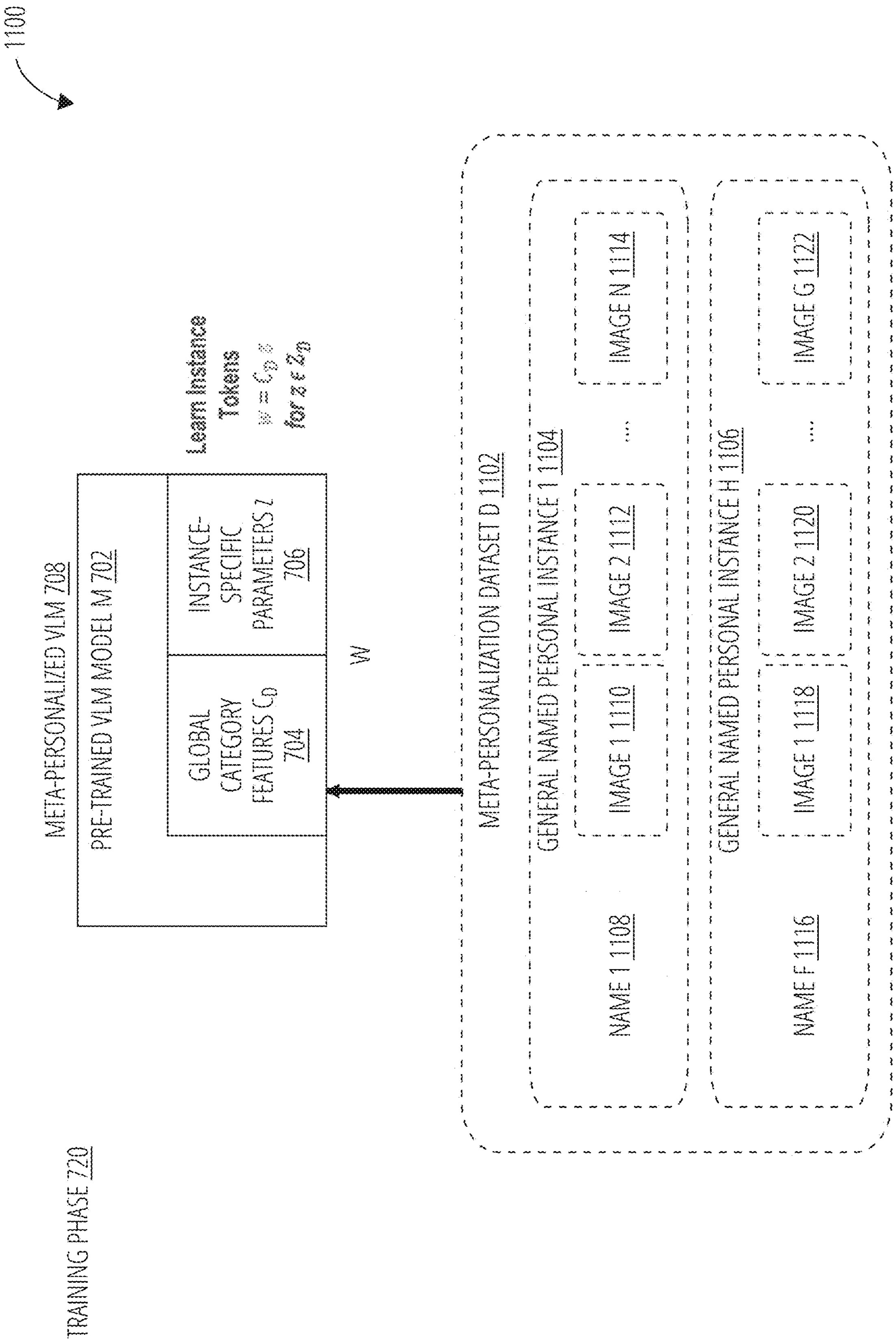
FIG. 11 illustrates a first aspect of a personal vision-language model (VLM) in accordance with one embodiment.

FIG. 11 illustrates an architecture 1100 suitable for the model development tool 614 to train the pre-trained VLM model M 702 for learning personal instance representations. As a result of the mining system 800, the model development tool 614 has a meta-personalization dataset D 1102 comprising a set of video shots $D=\{s_1, \ldots, s_n\}$ and corresponding instance IDs $Y=\{y_1, \ldots, y_n\}$, where $y_i=y_j$ if $s_i$ and $s_j$ are video shots that are assumed to contain the same instance.

As depicted FIG. 11, for example, the meta-personalization dataset D 1102 includes a set of general named personal instance 1 1104 to general named personal instance H 1106. The general named personal instance 1 1104 comprises a name 1 1108 with a set of associated images including image 1 1110, image 2 1112, . . . , to image N 1114. The general named personal instance H 1106 comprises a name F 1116 with a set of associated images including image 1 1118, image 2 1120, . . . , to image G 1122. For example, assume the general named personal instance 1 1104 comprises a name 1 1108 for "2118 Indian Scout" and the set of associated images including image 1 1110, image 2 1112, . . . , to image N 1114 are different images with different views of an Indian Scout motorcycle. In another example, assume the general named personal instance H 1106 comprises a name F 1116 for a "fender guitar" and the set of associated images including image 1 1118, image 2 1120, . . . , to image N image G 1122 are different images with different views of a fender guitar. The model development tool 614 uses this data to train the pre-trained VLM model M 702 to learn representations of the collected instances.

During the training phase 720, the model development tool 614 leverages a large-scale pre-trained VLM model M 702 such as the CLIP model and augments its language encoder with a set of novel personal instance tokens. Let $f_v(s)$ be the output of the visual encoder for shot s (computed as the average over the frame embeddings) and let $f_l(u)$ be the output of the language encoder for a natural language input $u=[v_1, \ldots, v_m]$ of m token embeddings, where $v_i \in R^d$ denote learned token embeddings of the pre-training vocabulary. Note positional embeddings are included but omitted from the notation. The model development tool 614 extends this vocabulary with novel personal instance tokens. As shown in EQUATION (3), this approach introduces a set $w^y$ of $n_w$ new personal instance tokens that represent a personal instance $y \in Y$.

$$w^y = \{w_i^y\}_{i=1}^{n_w} \qquad \text{EQUATION (3)}$$

To learn the $n_w$ new tokens and to perform personalized retrieval at test time, a search query, such as search query 122, is constructed as natural language personalized queries as Equation (4).

$$\hat{u}^p = \left[p1, \ldots, p_{k-1}, w_1^y, \ldots, w_{n_w}^y, p_{k+1}, \ldots, p_m\right], \qquad \text{EQUATION (4)}$$

where $p_i$ are token embeddings of a chosen prompt $p=[p_1, \ldots, p_m]$. During training, the prompt p corresponds to a random template of the form [An image of *], [* can be seen in this photo], [There is * in this image], and so forth. The term k denotes the position of the*placeholder for the instance tokens.

Figure 12:
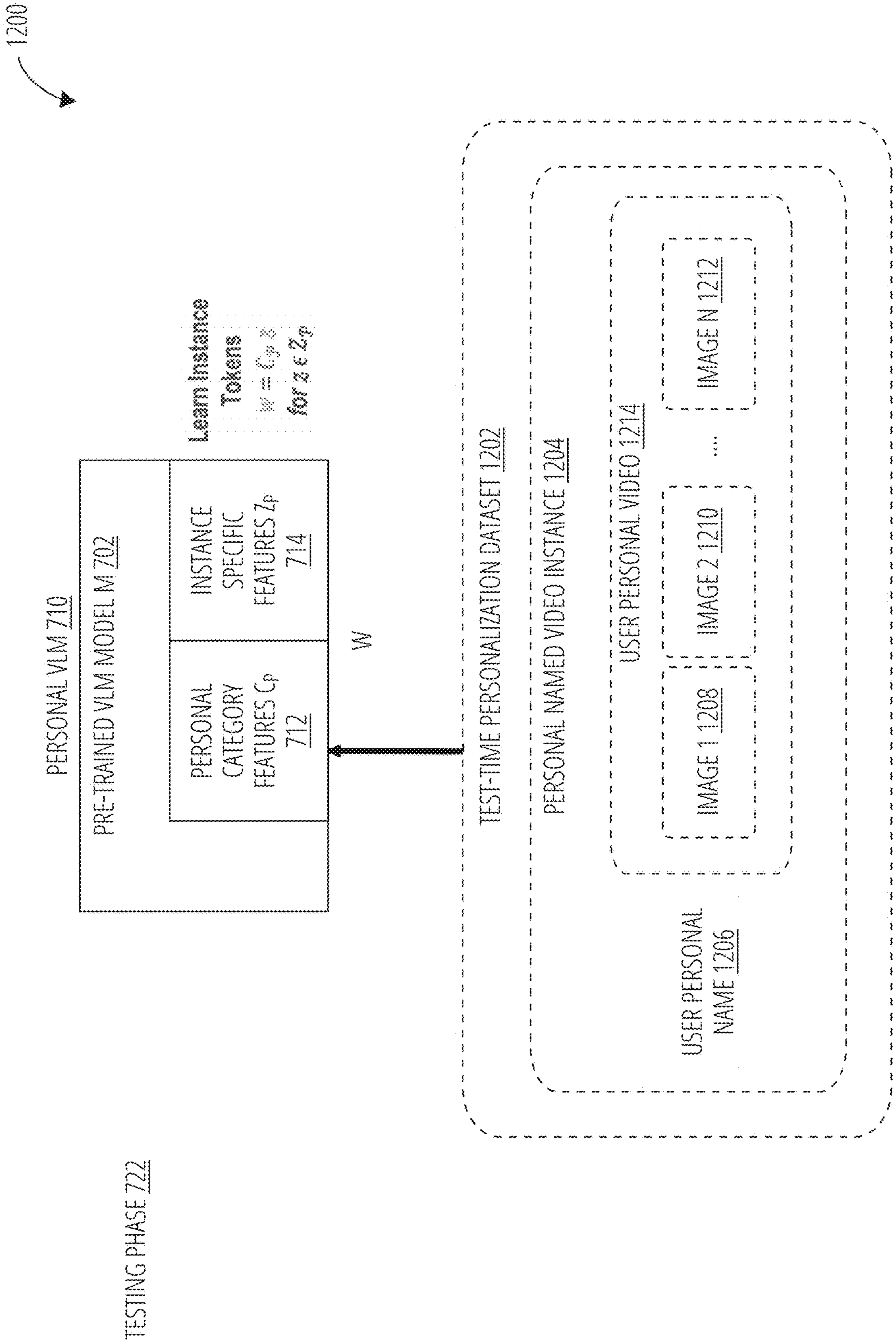
FIG. 12 illustrates a second aspect of a personal VLM in accordance with one embodiment.

FIG. 12 illustrates an architecture 1200 suitable for the model development tool 614 to test the pre-trained VLM model M 702 for learning personal instance representations.

The model development tool 614 trains the pre-trained VLM model M 702 with instances that are in combination with category features. As depicted FIG. 11, for example, a test-time personalization dataset 1202 includes a set of named video instances, such as a personal named video instance 1204. The personal named video instance 1204 comprises a user personal name 1206 and a user personal video 1214. The user personal video 1214 comprises a temporal sequence of images including image 1 1208, image 2 1210, . . . , to image N 1212. For example, assume the user personal name 1206 is a name of a dog "Zak's dog Kona" and the temporal sequence of images includes a subset of images showing different views of "Kona" in various scenes. The model development tool 614 uses this data to train the pre-trained VLM model M 702 to learn representations of the collected named video instances.

Since learning personal instance tokens from possibly very few examples runs the danger of overfitting (e.g., to nuisance features in the background), the model development tool 614 parameterizes them as shown in EQUATION (5).

$$w_i^y = C_l z_i^y \in \mathbb{R}^{dx1}, \qquad \text{EQUATION (5)}$$

where $z_i^y \in \mathbb{R}^{qx1}$ is a vector of learnable weights specific to each instance and $C_l \in \mathbb{R}^{dxq}$ is a matrix of learnable global category features, which are shared for all instances belonging to the same object category $l \in Y$ (e.g., Y={car, person, dog, . . . }) and constitute the set $C_D = \{C_l\}_{l \in Y}$. This model is illustrated in FIG. 13.

Figure 13:
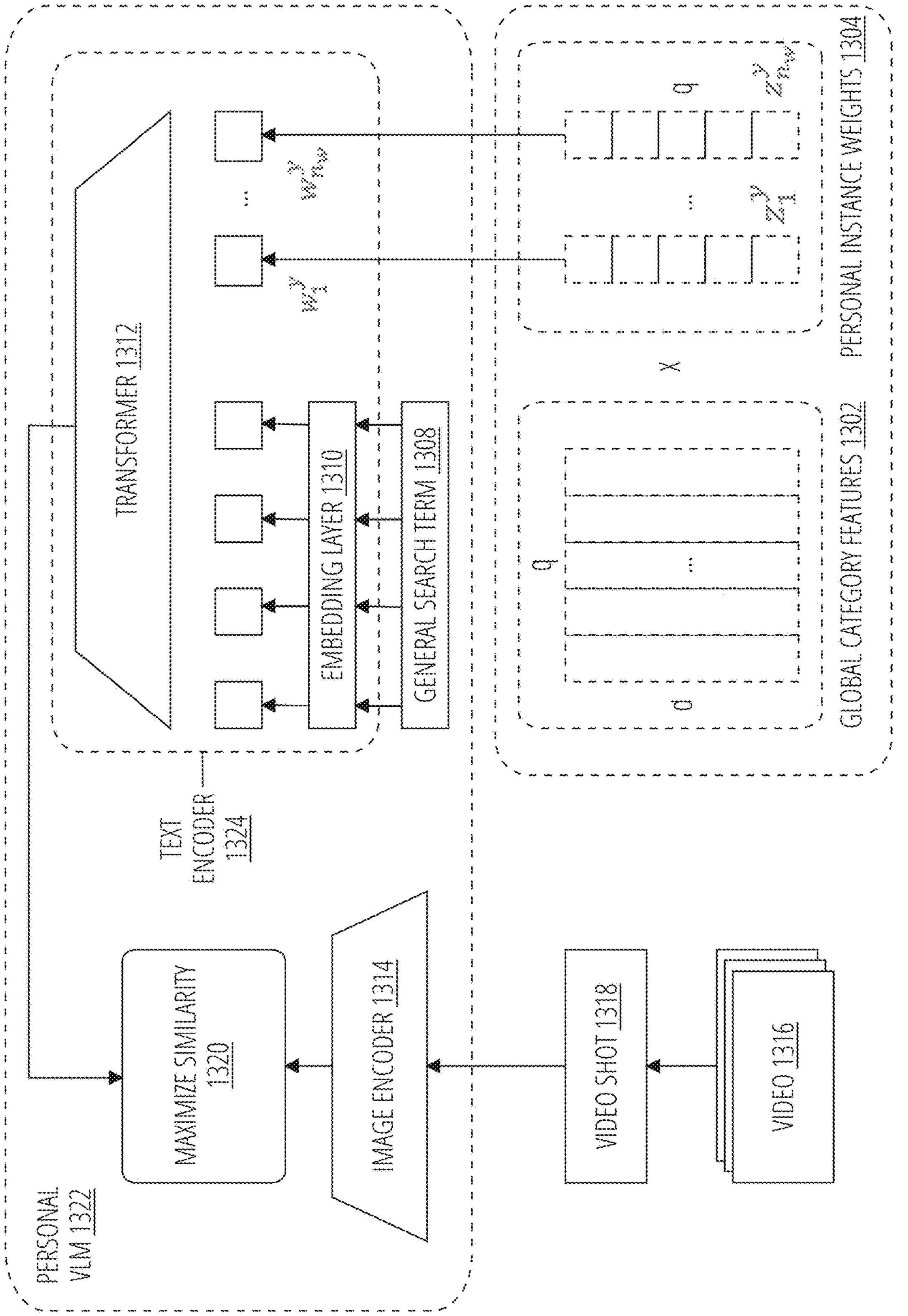
FIG. 13 illustrates a third aspect of a personal VLM in accordance with one embodiment.

FIG. 13 illustrates a model overview for the personal VLM 104. The training phase 720 and the testing phase 722 of the personal VLM 104 extends a language input vocabulary for a text encoder 1324 (e.g., the CLIP model) with $n_w$ novel instance-specific tokens $w_i^y = C_l z_i^y$, which are modeled as a linear combination of meta-personalized category features $C_l$ with weights $z_i^y$. Note that the vision and language encoders are frozen during this process.

As discussed with reference to FIG. 11, the model development tool 614 extends the vocabulary of CLIP with novel personal instance tokens. As shown in EQUATION (3), this approach introduces a set $w^y$ of $n_w$ new personal instance weights 1304 that represent a personal instance $y \in Y$. As depicted in FIG. 13, a set of personal instance tokens 1306 comprises $n_w$ novel instance-specific tokens $w_i^y = C_l z_i^y$, which are modeled as a linear combination of meta-personalized category features $C_l$ with weights $z_i^y$. The personal instance tokens 1306 comprise global category features 1302 comprising a set d of q columns $C_l$ that represent a set of shared category features. A set of personal instance weights 1304 comprises a set of q columns $z_1^y$ to $w_{n_w}^y$, which are a linear combination of meta-personalized category features $C_l$ with weights $z_i^y$.

The text encoder 1324 encodes the general search terms 124 using an embedding layer 1310. The personal instance weights 1304 extend the language input vocabulary for the text encoder 1324 using $w_1^y$ to $w_{n_w}^y$. A transformer 1312 outputs the encoded text, where it is processed with output from an image encoder 1314 to maximize similarity 1320.

The personal VLM 104 attempts to capture category-specific features during training and discard irrelevant features (e.g., about the background). Intuitively, the columns of $C_l$ correspond to attributes of an object category. For example, if the personal VLM 104 learns "car" features, these could capture their color, brand, type, age, or other features. The personal VLM 104 identifies which category matrix $C_l$ to use for an instance y using zero-shot classification, such as using vision-language similarity between instance shots and a generic prompt for the category $l \in Y$.

The personal VLM 104 learns the personal instance weights 1304 using a contrastive personal token learning process. The personal VLM 104 learns the personal instance weights 1304 represented as $w_y$ using a set of video shots 1318 from an input video 1316 containing an instance y. The image encoder 1314 encodes the input video shot 1318 and attempts to maximize similarity 1320 between the encoded video shot and the encoded text from the text encoder 1324.

To this end, let $\psi_i := f_v(s_i)$ be an encoding of a video shot $s_i$, i.e., the average frame encoding of all frames in the shot, and let $$\phi i := f_l(\hat{u}_i^p)$$

denote the language encoding of a corresponding personalized query. The personal VLM 104 learns the novel tokens $w^y$ and shared category features $C_l$ by optimizing two contrastive objectives: a language-language contrastive objective $L_l$ and a vision-language contrastive objective $L_{vl}$. The language-language objective is given by Equation (6).

$$L_l = \sum_{i \in B} \sum_{j \neq i \in B} -\mathbb{1}\{y_i = y_j\} \log\left(\frac{d(\phi_i, \phi_j)}{\sum_{k \neq 1 \in B} d(\phi_i, \phi_k)}\right), \qquad \text{EQUATION (6)}$$

where $$d(a, b) := \exp\left(\frac{1}{\lambda} \frac{a^T b}{\|a\|_2 \|b\|_2}\right)$$

measures the similarity between the feature vectors a and b, $\lambda = 0.1$ is a temperature parameter, and B is a randomly sampled training mini-batch. The vision-language objective is similarly defined as EQUATION (7).

$$L_{vl} = \sum_{i,j \in B} -\mathbb{1}\{y_i = y_j\} \log\left(\frac{d(\phi_i, \varphi_j)}{\sum_{k \in N} d(\phi_i, \varphi_k)}\right), \qquad \text{EQUATION (7)}$$

with the set of negative examples N comprising both other examples in the batch B and non-instance shots from the videos containing the named instances, i.e., shots that have low vision-language similarity. The loss is low when the encodings for video shots and personalized queries with the same instance ID are more similar than to other queries.

Including non-instance segments as negatives can help discard non-instance features such as scene background.

To further constrain the learning toward category-specific attributes, the personal VLM 104 includes a loss that maximizes the similarity between a personal instance query and a generic category query. Concretely, let $c_l$ be a category query embedding for category l (e.g., "An image of a [car]") to which instance y belongs. The personal VLM 104 includes the following category-anchoring loss shown in EQUATION (8).

$$L_c = -\sum_{i \in B} \frac{c_l^T \phi_i}{\|c_l\|_2 \|\phi_i\|_2}. \qquad \text{EQUATION (8)}$$

To summarize, the training loss L (see Equations (1) and (2)) for meta- and test-time personalization is given by EQUATION (9).

$$L = L_l + L_{vl} + \lambda_c L_c, \qquad \text{EQUATION (9)}$$

where $\lambda_c$=0.5 controls the amount of category anchoring.

Figure 14:
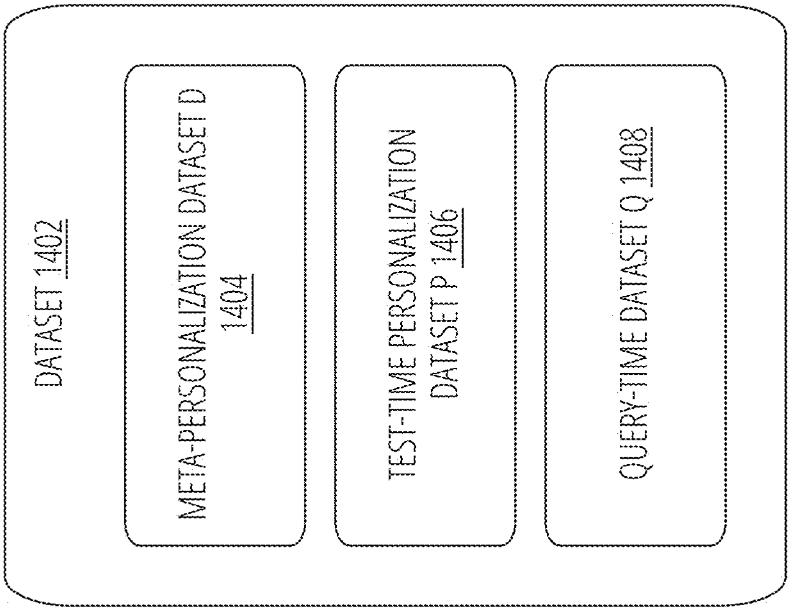
FIG. 14 illustrates a dataset for a personal VLM in accordance with one embodiment.

FIG. 14 illustrates a dataset 1402 suitable for generating and implementing the personal VLM 104. The dataset 1402 is an example of a "This-Is-My" dataset, which includes three subsets for meta-personalization, depicted as a meta-personalization dataset D 1404, a test-time personalization dataset P 1406, and a query-time dataset Q 1408.

The mining system 800 gathers the Meta-personalization dataset D 1404. The mining system 800 leverages the Merlot Reserve dataset, which contains more than 20 million videos from YouTube and their corresponding time-aligned transcripts. In practice, the mining system 800 starts from a subset of 50K randomly sampled Merlot Reserve videos. The mining system 800 spots 6058 named instances using various text possessive templates. The visual filter 806 removes 52% of instances, generating a total of 2908 named instances with a visual reference. Finally, the finder 814 mines additional samples for each instance, yielding a total of 49256 instance samples. This subset includes a wide variety of visual concepts, ranging from common objects such as bikes to rare concepts such as toaster. While the mining system 800 uses a mining pipeline that attempts to minimize noise, it is limited by the capabilities of the CLIP model to distinguish between similar object instances. For instance, when the mining system 800 finds several samples of the fender guitar instance, it includes other shots that do not correspond to the aforementioned guitar. Nevertheless, there is empirical evidence that the mining system 800 remains useful for meta-personalization purposes.

The mining system 900 gathers the Test-time personalization dataset P 1406. The mining system 900 creates a test dataset that recreates a scenario where a person wants to find when their personal instances appear in their video collection. Assume a test scenario where a person records the same visual instance, e.g., their dog, across multiple places and situations. To emulate test data for this test scenario, YouTube channels are found that frequently mention the same instance across multiple videos. While Merlot Reserve is large and diverse, only a few channels are represented with more than one video in the dataset. Instead, the test set includes a download of all videos and automatic transcripts from the channels of 15 popular YouTube bloggers. The mining system 900 mines the test set. However, some operations for the mining system 900 are manually supervised, such as the operations for visual filter 908 and finder 916 to find additional instance samples. Manual verification is performed for each instance name and its visual reference to ensure they are good matches. Additional sample shots are found across all videos in the channel by ranking them according to their visual similarity to the instance reference shot. Finally, the top 1000-scored shots are reviewed and labeled for each named instance. In total, the test subset includes 15 named instances with more than 686 labeled samples.

The personal VLM 104 is tested using a Query-time dataset Q 1408. The test is to retrieve named instances via natural language queries. The test objective is to find videos when <my dog biscuit> is grabbing a pink Frisbee. To this end, 30 instance samples are manually captioned with descriptive queries. Thus, the Query-time dataset Q 1408 includes (manually captioned) video-caption pairs containing instances from the Test-time personalization dataset P 1406.

The personal VLM 104 performs well based on experimental results. Experiments first ablate the personal VLM 104 contributions and loss design, and evaluate the personal VLM 104 in personalized instance retrieval benchmarks. Experimental results indicate that the personal VLM 104 outperforms the benchmarks and prior work by a relatively large margin.

Figure 15:
FIG. 15 illustrates an example of datasets in accordance with one embodiment.

FIG. 15 illustrates an example dataset 1500 representative of the dataset 1402. The example dataset 1500 includes examples from This-Is-My dataset, including meta-personalization dataset D 1404 (top) vs test-time personalization dataset P 1406 (bottom-left) vs query-time dataset Q 1408 (bottom-right). In the query-time dataset Q 1408 (bottom-right), testers designed a challenging video instance retrieval task. For example, in (a) the named instance (i.e., Alex's piano) is in the background and is barely visible and in (b) the background scenes in the query-time dataset Q 1408 (bottom-right) are completely different from the test-time personalization dataset P 1406 (bottom-left) depicting the same named instance.

Figure 16:
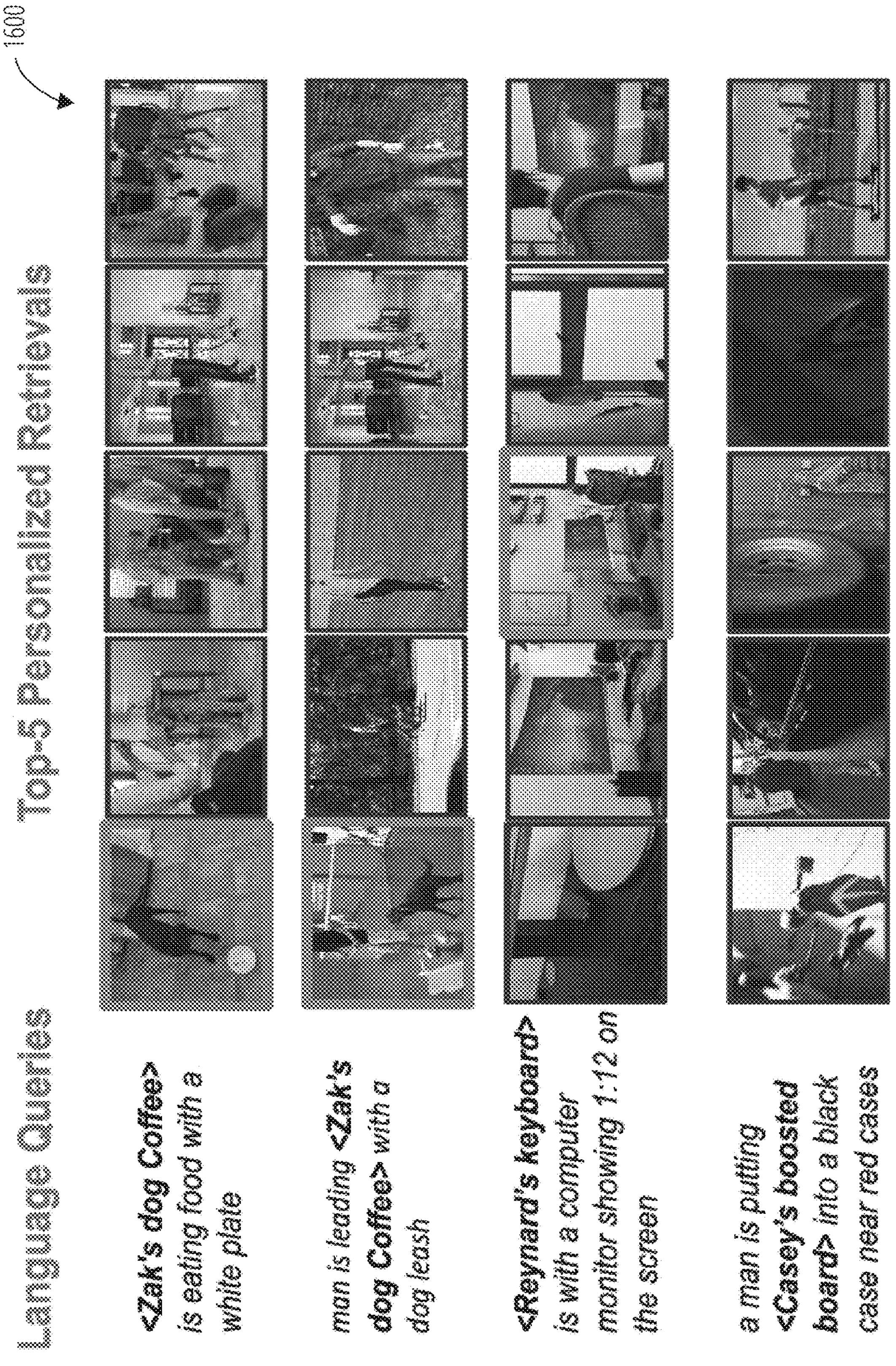
FIG. 16 illustrates an example of search results in accordance with one embodiment.

FIG. 16 illustrates an example search result 1600 representative of the search result 134. The example search result 1600 includes contextualized retrievals from This-Is-My dataset. The example search result 1600 shows personalized query-time retrievals for four This-Is-My instances. Search prompts are shown on the left and correct retrievals are highlighted in bolded borders.

Operations for the disclosed embodiments are further described with reference to the following figures. Some of the figures include a logic flow. Although such figures presented herein include a particular logic flow, the logic flow merely provides an example of how the general functionality as described herein is implemented. Further, a given logic flow does not necessarily have to be executed in the order presented unless otherwise indicated. Moreover, not all acts illustrated in a logic flow are required in some embodiments. In addition, the given logic flow is implemented by a hardware element, a software element executed by one or more processing devices, or any combination thereof. The embodiments are not limited in this context.

Figure 17:
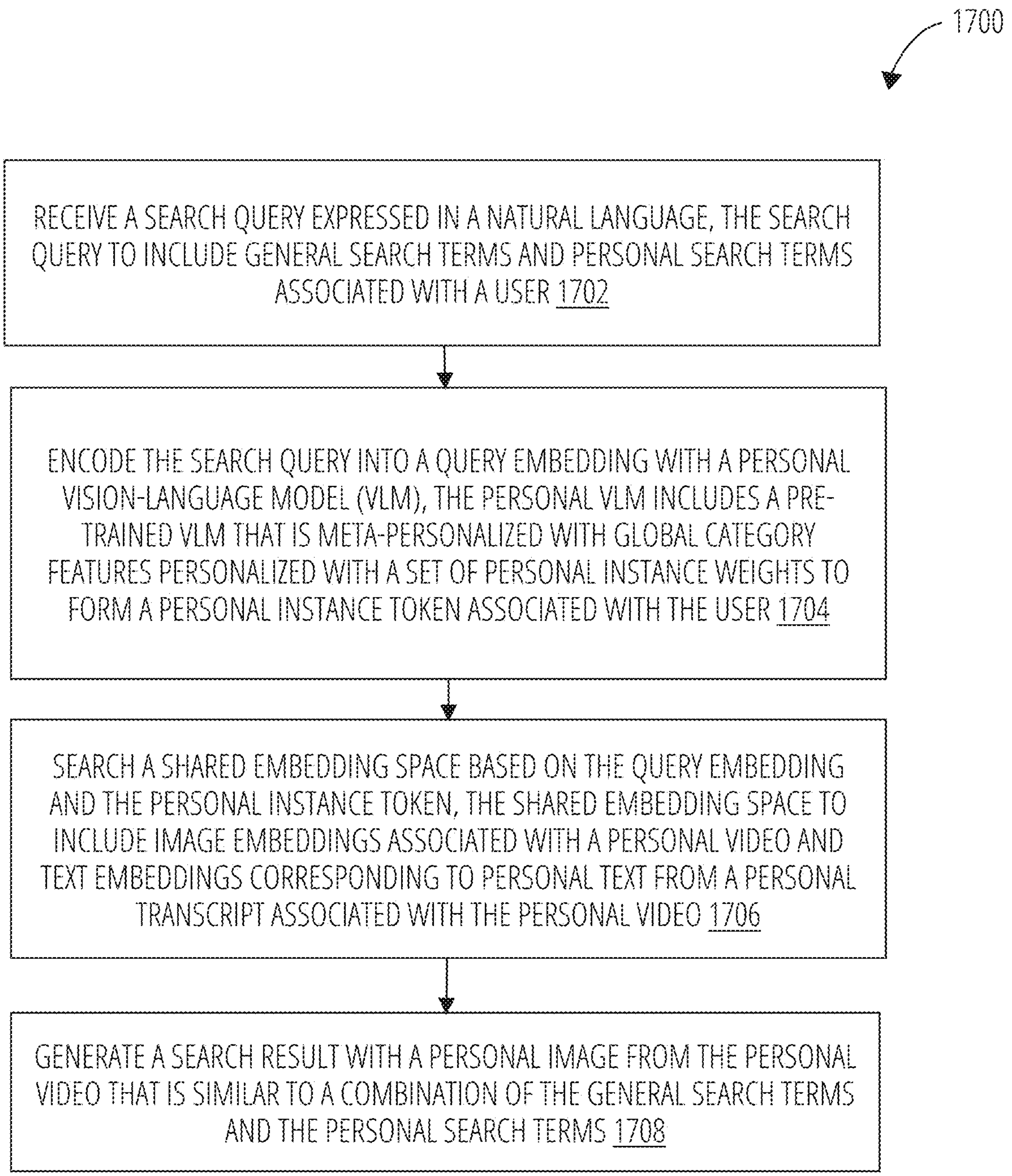
FIG. 17 illustrates a first logic flow in accordance with one embodiment.

FIG. 17 illustrates an embodiment of a logic flow 1700. The logic flow 1700 is representative of some or all of the operations executed by one or more embodiments described herein. For example, the logic flow 1700 includes some or all of the operations performed by devices or entities within the multimodal search system 100, system 2100 or the apparatus 2200. In one embodiment, the logic flow 1700 is implemented as instructions stored on a non-transitory computer-readable storage medium, such as the storage medium 2122, that when executed by the processing circuitry 2118 causes the processing circuitry 2118 to perform the described operations. The storage medium 2122 and processing circuitry 2118 may be co-located, or the instructions may be stored remotely from the processing circuitry 2118. Collectively, the storage medium 2122 and the processing circuitry 2118 may form a system.

In block 1702, the logic flow 1700 includes receiving a search query expressed in a natural language, the search query to include general search terms and personal search terms associated with a user. In block 1704, the logic flow 1700 includes encoding the search query into a query embedding with a personal vision-language model (VLM), the personal VLM includes a pre-trained VLM that is meta-personalized with global category features personalized with a set of personal instance weights to form a personal instance token associated with the user. In block 1706, the logic flow 1700 includes searching a shared embedding space based on the query embedding and the personal instance token, the shared embedding space to include image embeddings associated with a personal video and text embeddings corresponding to personal text from a personal transcript associated with the personal video. In block 1708, the logic flow 1700 includes generating a search result with a personal image from the personal video that is similar to a combination of the general search terms and the personal search terms.

With reference to the multimodal search system 100, by way of example, the image retrieval engine 102 executes on one or more processing devices. The image retrieval engine 102 receives a search query 122 expressed in a natural language, such as written in text form. The search query 122 includes general search terms 124 and personal search terms 126 associated with a user 120. The personal VLM 104 encodes the search query 122 into a query embedding 128. The personal VLM includes a pre-trained VLM that is meta-personalized with global category features 1302 personalized with a set of personal instance weights 1304 to form a personal instance token 144 associated with the user 120. The search engine 130 searches a shared embedding space 118 based on the query embedding 128 and the personal instance token 144. The shared embedding space 118 includes image embeddings 114 associated with a personal video 302 from the personal videos 106 and text embeddings 116 corresponding to personal text from a personal transcript 402 from the personal transcripts 108 associated with the personal video 302. The search engine 130 generates a search result 134 with one or more personal images 132 from the personal video 302 that is similar to a combination of the general search terms 124 and the personal search terms 126 encoded into the query embedding 128.

In one embodiment, the pre-trained VLM is a contrastive language-image pre-training (CLIP) model. As previously described, the CLIP model is a neural network architecture that can process both visual and textual features. In CLIP, the input to the CLIP text encoder is a sequence of token embeddings, where each token is mapped to a continuous vector representation using a pre-trained word embedding model such as global vectors (GloVe) or fastText. The CLIP model uses an attention mechanism that allows it to focus on different parts of the input text sequence during processing. Specifically, the CLIP text encoder uses a variant of the transformer architecture with multi-head self-attention, which allows it to attend to different parts of the input sequence in parallel. The CLIP text encoder is jointly trained with the CLIP image encoder that processes image features. This means that the CLIP model is trained to associate the text and image features with each other, allowing it to perform cross-modal tasks such as image captioning or image retrieval based on natural language queries. The CLIP model is trained using a contrastive learning approach, where it learns to distinguish between matching and non-matching pairs of text and image features. This encourages the model to learn semantically meaningful representations that capture the relationships between different modalities. The CLIP text encoder processes text features by first converting the text into a sequence of token embeddings, then applying a multi-head self-attention mechanism to capture dependencies between different parts of the input sequence. The CLIP text encoder is trained jointly with the CLIP image encoder using a contrastive learning approach, which encourages it to learn semantically meaningful representations of both text and image features.

In one embodiment, the personal instance token 144 is a linear combination of a column of a category matrix for the global category features 1302 and a vector of the personal instance weights 1304. The category matrix comprises learnable global category features shared by all personal instances in a general category.

In one embodiment, the image retrieval engine 102 receives the search query 122 expressed in the natural language, the search query 122 to include the general search terms 124 and the personal search terms 126, the personal search terms 126 associated with the personal instance token 144.

In one embodiment, the image retrieval engine 102 extracts the general search terms 124 and the personal search terms 126 from the search query 122. The personal VLM 104 encodes the general search terms 124 with an embedding layer of the text encoder 112 of the personal VLM 104 to form a text embedding 142. The personal VLM 104 maps the personal instance token 144 to the text embedding 142 to form the query embedding 128.

In one embodiment, the search engine 130 receives the query embedding 128. The search engine searches the shared embedding space 118 for candidate image embeddings 114 that are semantically similar to the query embedding 128 using a similarity measure, such as cosine similarity or dot product. The search engine 130 retrieves and ranks the candidate image embeddings 114 mapped into the shared embedding space 118 based on the similarity measure. The search engine 130 selects a top set of k candidate image embeddings 114 as the search result 134 based on the rankings.

In one embodiment, the image retrieval engine 102 sends the search result 134 to a network interface for presentation on a graphical user interface (GUI) of an electronic display of a client device.

Figure 18:
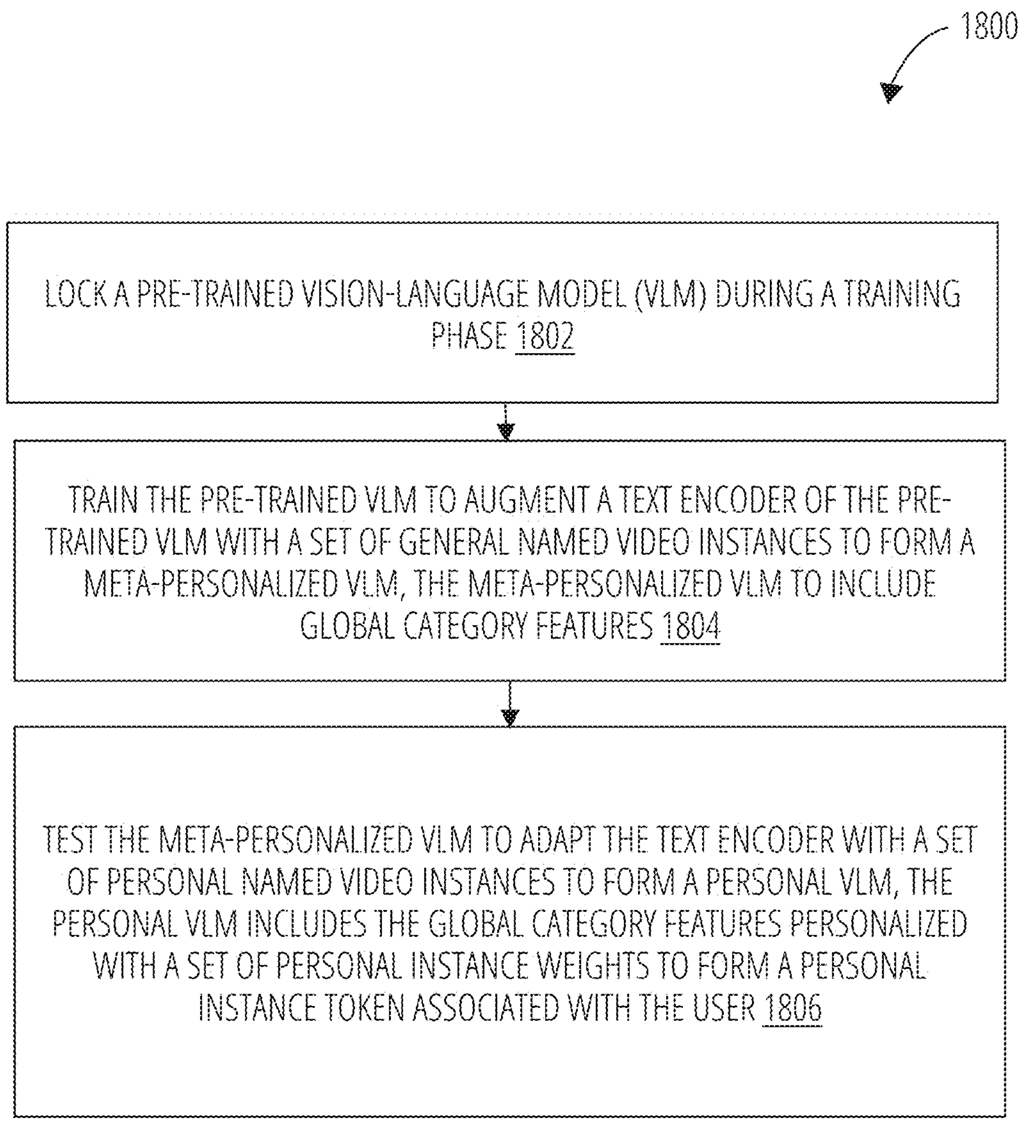
FIG. 18 illustrates a second logic flow in accordance with one embodiment.

FIG. 18 illustrates an embodiment of a logic flow 1800. The logic flow 1800 is representative of some or all of the operations executed by one or more embodiments described herein. For example, the logic flow 1800 includes some or all of the operations performed by devices or entities within the multimodal search system 100, system 2100 or the apparatus 2200. In one embodiment, the logic flow 1800 is implemented as instructions stored on a non-transitory computer-readable storage medium, such as the storage medium 2122, that when executed by the processing circuitry 2118 causes the processing circuitry 2118 to perform the described operations. The storage medium 2122 and processing circuitry 2118 may be co-located, or the instructions may be stored remotely from the processing circuitry 2118. Collectively, the storage medium 2122 and the processing circuitry 2118 may form a system.

In block 1802, the logic flow 1800 locks a pre-trained vision-language model (VLM) during a training phase. In block 1804, the logic flow 1800 trains the pre-trained VLM to augment a text encoder of the pre-trained VLM with a set of general named video instances to form a meta-personalized VLM, the meta-personalized VLM to include global category features. In block 1806, the logic flow 1800 tests the meta-personalized VLM to adapt the text encoder with a set of personal named video instances to form a personal VLM, the personal VLM to include the global category features personalized with a set of personal instance weights to form a personal instance token associated with the user.

With reference to the model architecture 700, a model development tool 614 is executed on one or more processing devices to generate the personal VLM 104 in accordance with the model architecture 700. The model development tool 614 locks a pre-trained VLM model M 702 during a training phase 720. The model development tool 614 trains the pre-trained VLM model M 702 to augment a text encoder 1324 of the pre-trained VLM model M 702 with a set of general named video instances D 822 to form a meta-personalized VLM 708. The meta-personalized VLM 708 includes a set of global category features $C_D$ 704. The model development tool 614 tests the meta-personalized VLM 708 to adapt the text encoder 1324 with a set of personal named video instances 1204 to form the personal VLM 710. The personal VLM 710 includes the global category features 1302 personalized with a set of personal instance weights 1304 to form a personal instance token 144 associated with the user 120.

In one embodiment, the pre-trained VLM is a contrastive language-image pre-training (CLIP) model. As previously described, the CLIP model is a neural network architecture that can process both visual and textual features.

In one embodiment, the model development tool 614 performs zero-shot classification to identify a column of a category matrix for the global category features 1302 to use with the personal instance weights 1304, the personal instance weights 1304 comprising a vector of learnable weights specific to a personal instance associated with the user 120.

In one embodiment, the model development tool 614 linearly combines a column of a category matrix for the global category features 1302 with the personal instance weights 1304, the personal instance weights 1304 comprising a vector of learnable weights specific to a personal instance associated with the user 120.

Figure 19:
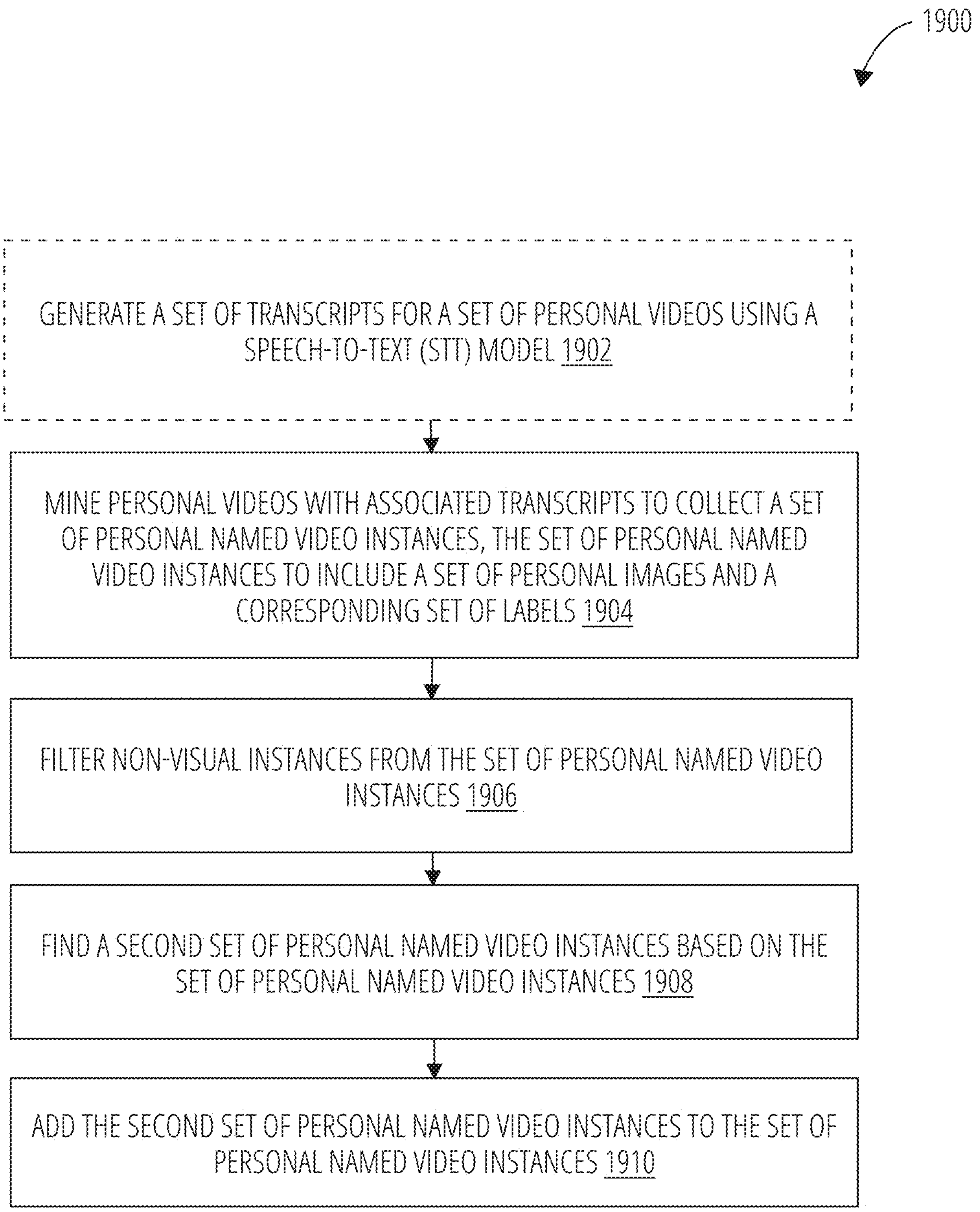
FIG. 19 illustrates a third logic flow in accordance with one embodiment.

FIG. 19 illustrates an embodiment of a logic flow 1900. The logic flow 1900 is representative of some or all of the operations executed by one or more embodiments described herein. For example, the logic flow 1900 includes some or all of the operations performed by devices or entities within the multimodal search system 100, system 2100 or the apparatus 2200. In one embodiment, the logic flow 1900 is implemented as instructions stored on a non-transitory computer-readable storage medium, such as the storage medium 2122, that when executed by the processing circuitry 2118 causes the processing circuitry 2118 to perform the described operations. The storage medium 2122 and processing circuitry 2118 may be co-located, or the instructions may be stored remotely from the processing circuitry 2118. Collectively, the storage medium 2122 and the processing circuitry 2118 may form a system.

In block 1902, the logic flow 1900 generates a set of transcripts for a set of personal videos using a speech-to-text (STT) model. In block 1904, the logic flow 1900 mines personal videos with associated transcripts to collect the set of personal named video instances, the set of personal named video instances to include a set of personal images and a corresponding set of labels. In block 1906, the logic flow 1900 filters non-visual instances from the set of personal named video instances. In block 1906, the logic flow 1900 finds a second set of personal named video instances based on the set of personal named video instances. In block 1908, the logic flow 1900 adds the second set of personal named video instances to the set of personal named video instances. In one embodiment, the one or more processing devices to generate a set of transcripts for a set of personal videos using a speech-to-text (STT) model.

With reference to the mining system 900, by way of example, one or more processing devices executes the mining system 900. A miner 906 mines personal videos 902 with associated personal transcripts 928 to collect the set of personal named video instances P 926, the set of personal named video instances P 926 to include a set of personal images and a corresponding set of labels.

In one embodiment, the miner 906 outputs candidate instance names 910 and candidate video timestamps 912. The visual filter 908 filters out non-visual instances from the set of personal named video instances P 926 using the encoders 918 and text-to-visual relevance scores 920. The finder 916 finds a second set of personal named video instances based on the set of personal named video instances P 926. The finder 916 adds the second set of personal named video instances to the set of personal named video instances P 926.

Figure 20:
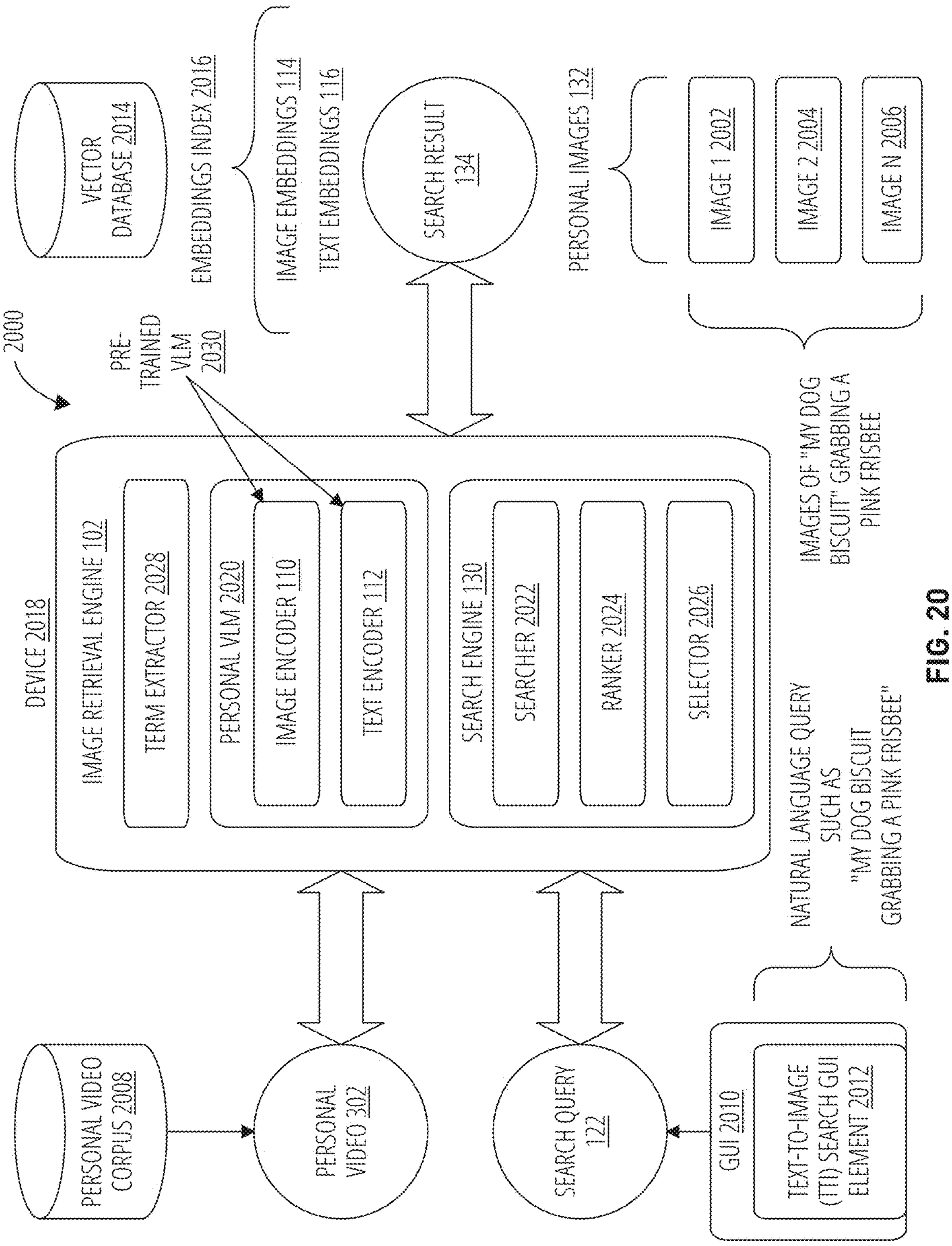
FIG. 20 illustrates a computing device in accordance with one embodiment.

FIG. 20 illustrates an image retrieval system 2000. The image retrieval system 2000 is an example of a device 2018 suitable for implementing software and hardware components to support multimodal search operations by the image retrieval engine 102. The device 2018 includes an image retrieval engine 102 comprising a term extractor 2028, a personal VLM 104, and a search engine 130. The personal VLM 104 includes the image encoder 110 and the text encoder 112. In one embodiment, the image encoder 110 and the text encoder 112 implement a modified version of a pre-trained VLM 2030, such as the CLIP model, for example. The search engine 130 includes a searcher 2022, a ranker 2024 and a selector 2026.

As depicted in FIG. 20, the search engine 130 receives a search query 122 expressed in a natural language, such as written in text form. The user 120 enters the search query 122 in a text-to-image (TTI) search GUI element 2012 presented by a GUI 2010. The search query 122 includes general search terms 124 and personal search terms 126 associated with a user 120.

The term extractor 2028 of the image retrieval engine 102 extracts the general search terms 124 and the personal search terms 126 from the search query 122. The term extractor 2028 outputs the extracted terms to the personal VLM 104.

The personal VLM 104 includes the pre-trained VLM 2030 that is meta-personalized with global category features 1302 personalized with a set of personal instance weights 1304 to form a personal instance token 144 associated with the user 120. The text encoder 112 of the personal VLM 104 encodes the extracted terms from the search query 122 into a query embedding 128. In one embodiment, the personal VLM 104 encodes the general search terms 124 with an embedding layer of the text encoder 112 of the personal VLM 104 to form a text embedding 142. The personal VLM 104 maps the personal instance token 144 to the text embedding 142 to form the query embedding 128. The personal VLM 104 outputs the query embedding 128 to the search engine 130.

The search engine 130 receives the query embedding 128. The searcher 2022 of the search engine 130 searches the shared embedding space 118 based on the query embedding 128 and the personal instance token 144. The shared embedding space 118 includes image embeddings 114 associated with a personal video 302 from the personal videos 106 and text embeddings 116 corresponding to personal text from a personal transcript 402 from the personal transcripts 108 associated with the personal video 302.

In one embodiment, the image embeddings 114 and/or the text embeddings 116 are indexed into an embeddings index 2016 to facilitate search and retrieval operations. The embeddings index 2016 is a large multi-dimensional table that maps each image to its corresponding image embeddings 114 or text embeddings 116. The embeddings index 2016 is stored in a vector database 2014 or in memory, depending on the size of the dataset and the computational resources available. Creating the embeddings index 2016 is a computationally intensive process, but once the embeddings index 2016 is built, search and retrieval operations for personal images 132 is performed quickly and efficiently.

The searcher 2022 searches for candidate image embeddings 114 that are semantically similar to the query embedding 128 using a similarity measure, such as cosine similarity or dot product. The ranker 2024 of the search engine 130 retrieves and ranks the candidate image embeddings 114 mapped into the shared embedding space 118 based on the similarity measure. The selector 2026 of the search engine 130 selects a top set of k candidate image embeddings 114 as the search result 134 based on the rankings.

The search engine 130 retrieves personal images 132 associated with the top set of candidate image embeddings 114 as the search result 134, such as image 1 2002, image 2 2004, . . . , to image N 2006, where N is any positive integer. The search result 134 includes one or more personal images 132 from the personal video 302 that is similar to a combination of the general search terms 124 and the personal search terms 126 encoded into the query embedding 128.

Figure 21:
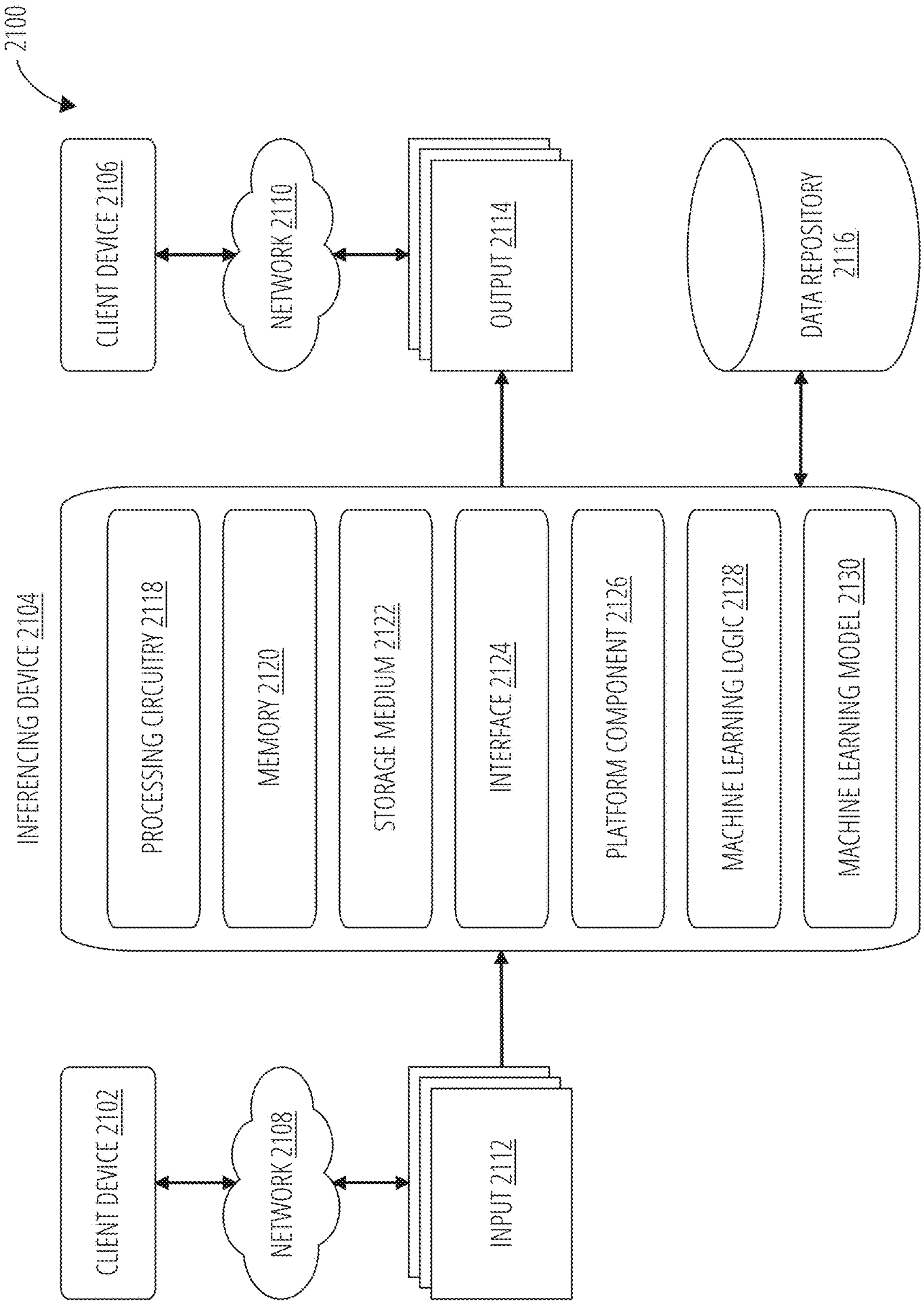
FIG. 21 illustrates a system in accordance with one embodiment.

FIG. 21 illustrates an embodiment of a system 2100. The system 2100 is suitable for implementing one or more embodiments as described herein. In one embodiment, for example, the system 2100 is an AI/ML system suitable for performing multimodal search operations for the image retrieval engine 102.

The system 2100 comprises a set of M devices, where M is any positive integer. FIG. 21 depicts three devices (M=3), including a client device 2102, an inferencing device 2104, and a client device 2106. The inferencing device 2104 communicates information with the client device 2102 and the client device 2106 over a network 2108 and a network 2110, respectively. In one embodiment, for example, the inferencing device 2104 comprises a server device that implements the personal VLM 104 for the image retrieval engine 102. The client device 2102 and the client device 2106 are devices that implement a GUI interface, such as a web browser, to remotely access multimodal search services offered by the inferencing device 2104. In one embodiment, for example, the inferencing device 2104 is a client device 2102 or the client device 2106, such as a smartphone, tablet, laptop computer or desktop computer, that executes a GUI to directly interact with the image retrieval engine 102 executing locally on the inferencing device 2104.

The information includes input 2112 from the client device 2102 and output 2114 to the client device 2106, or vice-versa. An example of the input 2112 is a search query 122. An example of the output 2114 is search result 134. In one alternative, the input 2112 and the output 2114 are communicated between the same client device 2102 or client device 2106. In another alternative, the input 2112 and the output 2114 are stored in a data repository 2116. In yet another alternative, the input 2112 and the output 2114 are communicated via a platform component 2126 of the inferencing device 2104, such as an input/output (I/O) device (e.g., a touchscreen, a microphone, a speaker, etc.).

Figure 26:
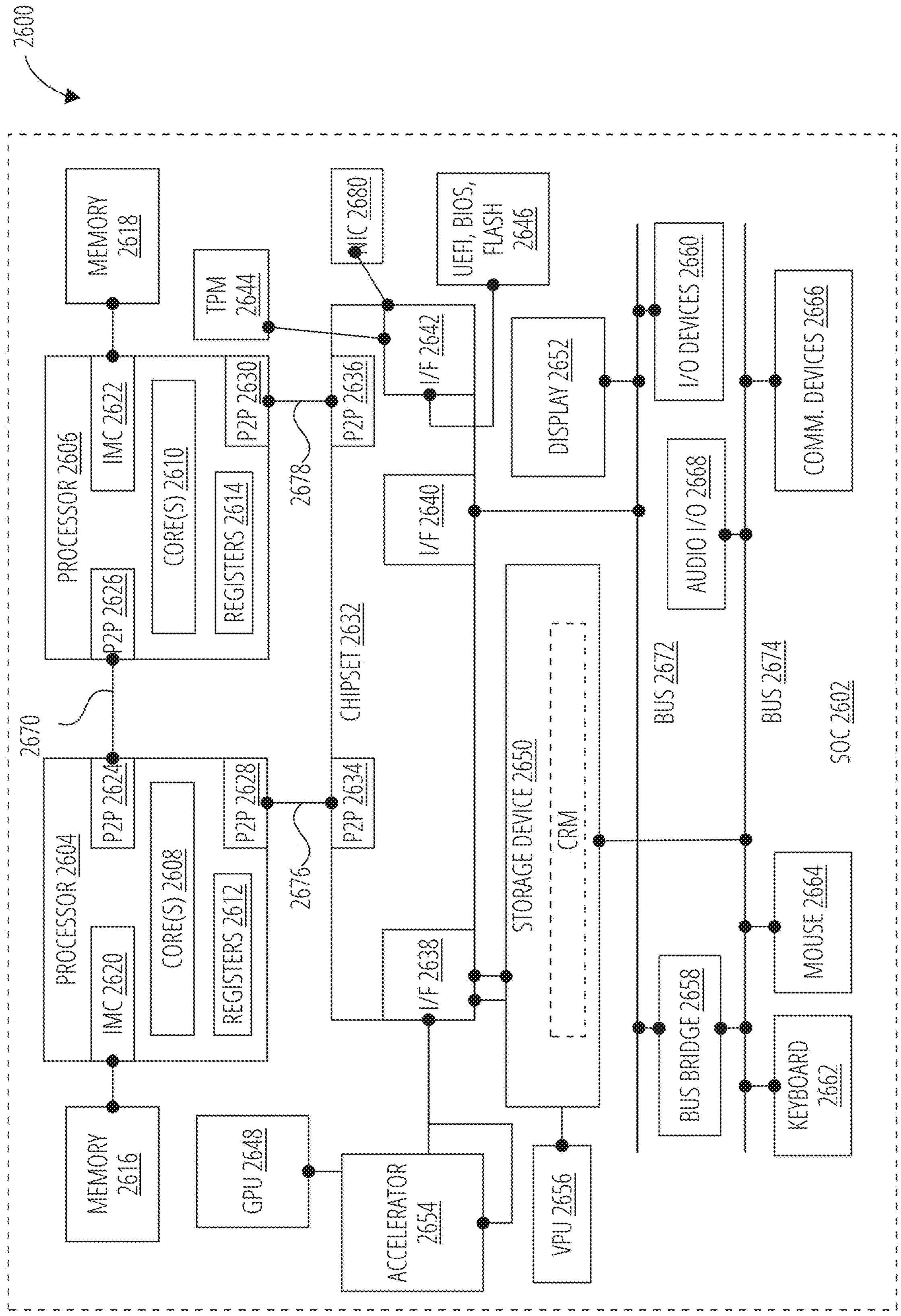
FIG. 26 illustrates a computing architecture in accordance with one embodiment.

As depicted in FIG. 21, the inferencing device 2104 includes processing circuitry 2118, a memory 2120, a storage medium 2122, an interface 2124, a platform component 2126, ML logic 2128, and an ML model 2130. The ML logic 2128 executes operations to support the image retrieval engine 102. The ML model 2130 is the personal VLM 104. In some implementations, the inferencing device 2104 includes other components or devices as well. Examples for software elements and hardware elements of the inferencing device 2104 are described in more detail with reference to a computing architecture 2600 as depicted in FIG. 26. Embodiments are not limited to these examples.

Figure 27:
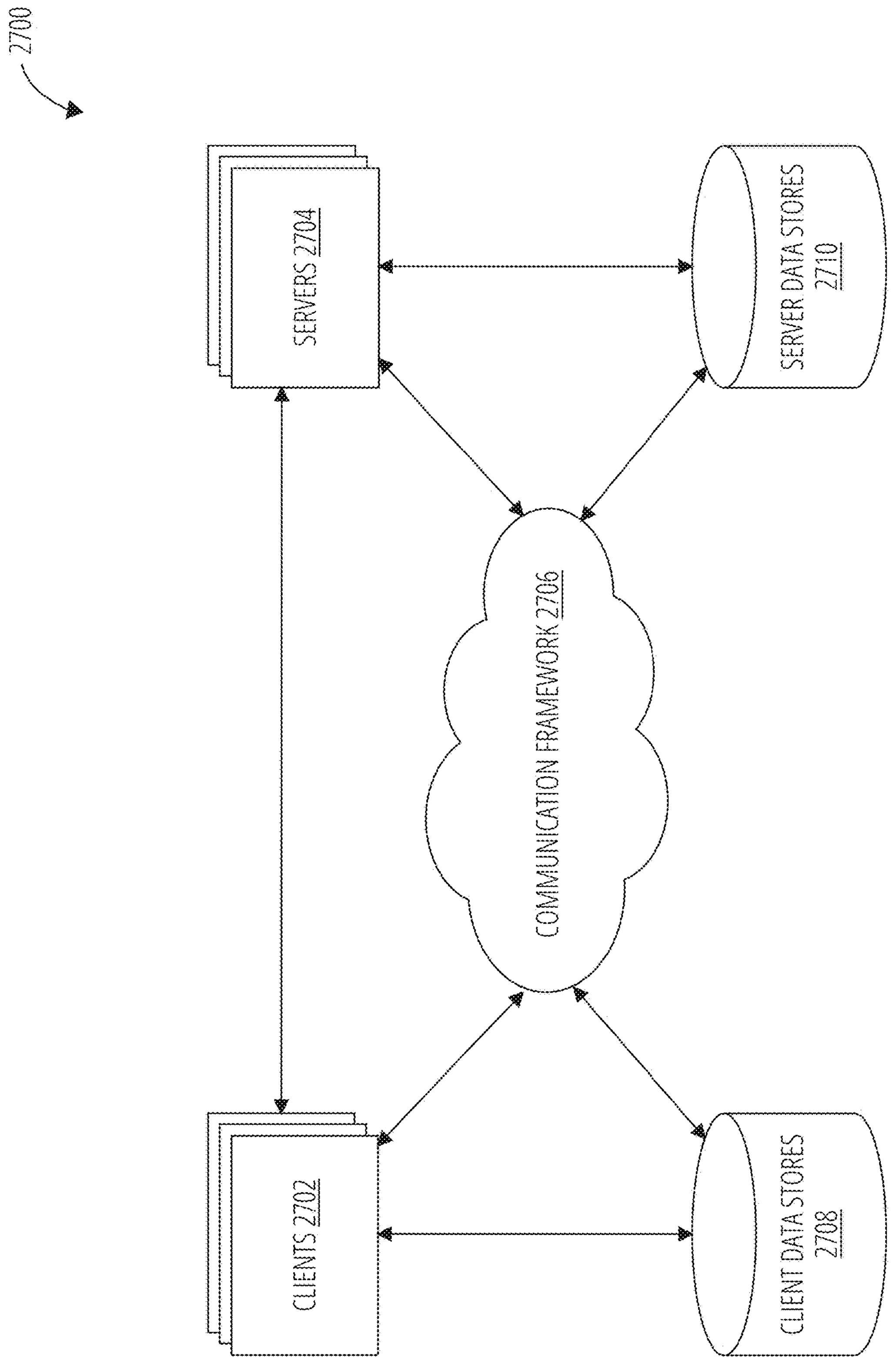
FIG. 27 illustrates a communications architecture in accordance with one embodiment.

The inferencing device 2104 is generally arranged to receive an input 2112, process the input 2112 via one or more AI/ML techniques, and send an output 2114. The inferencing device 2104 receives the input 2112 from the client device 2102 via the network 2108, the client device 2106 via the network 2110, the platform component 2126 (e.g., a touchscreen as a text command or microphone as a voice command), the memory 2120, the storage medium 2122 or the data repository 2116. The inferencing device 2104 sends the output 2114 to the client device 2102 via the network 2108, the client device 2106 via the network 2110, the platform component 2126 (e.g., a touchscreen to present text, graphic or video information or speaker to reproduce audio information), the memory 2120, the storage medium 2122 or the data repository 2116. Examples for the software elements and hardware elements of the network 2108 and the network 2110 are described in more detail with reference to a communications architecture 2700 as depicted in FIG. 27. Embodiments are not limited to these examples.

The inferencing device 2104 includes ML logic 2128 and an ML model 2130 to implement various AI/ML techniques for various AI/ML tasks. The ML logic 2128 receives the input 2112, and processes the input 2112 using the ML model 2130. The ML model 2130 performs inferencing operations to generate an inference for a specific task from the input 2112. In some cases, the inference is part of the output 2114. The output 2114 is used by the client device 2102, the inferencing device 2104, or the client device 2106 to perform subsequent actions in response to the output 2114.

In various embodiments, the ML model 2130 is a trained ML model 2130 using a set of training operations. An example of training operations to train the ML model 2130 is described with reference to FIG. 22.

Figure 22:
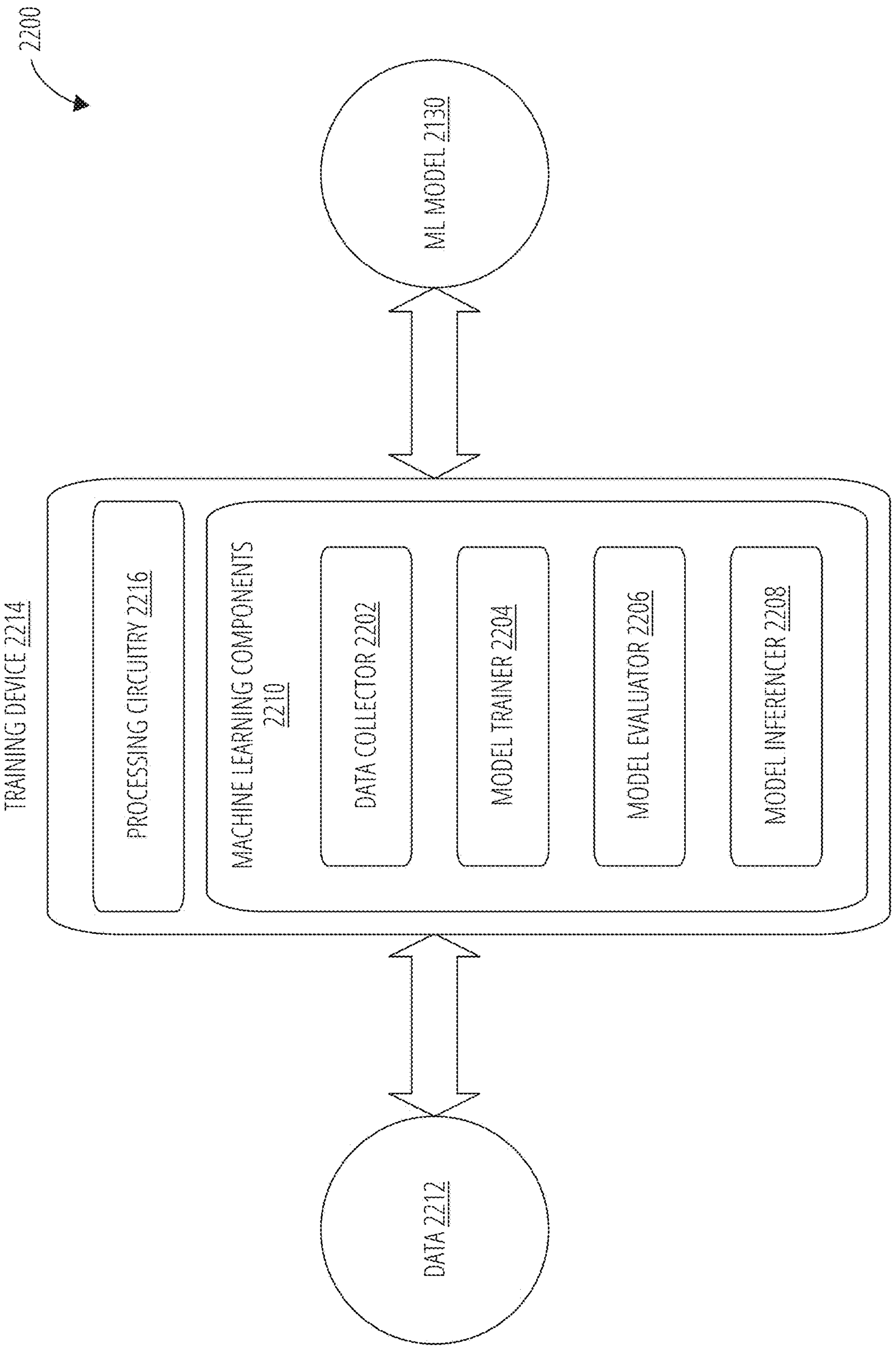
FIG. 22 illustrates an apparatus in accordance with one embodiment.

FIG. 22 illustrates an apparatus 2200. The apparatus 2200 depicts a training device 2214 suitable to generate a trained ML model 2130 for the inferencing device 2104 of the system 2100. In one embodiment, the training device 2214 executes various ML components 2210 to general the personal VLM 104 by training and testing a pre-trained VLM 2030.

As depicted in FIG. 22, the training device 2214 includes a processing circuitry 2216 and a set of ML components

2210 to support various AI/ML techniques, such as a data collector 2202, a model trainer 2204, a model evaluator 2206 and a model inferencer 2208.

In general, the data collector 2202 collects data 2212 from one or more data sources to use as training data for the ML model 2130. The data collector 2202 collects different types of data 2212, such as text information, audio information, image information, video information, graphic information, and so forth. The model trainer 2204 receives as input the collected data and uses a portion of the collected data as test data for an AI/ML algorithm to train the ML model 2130. The model evaluator 2206 evaluates and improves the trained ML model 2130 using a portion of the collected data as test data to test the ML model 2130. The model evaluator 2206 also uses feedback information from the deployed ML model 2130. The model inferencer 2208 implements the trained ML model 2130 to receive as input new unseen data, generate one or more inferences on the new data, and output a result such as an alert, a recommendation or other post-solution activity.

An exemplary AI/ML architecture for the ML components 2210 is described in more detail with reference to FIG. 23.

Figure 23:
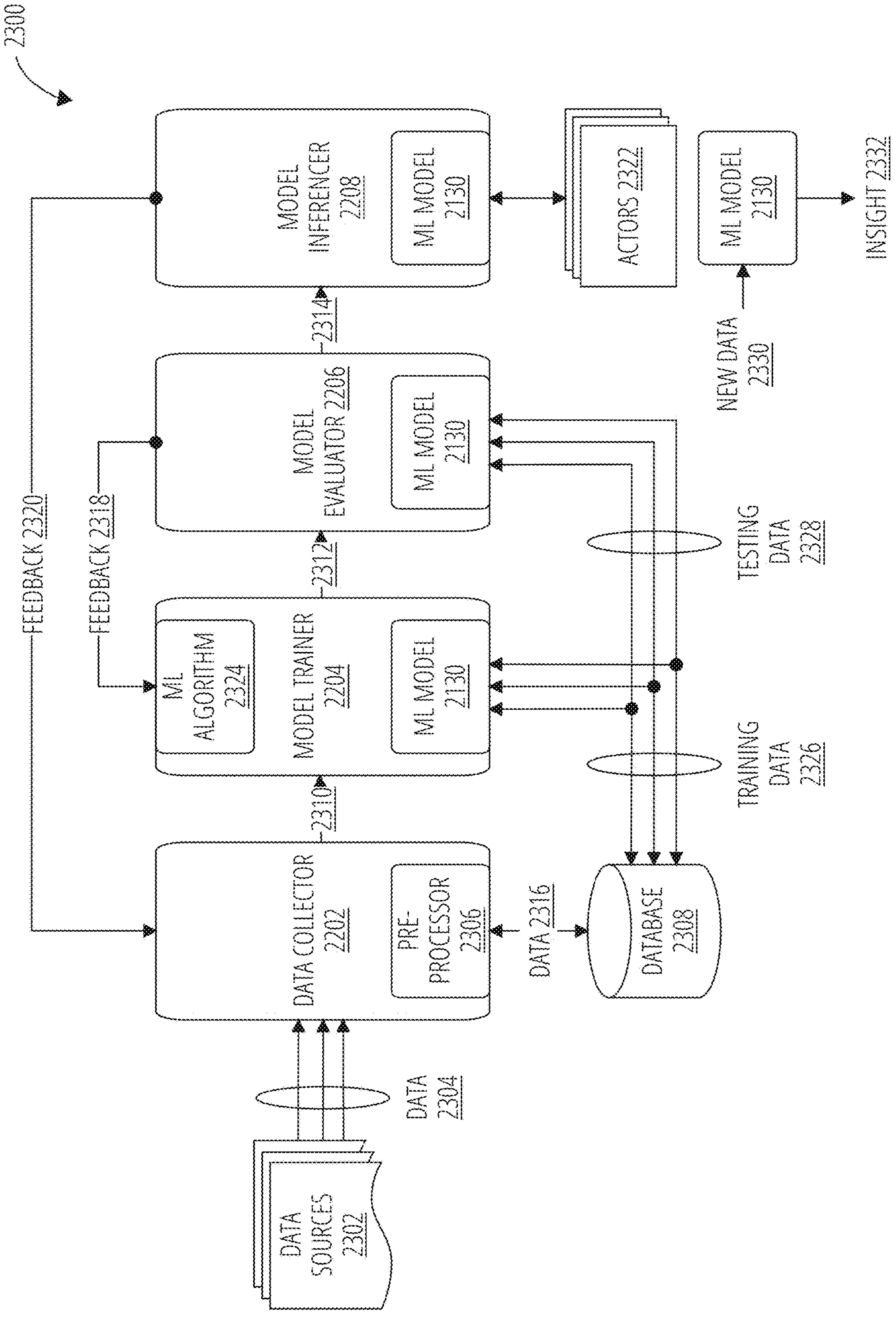
FIG. 23 illustrates an artificial intelligence architecture in accordance with one embodiment.

FIG. 23 illustrates an artificial intelligence architecture 2300 suitable for use by the training device 2214 to generate the ML model 2130 for deployment by the inferencing device 2104. The artificial intelligence architecture 2300 is an example of a system suitable for implementing various AI techniques and/or ML techniques to perform various inferencing tasks on behalf of the various devices of the system 2100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 2300 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 2130, evaluate performance of the trained ML model 2130, and deploy the tested ML model 2130 as the trained ML model 2130 in a production environment, and continuously monitor and maintain it.

The ML model 2130 is a mathematical construct used to predict outcomes based on a set of input data. The ML model 2130 is trained using large volumes of training data 2326, and it can recognize patterns and trends in the training data 2326 to make accurate predictions. The ML model 2130 is derived from an ML algorithm 2324 (e.g., a neural network, decision tree, support vector machine, etc.). A data set is fed into the ML algorithm 2324 which trains an ML model 2130 to "learn" a function that produces mappings between a set of inputs and a set of outputs with a reasonably high accuracy. Given a sufficiently large enough set of inputs and outputs, the ML algorithm 2324 finds the function for a given task. This function may even be able to produce the correct output for input that it has not seen during training. A data scientist prepares the mappings, selects and tunes the ML algorithm 2324, and evaluates the resulting model performance. Once the ML logic 2128 is sufficiently accurate on test data, it can be deployed for production use.

The ML algorithm 2324 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 2324 of the artificial intelligence architecture 2300 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 23, the artificial intelligence architecture 2300 includes a set of data sources 2302 to source data 2304 for the artificial intelligence architecture 2300. Data sources 2302 may comprise any device capable generating, processing, storing or managing data 2304 suitable for a ML system. Examples of data sources 2302 include without limitation databases, web scraping, sensors and Internet of Things (IoT) devices, image and video cameras, audio devices, text generators, publicly available databases, private databases, and many other data sources 2302. The data sources 2302 may be remote from the artificial intelligence architecture 2300 and accessed via a network, local to the artificial intelligence architecture 2300 an accessed via a network interface, or may be a combination of local and remote data sources 2302.

The data sources 2302 source difference types of data 2304. By way of example and not limitation, the data 2304 includes structured data from relational databases, such as customer profiles, transaction histories, or product inventories. The data 2304 includes unstructured data from websites such as customer reviews, news articles, social media posts, or product specifications. The data 2304 includes data from temperature sensors, motion detectors, and smart home appliances. The data 2304 includes image data from medical images, security footage, or satellite images. The data 2304 includes audio data from speech recognition, music recognition, or call centers. The data 2304 includes text data from emails, chat logs, customer feedback, news articles or social media posts. The data 2304 includes publicly available datasets such as those from government agencies, academic institutions, or research organizations. These are just a few examples of the many sources of data that can be used for ML systems. It is important to note that the quality and quantity of the data is critical for the success of a machine learning project.

The data 2304 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 2302 are communicatively coupled to a data collector 2202. The data collector 2202 gathers relevant data 2304 from the data sources 2302. Once collected, the data collector 2202 may use a pre-processor 2306 to make the data 2304 suitable for analysis. This involves data cleaning, transformation, and feature engineering. Data preprocessing is a critical step in ML as it directly impacts the accuracy and effectiveness of the ML model 2130. The pre-processor 2306 receives the data 2304 as input, processes the data 2304, and outputs pre-processed data 2316 for storage in a database 2308. Examples for the database 2308 includes a hard drive, solid state storage, and/or random access memory (RAM).

The data collector 2202 is communicatively coupled to a model trainer 2204. The model trainer 2204 performs AI/ML model training, validation, and testing which may generate model performance metrics as part of the model testing procedure. The model trainer 2204 receives the pre-processed data 2316 as input 2310 or via the database 2308. The model trainer 2204 implements a suitable ML algorithm 2324 to train an ML model 2130 on a set of training data 2326 from the pre-processed data 2316. The training process involves feeding the pre-processed data 2316 into the ML algorithm 2324 to produce or optimize an ML model 2130. The training process adjusts its parameters until it achieves an initial level of satisfactory performance.

The model trainer 2204 is communicatively coupled to a model evaluator 2206. After an ML model 2130 is trained, the ML model 2130 needs to be evaluated to assess its performance. This is done using various metrics such as accuracy, precision, recall, and F1 score. The model trainer 2204 outputs the ML model 2130, which is received as input 2310 or from the database 2308. The model evaluator 2206 receives the ML model 2130 as input 2312, and it initiates an evaluation process to measure performance of the ML model 2130. The evaluation process includes providing feedback 2318 to the model trainer 2204. The model trainer 2204 re-trains the ML model 2130 to improve performance in an iterative manner.

The model evaluator 2206 is communicatively coupled to a model inferencer 2208. The model inferencer 2208 provides AI/ML model inference output (e.g., inferences, predictions or decisions). Once the ML model 2130 is trained and evaluated, it is deployed in a production environment where it is used to make predictions on new data. The model inferencer 2208 receives the evaluated ML model 2130 as input 2314. The model inferencer 2208 uses the evaluated ML model 2130 to produce insights or predictions on real data, which is deployed as a final production ML model 2130. The inference output of the ML model 2130 is use case specific. The model inferencer 2208 also performs model monitoring and maintenance, which involves continuously monitoring performance of the ML model 2130 in the production environment and making any necessary updates or modifications to maintain its accuracy and effectiveness. The model inferencer 2208 provides feedback 2318 to the data collector 2202 to train or re-train the ML model 2130. The feedback 2318 includes model performance feedback information, which is used for monitoring and improving performance of the ML model 2130.

Some or all of the model inferencer 2208 is implemented by various actors 2322 in the artificial intelligence architecture 2300, including the ML model 2130 of the inferencing device 2104, for example. The actors 2322 use the deployed ML model 2130 on new data to make inferences or predictions for a given task, and output an insight 2332. The actors 2322 implement the model inferencer 2208 locally, or remotely receives outputs from the model inferencer 2208 in a distributed computing manner. The actors 2322 trigger actions directed to other entities or to itself. The actors 2322 provide feedback 2320 to the data collector 2202 via the model inferencer 2208. The feedback 2320 comprise data needed to derive training data, inference data or to monitor the performance of the ML model 2130 and its impact to the network through updating of key performance indicators (KPIs) and performance counters.

As previously described with reference to FIGS. 1, 2, the systems 2100, 2200 implement some or all of the artificial intelligence architecture 2300 to support various use cases and solutions for various AI/ML tasks. In various embodiments, the training device 2214 of the apparatus 2200 uses the artificial intelligence architecture 2300 to generate and train the ML model 2130 for use by the inferencing device 2104 for the system 2100. In one embodiment, for example, the training device 2214 may train the ML model 2130 as a neural network, as described in more detail with reference to FIG. 24. Other use cases and solutions for AI/ML are possible as well, and embodiments are not limited in this context.

Figure 24:
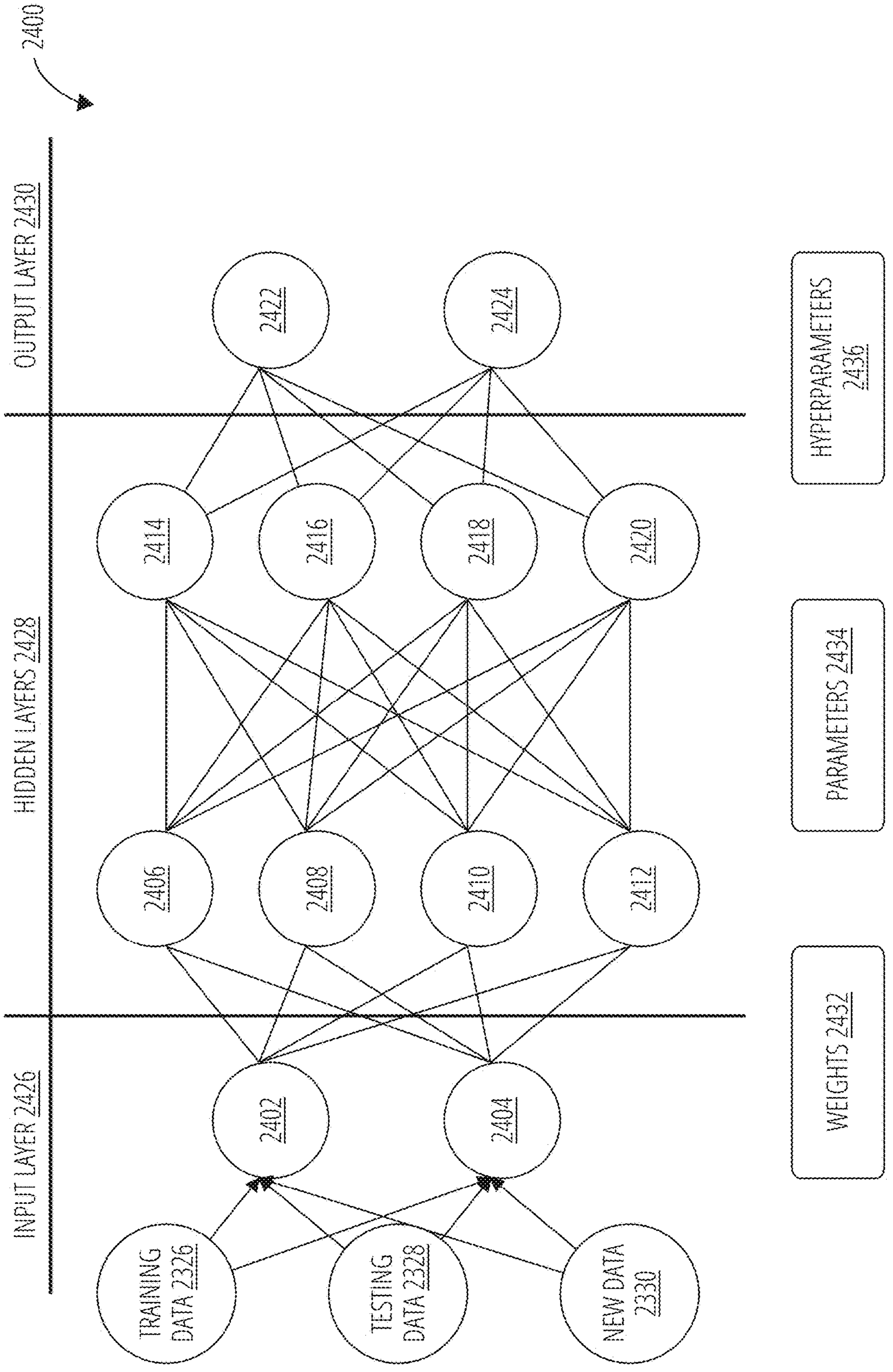
FIG. 24 illustrates an artificial neural network in accordance with one embodiment.

FIG. 24 illustrates an embodiment of an artificial neural network 2400. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 2400 comprises multiple node layers, containing an input layer 2426, one or more hidden layers 2428, and an output layer 2430. Each layer comprises one or more nodes, such as nodes 2402 to 2424. As depicted in FIG. 24, for example, the input layer 2426 has nodes 2402, 2404. The artificial neural network 2400 has two hidden layers 2428, with a first hidden layer having nodes 2406, 2408, 2410 and 2412, and a second hidden layer having nodes 2414, 2416, 2418 and 2420. The artificial neural network 2400 has an output layer 2430 with nodes 2422, 2424. Each node 2402 to 2424 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 2400 relies on training data 2326 to learn and improve accuracy over time. However, once the artificial neural network 2400 is fine-tuned for accuracy, and tested on testing data 2328, the artificial neural network 2400 is ready to classify and cluster new data 2330 at a high velocity. Tasks in speech recognition or image recognition can take minutes versus hours when compared to the manual identification by human experts.

Each individual node 2402 to 424 is a linear regression model, composed of input data, weights, a bias (or threshold), and an output. Once an input layer 2426 is determined, a set of weights 2432 are assigned. The weights 2432 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 2400 as a feedforward network.

In one embodiment, the artificial neural network 2400 leverages sigmoid neurons, which are distinguished by having values between 0 and 1. Since the artificial neural network 2400 behaves similarly to a decision tree, cascading data from one node to another, having x values between 0 and 1 will reduce the impact of any given change of a single variable on the output of any given node, and subsequently, the output of the artificial neural network 2400.

The artificial neural network 2400 has many practical use cases, like image recognition, speech recognition, text recognition or classification. The artificial neural network 2400 leverages supervised learning, or labeled datasets, to train the algorithm. As the model is trained, its accuracy is measured using a cost (or loss) function. This is also commonly referred to as the mean squared error (MSE).

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 2434 of the model adjust to gradually converge at the minimum.

In one embodiment, the artificial neural network 2400 is feedforward, meaning it flows in one direction only, from input to output. In one embodiment, the artificial neural network 2400 uses backpropagation. Backpropagation is when the artificial neural network 2400 moves in the opposite direction from output to input. Backpropagation allows calculation and attribution of errors associated with each neuron 2402 to 2424, thereby allowing adjustment to fit the parameters 2434 of the ML model 2130 appropriately.

The artificial neural network 2400 is implemented as different neural networks depending on a given task. Neural networks are classified into different types, which are used for different purposes. In one embodiment, the artificial neural network 2400 is implemented as a feedforward neural network, or multi-layer perceptrons (MLPs), comprised of an input layer 2426, hidden layers 2428, and an output layer 2430. While these neural networks are also commonly referred to as MLPs, they are actually comprised of sigmoid neurons, not perceptrons, as most real-world problems are nonlinear. Trained data 2304 usually is fed into these models to train them, and they are the foundation for computer vision, natural language processing, and other neural networks. In one embodiment, the artificial neural network 2400 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 2400 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 2400 is implemented as any type of neural network suitable for a given operational task of system 2100, and the MLP, CNN, and RNN are merely a few examples. Embodiments are not limited in this context.

The artificial neural network 2400 includes a set of associated parameters 2434. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 2400 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 2436. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 25:
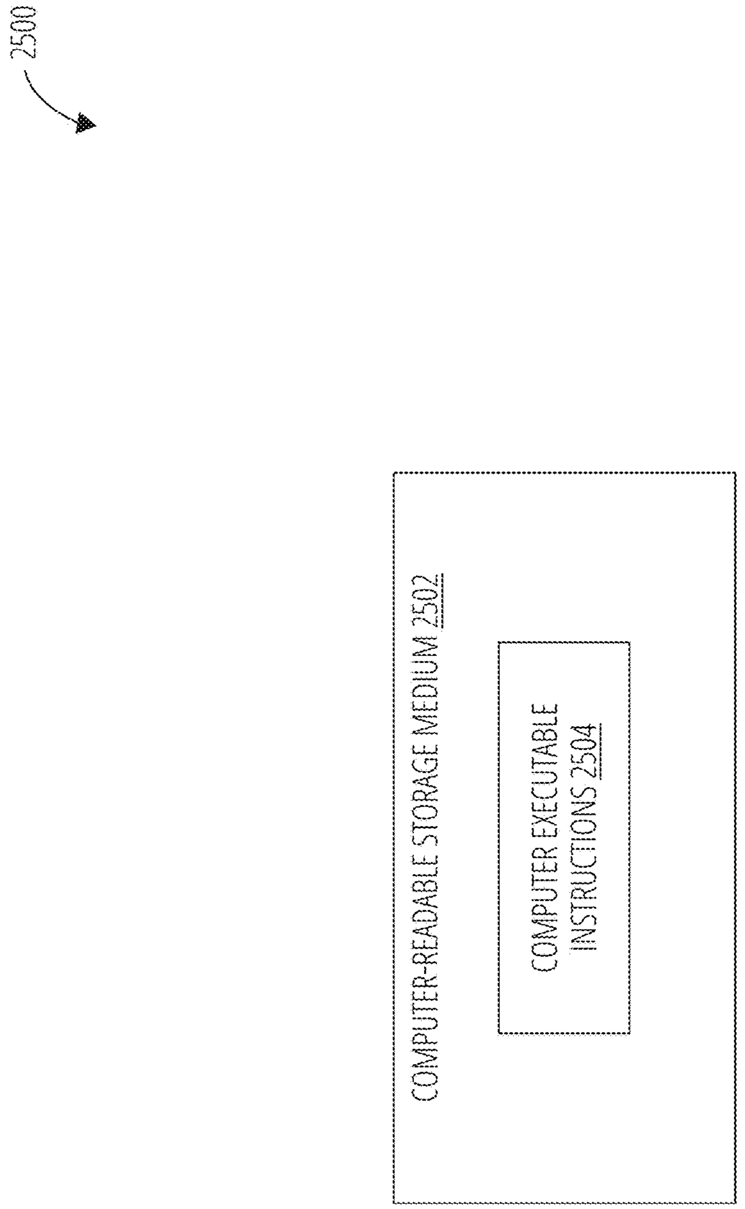
FIG. 25 illustrates a computer-readable storage medium in accordance with one embodiment.

FIG. 25 illustrates an apparatus 2500. Apparatus 2500 comprises any non-transitory computer-readable storage medium 2502 or machine-readable storage medium, such as an optical, magnetic or semiconductor storage medium. In various embodiments, apparatus 2500 comprises an article of manufacture or a product. In some embodiments, the computer-readable storage medium 2502 stores computer executable instructions with which one or more processing devices or processing circuitry can execute. For example, computer executable instructions 2504 includes instructions to implement operations described with respect to any logic flows described herein. Examples of computer-readable storage medium 2502 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 2504 include any suitable type of code, such as source code, compiled code, interpreted code, executable code, static code, dynamic code, object-oriented code, visual code, and the like.

FIG. 26 illustrates an embodiment of a computing architecture 2600. Computing architecture 2600 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2600 has a single processor with one core or more than one processor. Note that the term "processor" refers to a processor with a single core or a processor package with multiple processor cores. In at least one embodiment, the computing architecture 2600 is representative of the components of the system 2100. More generally, the computing architecture 2600 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2600. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 26, computing architecture 2600 comprises a system-on-chip (SoC) 2602 for mounting platform components. System-on-chip (SoC) 2602 is a point-to-point (P2P) interconnect platform that includes a first processor 2604 and a second processor 2606 coupled via a point-to-point interconnect 2670 such as an Ultra Path Interconnect (UPI). In other embodiments, the computing architecture 2600 is another bus architecture, such as a multi-drop bus. Furthermore, each of processor 2604 and processor 2606 are processor packages with multiple processor cores including core(s) 2608 and core(s) 2610, respectively. While the computing architecture 2600 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 2604 and chipset 2632. Some platforms include additional components and some platforms include sockets to mount the processors and/or the chipset. Furthermore, some platforms do not have sockets (e.g., SoC, or the like). Although depicted as a SoC 2602, one or more of the components of the SoC 2602 are included in a single die package, a multi-chip module (MCM), a multi-die package, a chiplet, a bridge, and/or an interposer. Therefore, embodiments are not limited to a SoC.

The processor 2604 and processor 2606 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 2604 and/or processor 2606. Additionally, the processor 2604 need not be identical to processor 2606.

Processor 2604 includes an integrated memory controller (IMC) 2620 and point-to-point (P2P) interface 2624 and P2P interface 2628. Similarly, the processor 2606 includes an IMC 2622 as well as P2P interface 2626 and P2P interface 2630. IMC 2620 and IMC 2622 couple the processor 2604 and processor 2606, respectively, to respective memories (e.g., memory 2616 and memory 2618). Memory 2616 and memory 2618 are portions of the main memory (e.g., a dynamic random-access memory (DRAM)) for the platform such as double data rate type 4 (DDR4) or type 5 (DDR5) synchronous DRAM (SDRAM). In the present embodiment, the memory 2616 and the memory 2618 locally attach to the respective processors (i.e., processor 2604 and processor 2606). In other embodiments, the main memory couple with the processors via a bus and shared memory hub. Processor 2604 includes registers 2612 and processor 2606 includes registers 2614.

Computing architecture 2600 includes chipset 2632 coupled to processor 2604 and processor 2606. Furthermore, chipset 2632 are coupled to storage device 2650, for example, via an interface (I/F) 2638. The I/F 2638 may be, for example, a Peripheral Component Interconnect-enhanced (PCIe) interface, a Compute Express Link® (CXL) interface, or a Universal Chiplet Interconnect Express (UCIe) interface. Storage device 2650 stores instructions executable by circuitry of computing architecture 2600 (e.g., processor 2604, processor 2606, GPU 2648, accelerator 2654, vision processing unit 2656, or the like). For example, storage device 2650 can store instructions for the client device 2102, the client device 2106, the inferencing device 2104, the training device 2214, or the like.

Processor 2604 couples to the chipset 2632 via P2P interface 2628 and P2P 2634 while processor 2606 couples to the chipset 2632 via P2P interface 2630 and P2P 2636. Direct media interface (DMI) 2676 and DMI 2678 couple the P2P interface 2628 and the P2P 2634 and the P2P interface 2630 and P2P 2636, respectively. DMI 2676 and DMI 2678 is a high-speed interconnect that facilitates, e.g., eight Giga Transfers per second (GT/s) such as DMI 3.0. In other embodiments, the processor 2604 and processor 2606 interconnect via a bus.

The chipset 2632 comprises a controller hub such as a platform controller hub (PCH). The chipset 2632 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2632 comprises more than one controller hub such as a chipset with a memory controller hub, a graphics controller hub, and an input/output (I/O) controller hub.

In the depicted example, chipset 2632 couples with a trusted platform module (TPM) 2644 and UEFI, BIOS, FLASH circuitry 2646 via I/F 2642. The TPM 2644 is a dedicated microcontroller designed to secure hardware by integrating cryptographic keys into devices. The UEFI, BIOS, FLASH circuitry 2646 may provide pre-boot code. The I/F 2642 may also be coupled to a network interface circuit (NIC) 2680 for connections off-chip.

Furthermore, chipset 2632 includes the I/F 2638 to couple chipset 2632 with a high-performance graphics engine, such as, graphics processing circuitry or a graphics processing unit (GPU) 2648. In other embodiments, the computing architecture 2600 includes a flexible display interface (FDI) (not shown) between the processor 2604 and/or the processor 2606 and the chipset 2632. The FDI interconnects a graphics processor core in one or more of processor 2604 and/or processor 2606 with the chipset 2632.

The computing architecture 2600 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 2654 and/or vision processing unit 2656 are coupled to chipset 2632 via I/F 2638. The accelerator 2654 is representative of any type of accelerator device (e.g., a data streaming accelerator, cryptographic accelerator, cryptographic co-processor, an offload engine, etc.). One example of an accelerator 2654 is the Intel® Data Streaming Accelerator (DSA). The accelerator 2654 is a device including circuitry to accelerate copy operations, data encryption, hash value computation, data comparison operations (including comparison of data in memory 2616 and/or memory 2618), and/or data compression. Examples for the accelerator 2654 include a USB device, PCI device, PCIe device, CXL device, UCIe device, and/or an SPI device. The accelerator 2654 also includes circuitry arranged to execute machine learning (ML) related operations (e.g., training, inference, etc.) for ML models. Generally, the accelerator 2654 is specially designed to perform computationally intensive operations, such as hash value computations, comparison operations, cryptographic operations, and/or compression operations, in a manner that is more efficient than when performed by the processor 2604 or processor 2606. Because the load of the computing architecture 2600 includes hash value computations, comparison operations, cryptographic operations, and/or compression operations, the accelerator 2654 greatly increases performance of the computing architecture 2600 for these operations.

The accelerator 2654 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 2654. For example, the accelerator 2654 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2654 via a non-posted write (e.g., a deferred memory write (DMWr)). One example of an instruction that atomically submits a work descriptor to the shared work queue of the accelerator 2654 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 2654. The dedicated work queue may accept job submissions via commands such as the movdir64b instruction.

Various I/O devices 2660 and display 2652 couple to the bus 2672, along with a bus bridge 2658 which couples the bus 2672 to a second bus 2674 and an I/F 2640 that connects the bus 2672 with the chipset 2632. In one embodiment, the second bus 2674 is a low pin count (LPC) bus. Various input/output (I/O) devices couple to the second bus 2674 including, for example, a keyboard 2662, a mouse 2664 and communication devices 2666.

Furthermore, an audio I/O 2668 couples to second bus 2674. Many of the I/O devices 2660 and communication devices 2666 reside on the system-on-chip (SoC) 2602 while the keyboard 2662 and the mouse 2664 are add-on peripherals. In other embodiments, some or all the I/O devices 2660 and communication devices 2666 are add-on peripherals and do not reside on the system-on-chip (SoC) 2602.

FIG. 27 illustrates a block diagram of an exemplary communications architecture 2700 suitable for implementing various embodiments as previously described. The communications architecture 2700 includes various common communications elements, such as a transmitter, receiver, transceiver, radio, network interface, baseband processor, antenna, amplifiers, filters, power supplies, and so forth. The embodiments, however, are not limited to implementation by the communications architecture 2700.

As shown in FIG. 27, the communications architecture 2700 includes one or more clients 2702 and servers 2704. The clients 2702 and the servers 2704 are operatively connected to one or more respective client data stores 2708 and server data stores 2710 that can be employed to store information local to the respective clients 2702 and servers 2704, such as cookies and/or associated contextual information.

The clients 2702 and the servers 2704 communicate information between each other using a communication framework 2706. The communication framework 2706 implements any well-known communications techniques and protocols. The communication framework 2706 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2706 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/2100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 2702 and the servers 2704. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

An example method comprises: receiving a search query expressed in a natural language, the search query to include general search terms and personal search terms associated with a user; encoding the search query into a query embedding with a personal vision-language model (VLM), the personal VLM comprising a pre-trained VLM that is meta-personalized with global category features personalized with a set of personal instance weights to form a personal instance token associated with the user; searching a shared embedding space based on the query embedding and the personal instance token, the shared embedding space to include image embeddings associated with a personal video and text embeddings corresponding to personal text from a personal transcript associated with the personal video; and generating a search result with a personal image from the personal video that is similar to a combination of the general search terms and the personal search terms.

The example method further comprising any of the previous examples, including wherein the pre-trained VLM is a contrastive language-image pre-training (CLIP) model.

The example method further comprising any of the previous examples, including wherein the personal instance token is a linear combination of a column of a category matrix for the global category features and a vector of the personal instance weights, the category matrix to comprise learnable global category features shared by all personal instances in a general category.

The example method further comprising any of the previous examples, including receiving the search query expressed in the natural language, the search query to include the general search terms and the personal search terms, the personal search terms associated with the personal instance token.

The example method further comprising any of the previous examples, including extracting the general search terms and the personal search terms from the search query; encoding the general search terms with an embedding layer of the personal VLM to form a text embedding; and mapping the personal instance token to the text embedding to form the query embedding.

The example method further comprising any of the previous examples, including receiving the query embedding; searching the shared embedding space for candidate image embeddings that are semantically similar to the query embedding using a similarity measure; ranking the candidate image embeddings in the shared embedding space based on the similarity measure; and selecting a top set of candidate image embeddings as the search result based on the rankings.

The example method further comprising any of the previous examples, including sending the search result to a network interface for presentation on a graphical user interface (GUI) of an electronic display of a client device.

The example method further comprising any of the previous examples, including receiving a search query expressed in a natural language for retrieving personal images of a user, the search query to include general search terms and personal search terms associated with the user; encoding the search query into a query embedding using a personal vision-language model (VLM), the personal VLM comprising a pre-trained VLM that is meta-personalized with global category features personalized with a set of personal instance weights to form a personal instance token associated with the user; searching a shared embedding space using the query embedding and the personal instance token to find an image embedding exceeding a similarity threshold with the query embedding, the image embedding corresponding to a personal image from a personal video associated with the user; and generating a search result comprising the personal image from the personal video.

The example method further comprising any of the previous examples, including where the pre-trained VLM is trained to augment a text encoder of the pre-trained VLM with a set of general named video instances to form a meta-personalized VLM, the meta-personalized VLM to include the global category features.

The example method further comprising any of the previous examples, including where the meta-personalized VLM is tested to adapt the text encoder with a set of personal named video instances to form the personal VLM, the personal VLM comprising the global category features personalized with the set of personal instance weights to form the personal instance token associated with the user.

An example of a non-transitory computer-readable medium storing executable instructions, which when executed by one or more processing devices, cause the one or more processing devices to perform operations comprising: lock a pre-trained vision-language model (VLM) during a training phase; train the pre-trained VLM to augment a text encoder of the pre-trained VLM with a set of general named video instances to form a meta-personalized VLM, the meta-personalized VLM to include global category features; test the meta-personalized VLM to adapt the text encoder with a set of personal named video instances to form a personal VLM, the personal VLM comprising the global category features personalized with a set of personal instance weights to form a personal instance token associated with a user.

The example medium further comprising any of the previous examples, including wherein the pre-trained VLM is a contrastive language-image pre-training (CLIP) model.

The example medium further comprising any of the previous examples, including instructions to perform zero-shot classification to identify a column of a category matrix for the global category features to use with the personal instance weights, the personal instance weights comprising a vector of learnable weights specific to a personal instance associated with the user.

The example medium further comprising any of the previous examples, including instructions to linearly combine a column of a category matrix for the global category features with the personal instance weights, the personal instance weights comprising a vector of learnable weights specific to a personal instance associated with the user.

The example medium further comprising any of the previous examples, including instructions to generate a set of transcripts for a set of personal videos using a speech-to-text (STT) model.

The example medium further comprising any of the previous examples, including instructions to mine personal videos with associated transcripts to collect the set of personal named video instances, the set of personal named video instances to include a set of personal images and a corresponding set of labels.

The example medium further comprising any of the previous examples, including instructions to filter non-visual instances from the set of personal named video instances; find a second set of personal named video instances based on the set of personal named video instances; and add the second set of personal named video instances to the set of personal named video instances.

An example system, comprising: a memory component; and one or more processing devices coupled to the memory component, the one or more processing devices to perform operations comprising: lock a pre-trained vision-language model (VLM) during a training phase; train the pre-trained VLM to augment a text encoder of the pre-trained VLM with a set of general named video instances to form a meta-personalized VLM, the meta-personalized VLM to include global category features; test the meta-personalized VLM to adapt the text encoder with a set of personal named video instances to form a personal VLM, the personal VLM comprising the global category features personalized with a set of personal instance weights to form a personal instance token associated with a user; and deploy the personal VLM to support inferencing operations for a multimodal search task.

The example system further comprising any of the previous examples, including wherein the pre-trained VLM is a contrastive language-image pre-training (CLIP) model.

The example system further comprising any of the previous examples, including perform zero-shot classification to identify a column of a category matrix for the global category features to use with the personal instance weights, the personal instance weights comprising a vector of learnable weights specific to a personal instance associated with the user.

The example system further comprising any of the previous examples, including linearly combine a column of a category matrix for the global category features with the personal instance weights, the personal instance weights comprising a vector of learnable weights specific to a personal instance associated with the user.

The example system further comprising any of the previous examples, including mine general videos with associated transcripts to collect the set of general named video instances, the set of general named video instances to include a set of general images and a corresponding set of labels.

The example system further comprising any of the previous examples, including filter non-visual instances from the set of general named video instances; find a second set of general named video instances based on the set of general named video instances; and add the second set of general named video instances to the set of general named video instances.

What is claimed is:

1. A method, comprising:

receiving a search query expressed in a natural language for retrieving personal images of a user, the search query including general search terms and personal search terms associated with the user;

encoding the search query into a query embedding using a personal vision-language model (VLM), the personal VLM including a pre-trained VLM that is meta-personalized with global category features personalized with a set of personal instance weights to form a personal instance token associated with the user, the personal instance token including a word embedding that extends a token vocabulary of the pre-trained VLM;

searching a shared embedding space using the query embedding and the personal instance token to find an image embedding exceeding a similarity threshold with the query embedding, the image embedding corresponding to a personal image including a video frame selected from a personal video associated with the user, wherein the shared embedding space is a common latent space in which representations of different modalities are mapped to a shared vector space; and generating a search result including the personal image from the personal video, the search result identifying the video frame of the personal video in which a personal instance corresponding to the personal search terms appears and a timestamp of the video frame within the personal video.

2. The method of claim 1, wherein the pre-trained VLM is trained to augment a text encoder of the pre-trained VLM with a set of general named video instances to form a meta-personalized VLM, the meta-personalized VLM including the global category features.

3. The method of claim 2, wherein the meta-personalized VLM is tested to adapt the text encoder with a set of personal named video instances to form the personal VLM, the personal VLM including the global category features personalized with the set of personal instance weights to form the personal instance token associated with the user.

4. The method of claim 1, wherein the personal instance token is a linear combination of a column of a category matrix for the global category features and a vector of the personal instance weights, the category matrix including learnable global category features shared by all personal instances in a general category.

5. The method of claim 1, further comprising:

extracting the general search terms and the personal search terms from the search query;

encoding the general search terms with an embedding layer of the personal VLM to form a text embedding; and mapping the personal instance token to the text embedding to form the query embedding.

6. The method of claim 1, further comprising:

searching the shared embedding space for candidate image embeddings that are semantically similar to the query embedding using a similarity measure;

ranking the candidate image embeddings in the shared embedding space based on the similarity measure; and selecting a top set of candidate image embeddings as the search result based on the rankings.

7. The method of claim 1, further comprising sending the search result to a network interface for presentation on a graphical user interface (GUI) of an electronic display of a client device.

8. The method of claim 1, wherein the personal instance token is learned from a set of personal named video instances that are mined from personal videos associated with the user by matching possessive text patterns in time-aligned transcripts of the personal videos.

9. The method of claim 8, wherein non-visual instances among the set of personal named video instances are filtered based on a vision-language similarity between a named instance and one or more video shots of the personal videos.

10. A non-transitory computer-readable medium storing executable instructions, which when executed by one or more processing devices, cause the one or more processing devices to perform operations comprising:

mining a set of general named video instances from general videos by matching possessive text patterns in transcripts of the general videos and filtering non-visual instances based on a vision-language similarity between a named instance and one or more video shots of the general videos;

training a pre-trained vision-language model (VLM) to augment a text encoder of the pre-trained VLM with the set of general named video instances to form a meta-personalized VLM, the meta-personalized VLM including global category features;

mining a set of personal named video instances from a set of personal videos associated with a user by matching possessive text patterns in transcripts of the personal videos and filtering non-visual instances based on a vision-language similarity between a named instance and one or more video shots of the personal videos; and testing the meta-personalized VLM to adapt the text encoder with the set of personal named video instances to form a personal VLM, the personal VLM including the global category features personalized with a set of personal instance weights to form a personal instance token associated with the user, the personal instance token including a word embedding that extends a token vocabulary of the pre-trained VLM.

11. The non-transitory computer-readable medium of claim 10, wherein the instructions, which when executed by one or more processing devices, cause the one or more processing devices to perform operations further comprising deploying the personal VLM to support inferencing operations for a multimodal search task.

12. The non-transitory computer-readable medium of claim 10, wherein the instructions, which when executed by one or more processing devices, cause the one or more processing devices to perform operations further comprising identifying a column of a category matrix for the global category features to use with the personal instance weights, the personal instance weights including a vector of learnable weights specific to a personal instance associated with the user.

13. The non-transitory computer-readable medium of claim 10, wherein the instructions, which when executed by one or more processing devices, cause the one or more processing devices to perform operations further comprising generating a set of transcripts for a set of personal videos using a speech-to-text (STT) model.

14. The non-transitory computer-readable medium of claim 10, wherein the instructions, which when executed by one or more processing devices, cause the one or more processing devices to perform operations further comprising mining personal videos with associated transcripts to collect the set of personal named video instances, the set of personal named video instances including a set of personal images and a corresponding set of labels.

15. The non-transitory computer-readable medium of claim 10, wherein the instructions, which when executed by one or more processing devices, cause the one or more processing devices to perform operations further comprising:

finding a second set of personal named video instances based on the set of personal named video instances; and adding the second set of personal named video instances to the set of personal named video instances.

16. A system, comprising:

a memory component; and one or more processing devices coupled to the memory component, the one or more processing devices configured to perform operations comprising:

mining a set of general named video instances from general videos by matching possessive text patterns in transcripts of the general videos and filtering non-visual instances based on a vision-language similarity between a named instance and one or more video shots of the general videos;

training a pre-trained vision-language model (VLM) to augment a text encoder of the pre-trained VLM with the set of general named video instances to form a meta-personalized VLM, the meta-personalized VLM including global category features;

mining a set of personal named video instances from a set of personal videos associated with a user by matching possessive text patterns in transcripts of the personal videos and filtering non-visual instances based on a vision-language similarity between a named instance and one or more video shots of the personal videos; and testing the meta-personalized VLM to adapt the text encoder with the set of personal named video instances to form a personal VLM, the personal VLM including the global category features personalized with a set of personal instance weights to form a personal instance token associated with the user, the personal instance token including a word embedding that extends a token vocabulary of the pre-trained VLM.

17. The system of claim 16, wherein the pre-trained VLM is a contrastive language-image pre-training (CLIP) model.

18. The system of claim 16, wherein the one or more processing devices are configured to perform operations further comprising linearly combining a column of a category matrix for the global category features with the personal instance weights, the personal instance weights including a vector of learnable weights specific to a personal instance associated with the user.

19. The system of claim 16, wherein the one or more processing devices are configured to perform operations further comprising mining general videos with associated transcripts to collect the set of general named video instances, the set of general named video instances including a set of general images and a corresponding set of labels.

20. The system of claim 16, wherein the one or more processing devices are configured to perform operations further comprising:

finding a second set of general named video instances based on the set of general named video instances; and adding the second set of general named video instances to the set of general named video instances.

* * * * *